United States Patent [19]
Tanaka et al.

[11] Patent Number: 5,748,272
[45] Date of Patent: May 5, 1998

[54] METHOD FOR MAKING AN OPTICAL DEVICE USING A LASER BEAM INTERFERENCE PATTERN

[75] Inventors: Keiji Tanaka; Kinya Kato, both of Iruma; Shinji Tsuru, Higashimurayama; Shigenobu Sakai, Tama, all of Japan

[73] Assignee: Nippon Telegraph and Telephone Corporation, Tokyo, Japan

[21] Appl. No.: 661,018

[22] Filed: Jun. 10, 1996

Related U.S. Application Data

[62] Division of Ser. No. 198,811, Feb. 18, 1994.

[30] Foreign Application Priority Data

| | | | |
|---|---|---|---|
| Feb. 22, 1993 | [JP] | Japan | 5-31721 |
| Feb. 23, 1993 | [JP] | Japan | 5-33221 |
| Apr. 27, 1993 | [JP] | Japan | 5-100596 |
| Sep. 20, 1993 | [JP] | Japan | 5-233253 |
| Nov. 26, 1993 | [JP] | Japan | 5-296287 |

[51] Int. Cl.$^6$ .................................................. G02F 1/1333
[52] U.S. Cl. ....................................... 349/86; 349/92
[58] Field of Search ............................. 349/86, 92, 105, 349/183, 186

[56] References Cited

U.S. PATENT DOCUMENTS

| | | | |
|---|---|---|---|
| 4,581,608 | 4/1986 | Aftergut et al. | 349/86 |
| 4,781,440 | 11/1988 | Toda | 349/15 |
| 4,812,018 | 3/1989 | Kobayashi | 349/124 |
| 4,837,745 | 6/1989 | Eich et al. | 349/183 |
| 4,886,718 | 12/1989 | Eich et al. | 349/183 |
| 5,024,784 | 6/1991 | Eich et al. | 349/183 |
| 5,057,244 | 10/1991 | Nitta et al. | 252/501.1 |
| 5,141,785 | 8/1992 | Yoshinada et al. | 349/183 |
| 5,335,303 | 8/1994 | Buchecker et al. | 349/183 |
| 5,350,538 | 9/1994 | Moriwaki et al. | 252/299.01 |
| 5,357,356 | 10/1994 | Konuma et al. | 349/93 |
| 5,392,141 | 2/1995 | Jang | 349/75 |
| 5,426,522 | 6/1995 | Takahara et al. | 349/92 |
| 5,442,482 | 8/1995 | Johnson et al. | 389/619 |
| 5,566,012 | 10/1996 | Koshimizu et al. | 349/86 |
| 5,570,210 | 10/1996 | Yoshida et al. | 349/86 |

*Primary Examiner*—William L. Sikes
*Assistant Examiner*—Tiep H. Nguyen
*Attorney, Agent, or Firm*—Finnegan, Henderson, Farabow, Garrett & Dunner, L.L.P.

[57] ABSTRACT

A polymer dispersed liquid crystal optical device is presented which has optical elements which control reflection, transmission and diffraction of incident light entering the device by adjusting the magnitude of the electrical field applied to the device between a maximum and a minimum limits. An optical element consists of a polymer material having an electrical field-independent refractive index, and a liquid crystal material having an electrical field-dependent refractive index. The optical elements are distributed through the device at specific inter-element spacings, thus enabling to generate reflection of incident light in accordance with Bragg's law of reflection. The inter-element spacings can also be varied by the application of the field, thus enabling to generate reflection of light of a desired wavelength. Such optical elements are ideal for use in full color optical display apparatus of a matrix driven type. Methods for producing the optical device and optical display apparatus are also presented.

11 Claims, 37 Drawing Sheets

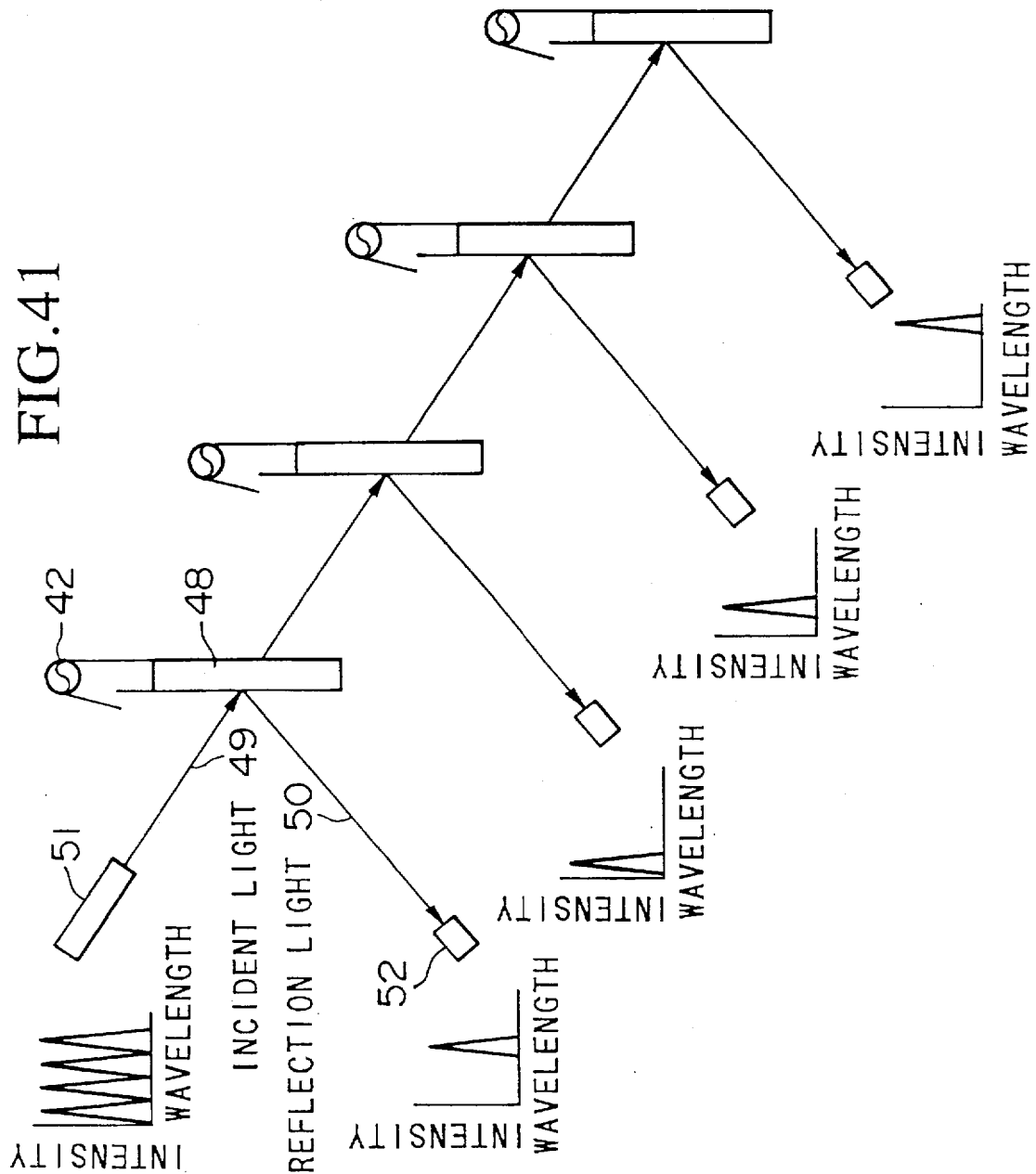

FIG.56
FIG.57
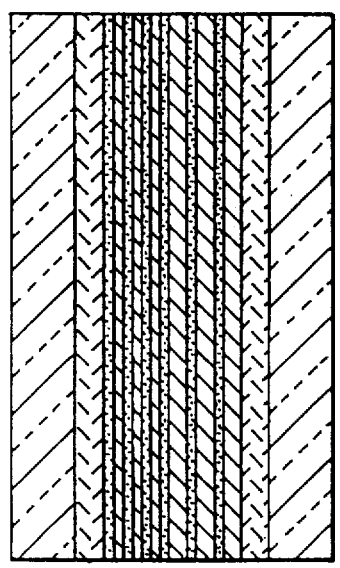
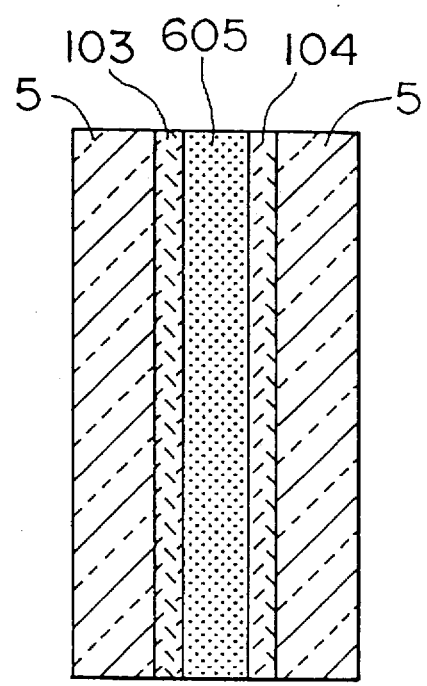
FIG.58
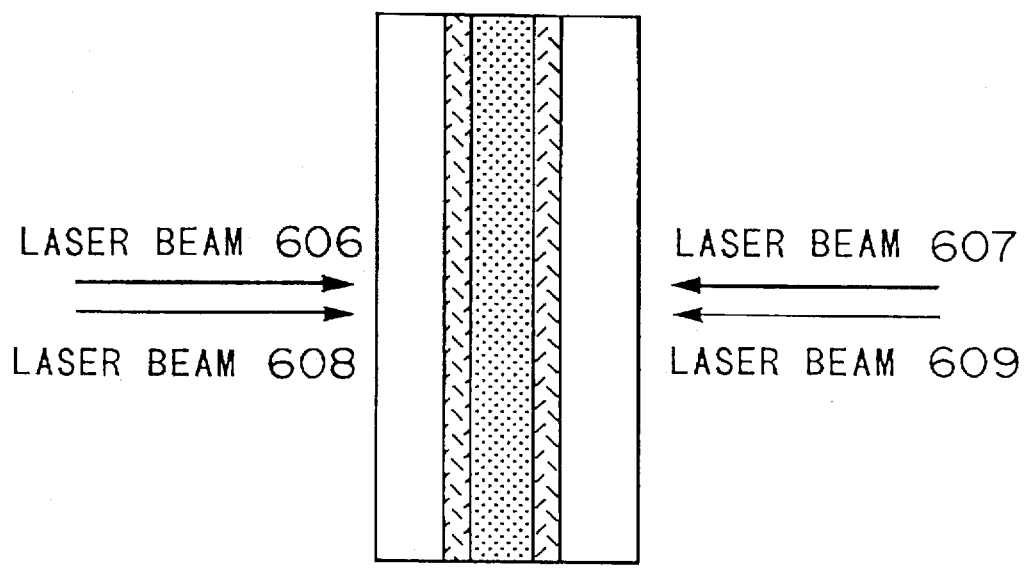

METHOD FOR MAKING AN OPTICAL DEVICE USING A LASER BEAM INTERFERENCE PATTERN

This application is a division of application Ser. No. 08/198,811, filed Feb. 18, 1994.

BACKGROUND OF THE INVENTION

1. Field of the Invention

The present invention relates to an optical device and a method for making the optical device, and in particular to an optical device enabling to electrically regulate reflection, transmission and diffraction of light through the optical device.

2. Technical Background

With increasing trend towards pictographic applications of information communication, there have been increasing demands for a portable terminal display device which can display clear images. However, the display equipment presently available in the market place are mostly for black/white images, and they do not perform well under ambient light conditions. Color display devices available in the marketplace are also inadequate under daylight reflecting light conditions. Therefore, the demand of the marketplace is for a portable terminal display device which can reproduce full color moving images. Such present technical state of the art will be an impediment to realizing the full potential of the coming information age. From such a viewpoint, the inventors of the present invention have focussed their attention to the development of a paper thin display device which is capable of displaying full color moving images.

FIG. 75 is a schematic illustration of the conventional transmission type display device. Color images in this type of display device are produced by the white back lighting 402 in conjunction with an optical shutter having a pair of polarizers 403 disposed on both sides of a liquid crystal display (LCD) device 401 of TN or STN type. The white output light is passed through a color filter 404 to produce a color image. However, this type of display device is deficient in that the back lighting 402 occupies a large volume and consumes high power, and that it is difficult to apply this technology to producing a thin portable display device.

FIG. 76 is a schematic illustration of the conventional reflection type display device which is similar to the above transmission type in that the device comprises a LCD device 501 of TN or STN type and a pair of polarizers 503 disposed on both sides of the LCD device 501, and the coloring is provided by a color filter 504. The difference is that the back lighting is replaced with a reflector 502 to produce the image by reflection light. However, in this type of display device, only the reflection light is used, and the amount of light is insufficient. It is therefore necessary to raise the efficiency of the light shutter, but the use of the TN or STN type LCD device 501 alone is not sufficient to produce bright images because of the basic requirement of the polarizers 503 which decreases the utilization efficiency of the reflection light.

FIG. 77 is a schematic illustration of the conventional reflective type display device based on polymer dispersed liquid crystal (PDLC). With this type of display device, a liquid crystal material 601 is dispersed in a polymer material 602 together with a dye material 603. A color film 604 is disposed at the back of the device in a mosaic fashion, for example, and the color film is backed by a reflector 605. In this type of display device, In the scattering mode (off-state, i.e. the electrical field off) shown in FIG. 77, the beams scattered by the difference in the refractive indexes of the liquid crystal material 601 and the polymer material 602 will be absorbed within the polymer material 602 or by the dye material 603 contained in the liquid crystal material 601, therefore, the output display will be a black image. In the transmission mode (on-state, i.e. field on) shown in FIG. 78, the color is produced by the color film 604 provided at the back of the display device. Therefore, the basic problem of poor brightness is not resolved by this type of display device. Additionally, the dye material 603 absorbs the light, and the brightness is still further decreased.

To resolve the problems in the existing display devices, the present inventors developed a new optical device which is applicable to producing a thin and portable display device in a Japanese Patent Application No. H2-306265. This optical device is schematically illustrated in FIGS. 79 and 80. The optical device comprises a transparent film 702 having a refractive index n3 disposed on top of a transparent electrode film 701, and a strongly dielectric film or a transparent film 703, having a variable refractive index which can be varied from n1 to n2 by the application of field on top of the transparent film 702. This film 703 may be made from, for example, liquid crystal including dielectric polymeric liquid crystal. This is overlaid with another transparent film 704 having a refractive index n3 (where n1<n2<n3) which is overlaid with a transparent electrode film 705.

The optical device of such a construction operates by having a field applied between the electrodes 701 and 705 so as to reflect light of specific wavelength band while permitting light of other wavelength band to pass through. When a field is impressed between the electrodes 701, 705, it becomes possible to decrease the reflection of light in certain wavelength band significantly, causing most of the light to be transmitted. However, to produce a bright color display device of high optical efficiency which can operate without the back lighting, it is necessary to provide a multilayer device having many thin layers of less than 1 μm spacing, in which each layer has a different refractive index. To manufacture such an optical device, it is necessary to alternately dispose many thin layers of different materials. The process would be cumbersome and would have little practicability. Thus there are many problems to be overcome before a practical manufacturing process for such an optical device can be realized.

SUMMARY OF THE INVENTION

To resolve the above described problems in the existing state of the art of the display devices based on polymer dispersed liquid crystal technology, the present invention provides an optical device comprising a plurality of optical elements each optical element consisting of a polymer material having a refractive index which is independent of applied electrical field, and a liquid crystal material having a field-dependent refractive index different from that of the polymer material. The optical elements are disposed in the optical device so as to have at least one periodicity in the inter-element spacing.

The value of the field-dependent refractive index is dependent on the amount of liquid crystal material contained in the optical element, and the distribution can be changed by altering the forming conditions of the optical element.

One of the features of the present invention is that the difference in the values of the refractive indexes of the polymer material and the liquid crystal material is maximized by producing the optical element from a mixture solution of a nematic liquid crystal with a light polymerized resin containing polyene and polythiol. It is possible to produce an optical element having about 100 nm dimension, and by appropriately varying the polymerizing condition of the mixture solution, the dimension can be adjusted to provide an optical device responsive to light suitable for use in optical communications technology.

The present invention, therefore, presents an optical device comprising a pair of transparent electrodes; a plurality of optical elements, having a periodicity in the inter-element spacings, disposed between the transparent electrodes; wherein an optical element comprises one optical material having a refractive index and another optical material having an electrical field-dependent refractive index, and wherein the optical elements are orientated at a specific angle to an incident surface of the optical device, and reflection, transmission and diffraction of incident light entering the optical device are regulated by the application of an electrical field between the transparent electrodes.

The above optical device is applicable to producing a display apparatus which utilizes the optical device of the present invention, wherein ambient incident light entering the optical device through the incident surface is reflected back or transmitted through the optical device by regulating the value of the refractive index of the electrical field-dependent refractive index by applying an electrical field between the pair of transparent electrodes so as to alter the electrical field-dependent refractive index suitably between the field off-state and the field on-state.

The optical display apparatus of the above structure enables to provide bright dynamic images of full color rendering, and does not require back lighting or polarizers.

The above apparatus is provided with the following features to enhance its adaptability to other lighting conditions, wherein the ambient incident light is white light, and generates full color dynamic images.

The above apparatus is characterized by the following feature, wherein the ambient incident light is non-white light, and generates dynamic images of monochromatic rendering.

The optical device of the present invention is characterized by the following features which are listed numerically below.

1. An optical device in which one optical material is a liquid crystal material, and another optical material is a polymer material.
2. An optical device in which the one optical material comprises a multifunctional carbon/unsaturated carbon compound which can be addition polymerized, and a light hardenable resin containing at least multifunctional thiol.
3. An optical device in which the optical element is disposed perpendicular to an incident surface of the optical device.
4. An optical device in which the optical element is disposed parallel to the incident surface of the optical device.
5. An optical device in which the optical element is orientated at a specific angle to the incident surface of the optical device.
6. An optical device in which the periodicity is singular.
7. An optical device in which the periodicity is plural.
8. An optical device in which the specific angle is singular.
9. An optical device in which the specific angle is plural.
10. An optical device in which the periodicity is plural, and the specific angle is plural.
11. An optical device in which the incident surface of the optical device is provided with a light scattering device.
12. An optical device in which the optical elements are disposed so as to produce convergence and divergence of the incident light entering the optical device, separately or simultaneously.

The features presented above enhance the generation of dynamic images of full color rendering which can be viewed from a wide angle of viewing.

The features described below are presented to provide further flexibility in making and using the optical device of the present invention.

1. An optical device in which the optical element comprises an optically anisotropic material, and an optically isotropic material, wherein the refractive index is controlled by the application of an electric field on the pair of electrodes, and inter-element regions of the optical device is provided with a refractive index which is different than either the on-state or off-state refractive index of the optically anisotropic material or the optically isotropic material.
2. An optical device in which the optically anisotropic material includes a liquid crystal material formed by a mixture of the optically anisotropic material and the optically isotropic material precipitated from a mixture solution of the optically anisotropic material and the optically isotropic material, when the mixture solution is irradiated with process laser beams, and the optical elements are formed along an interference pattern generated by the process laser beams.
3. An optical device in which the interference pattern is a hologram formed by object laser beams.

The optical device of the present invention is produced by a simple and effective method as follows:

A method for making an optical device of claim 1 comprising the steps of:
  (a) preparing a pair of transparent electrode;
  (b) disposing a mixture solution containing a light hardenable polymer material and a liquid crystal material between the pair of transparent electrodes;
  (c) irradiating the mixture solution with a plurality of process laser beams at a specific process angle with respect to an incident surface of the optical device; and
  (d) forming at least one interference pattern in the mixture solution, and controlling the rate of hardening of the light hardenable polymer material to generate a plurality of optical elements having at least one periodicity in inter-element spacing;

thereby forming the optical device which provides control of reflection, transmission and diffraction of incident light entering the optical device by the application of an electrical field on the pair of transparent electrodes.

The method of making the optical device presented above is advantageous because the method of production by a laser generated interference pattern to produce a fine configuration of the optical elements is simple and economical. The method is flexible in producing optical elements which are responsive to incident light of various wavelengths.

The above method of making the optical element of the present invention is enhanced by the following features of the method to enable generation of dynamic images of bright full color rendering which can be viewed from a wide angle of viewing.

1. The first feature is that the plurality of optical elements are formed planarly on a common substrate material.
2. Another feature is that the process laser beams are coherent laser beams of singular wavelength.
3. Another feature is that the process laser beams are coherent laser beams of a plurality of wavelengths.
4. Another feature is that the specific process angle is determined on the basis of the wavelengths of incident light and the desired angle of diffraction of the incident light.

5. Another feature is that the optical elements are orientated parallel to the incident surface of the optical device.
6. Another feature is that the optical elements are orientated at right angles to the incident surface of the optical device.
7. Another feature is that the optical elements are orientated at a specific singular angle to the incident surface of the optical device.
8. Another feature is that the optical elements are orientated at a plurality of specific angles to the incident surface of the optical device.
9. Another feature is that the mixture solution is treated with the process laser beams so as to generate a different distribution of the liquid crystal material in one optical material having a refractive index and another optical material having an electrical field-dependent refractive index.
10. Another feature is that the mixture solution is treated with the process laser beams so as to generate optical elements comprising different dimensions of one optical material having a refractive index and another optical material having an electrical field-dependent refractive index.

BRIEF DESCRIPTION OF THE DRAWINGS

FIG. 1 (B) is a schematic illustration of another optical device of the present invention.

FIG. 3 (B) is a schematic illustration of the principle of forming an interference pattern.

FIG. 15 (B) is a schematic illustration of the optical device of the droplet configuration which has non-uniform size droplets.

FIG. 16 (B) is a schematic illustration to explain the formation of an interference pattern by the wavefront of process lasers.

FIG. 16 (C) is a schematic illustration of the optical device produced by following the steps shown in the previous steps.

FIG. 17 (B) is a schematic illustration of a method of directing the processing laser beams to the mixture solution to produce the device shown in FIG. 12.

FIG. 17 (C) is a schematic illustration of a method of directing the processing laser beams to the mixture solution to produce the device shown in FIG. 14.

FIG. 24 (B) is a schematic illustration of a method for making the optical device shown in FIG. 20.

FIG. 24 (C) is a schematic illustration of a method for making the optical device shown in FIG. 22.

FIG. 41 is a schematic illustration of another optical device based on the optical device shown in FIG. 34 of the present invention.

FIG. 42 (B) is a schematic illustration of the active matrix type planar arrangement of the optical devices shown in FIG. 34.

FIG. 56 is a schematic illustration of the optical device after the completion of the step shown in FIG. 55.

FIG. 57 is a schematic illustration of a step of disposing a mixture solution in a method of making the optical device shown in FIG. 44.

FIG. 58 is a schematic illustration of a step of irradiating the mixture solution with laser beams to produce the optical device shown in FIG. 44.

FIG. 67 (B) is a schematic explanation for forming an interference pattern of a specific inter-element spacing.

FIG. 67 (C) is a schematic illustration of the optical device produced by the step shown in FIG. 67 (B).

FIG. 68 (B) is a schematic illustration of a step of disposing the container between a pair of prism shaped electrodes.

FIG. 68 (C) is a schematic illustration of a step of irradiating the mixture solution with a pair of laser beams.

PREFERRED EMBODIMENTS

In the following descriptions of preferred embodiments of the present invention, it should be noted that the term "reflection" is used to refer to a phenomenon of back scattering of ambient incident light from the optical device of the present invention. This phenomenon is considered to be analogous to the Bragg reflection of X-rays in which the incident X-rays are reflected back by the diffraction from regularly spaced atoms in a crystal, for which constructive interference occurs only at definite angles called Bragg angles. In the optical device of the present invention, ambient white light enters the various optical devices of the present invention, and encounters an array of regularly spaced periodic configurations of optical elements. An optical element is made up of a pair of a polymer material and a liquid crystal material whose refractive index can be altered by applying electrical field. When ambient light having many wavelengths encounters a periodic arrangement of a plurality of optical elements, certain specific wavelength of the ambient light is reflected back or transmitted through the optical device depending on the refractive indexes which are assigned to the optical element.

The various embodiments of the optical devices of the present invention are presented under the following headings:

(I) Principle of the operation of an optical element and optical devices based on the optical element;

(II) Application of the optical elements to control the transmission and reflection of ambient incident light;

(III) Application of the optical device to regulate the direction of output light from the device;

(IV) Application of the optical device to generate output light of specific wavelengths, and optical display apparatuses based on the optical device; and (V) Application of the optical devices for generating reflected light of different wavelengths;

(VI) Application of the optical device to generate output light of infrared wavelengths.

(I) Principle of the Operation of an Optical Element and Optical Devices Based on the Optical Element Embodiment 1

Figure 1A:
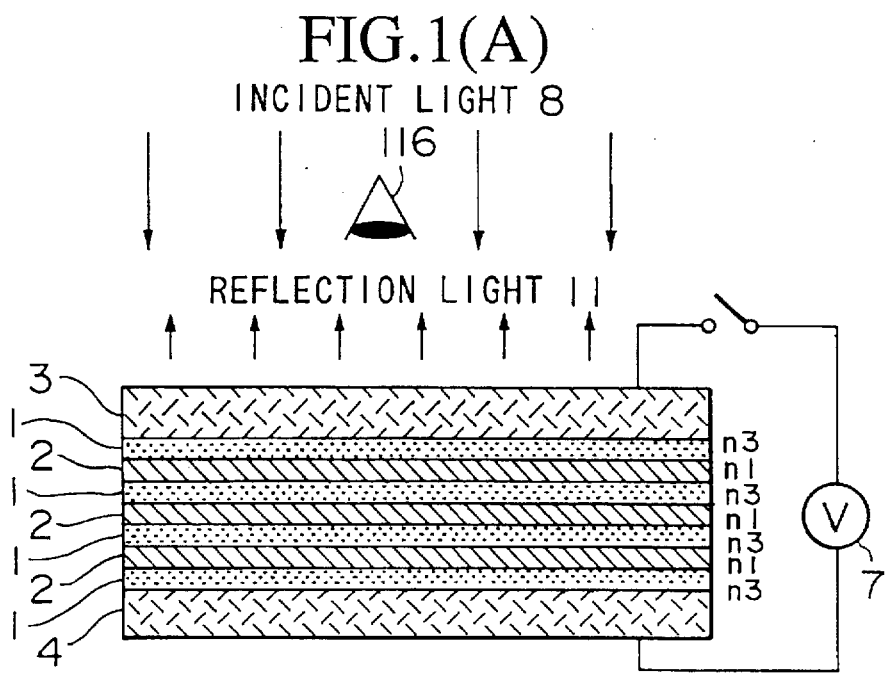
FIG. 1 (A) is a schematic illustration of the optical device of the present invention.
Figure 1B:
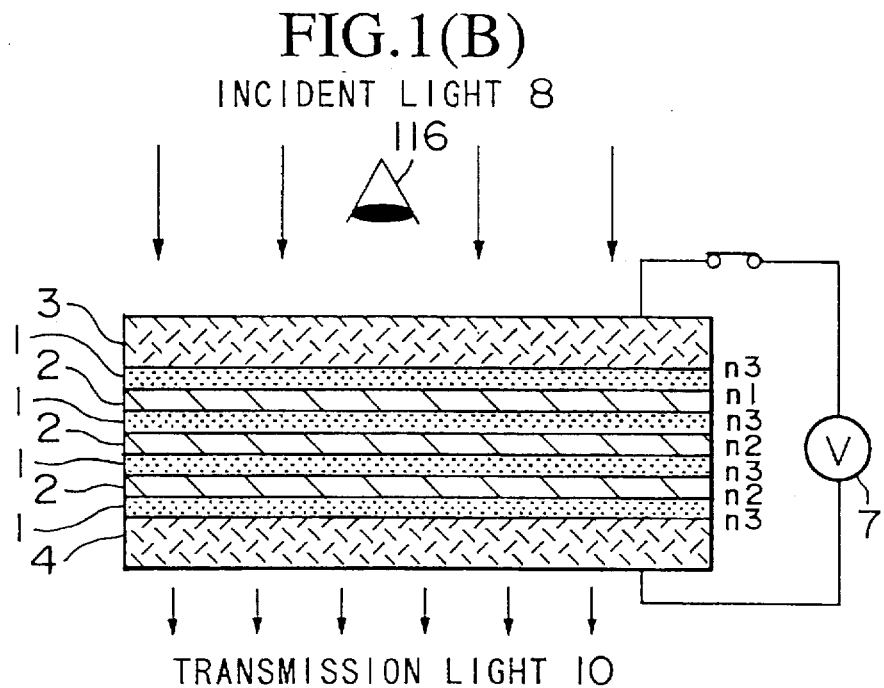

FIG. 1 (A) and FIG. 1 (B) illustrate the principle of the operation of the optical device of the present invention. The optical device comprises: a pair of transparent ITO (indium, tin oxide) film electrodes 3, 4 of thickness of 500 Å, for example; and layers of optical elements, each optical element consisting of a polymer layer 1 of light hardenable polymer having a refractive index n3=1.50, and a liquid crystal layer 2 of nematic crystal having a refractive index which can be varied between n1 and n2 depending on the on/off state of electrical field applied to the electrodes 3, 4.

The relative order of the values of the refractive index is n1>n2>n3. The polymer material used in this embodiment was LUXTRAK™LCR 208 of n3=1.50 made by ICI Co., and the liquid crystal used was a nematic crystal E-7 made by MERCK Co. having an electrical field dependent refractive index which can vary continuously between n1=1.75 (field off) and n2=1.52 (field on). In FIG. 1 (A) and FIG. 1 (B) the reference numeral 7 refers to an electrical source for applying the field to the pair of electrodes 3, 4 to vary the refractive index of the liquid crystal.

As shown in FIG. 1 (A), when the field is not applied to the electrodes 3, 4 of the optical device (off-state), the entire device assumes a configuration of alternating layers of refractive indexes n3/n1/n3 ... n3/n1/n3, for the polymer layer and the liquid crystal layer having the off-state refractive index n1. Therefore, the optical structure acts as an interference filter, and reflects light of a specific wavelength. For example, if the thickness of the polymer and liquid crystal layers is both 1,000 Å, the optical element reflects light of wavelength centered primarily around 6,500 Å, which is red color light, and permits light of all other wavelengths to transmit through the device. When the field is applied between the electrodes 3,4 (on-state), as shown in FIG. 1 (B), the on-state refractive index of the liquid crystal is n2, and the optical device has a configuration of alternating layers of refractive index, n3/n2/n3 ... n3/n2/n3. In this configuration, the difference between the refractive index (1.50) of the polymer layer 1 and that of the liquid crystal 2 (1.52) becomes small, and the reflection of the red light decreases significantly, and nearly all the incident light is transmitted through the optical device. If the optical elements are repeated twenty times, it becomes possible to reflect nearly 90% of red light by increasing the difference in the refractive indexes between the two layers (off-state). When the difference is small (on-state), reflection of the red light becomes less than 10%.

The above embodiment thus demonstrated the feasibility of an optical device which can control transmission and reflection of light of a specific wavelength. Such an optical device is applicable to producing a thin and portable color display device of high brightness and light utilization, and requires neither back lighting nor polarizer.

This embodiment dealt with cases of n1>n3 and n2≈n3, but the performance of the optical device of the present invention is not limited to these cases. It is necessary that only one of the on/off states of the refractive indexes of the liquid crystal material be close to that of the polymer material. The electrical field is able to control the refractive indexes so that the optical device will function in the same manner.

Also, the thickness of the optical element was chosen to be 1,000 Å, but this parameter is also selectable, and by changing the thickness of the optical element, the light of different wavelength will be reflected.

Embodiment 2

Figure 2:
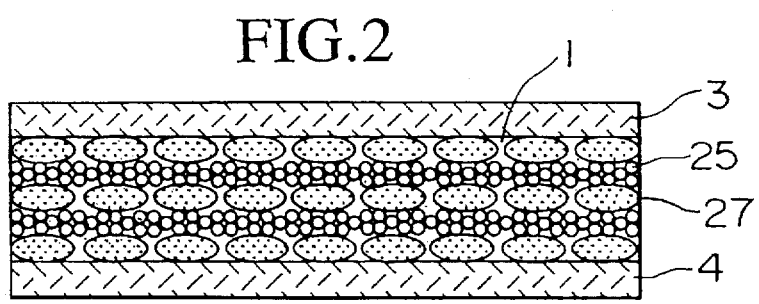
FIG. 2 is a schematic illustration of the droplet configuration of the optical device of the present invention.

FIG. 2 illustrates another embodiment. The optical element in this embodiment comprises a droplet configuration instead of the layer configuration presented in embodiment 1. This optical device also comprises a pair of transparent electrodes 3, 4 of 500 Å thickness made of ITO, between which are disposed optical elements. An optical element comprises: a polymer material 1 having a refractive index n3 containing a small droplet layer 25 consisting of nematic liquid crystal droplets of small diameters (about 500 Å) and a large droplet layer 27 of nematic liquid crystal droplets of large diameters (about 1,000 Å). The relative order of the refractive index is n1>n2>n3. The polymer material used in this embodiment was LUXTRAK™ LCR 208 of n3=1.50 made by ICI Co., and the liquid crystal material was for example, nematic crystal E-7 made by MERCK Co. having n1=1.75 and n2=1.52. The liquid crystal droplets of different diameters contain differing ratios of the liquid crystal material 2 to the polymer material 1, and the refractive indexes of the three regions, the polymer 1 layer, the small droplet layer 25 and the large droplet layer 27, will be correspondingly different. The optical device of such a configuration is a multi-refractive index device as in the first embodiment.

When an electrical field is applied to such a device, the large droplet layer 27 containing a large amount of liquid crystal will exhibit a large change in the refractive index, and the refractive index of the optical elements will be altered. The small droplet layer 25 containing a small amount of liquid crystal will be relatively insensitive to the field, and the on-state refractive index of the small droplet layer will remain small. Therefore it becomes possible to alter the refractive index by the application of electrical field.

For example, if it is assumed that the percentage of the liquid crystal contained in the large droplet layer 27 is 80%, and the corresponding figure for the small droplet layer 25 is 20%, the on-state refractive index of the large droplet layer 27 is 1.70 and that for the small droplet layer 25 is 1.55. Therefore, as in the first embodiment, the optical element of the device contains layers of different refractive indexes, and it acts as a Bragg reflector. As before, if the thickness of the optical element, layers 25, 27, is 1,000 Å, the device reflects red light of a wavelength centered primarily at around 6,500 Å, and transmits light of all other wavelengths. On the other hand, by making the on-state refractive index of the large droplet layer 27 to be n2, the refractive indexes of the optical device become n3/n2/n3/n2/n3 (where n2=1.52, n3=1.50), thereby reducing the difference in the refractive indexes. Therefore, the reflection of the light near the red color around 6,500 Å is significantly reduced, and the device transmits most of the incident light. By making a multilayer device of more than about twenty layers, it becomes possible to reflect over 80% of the red light by increasing the on-state refractive indexes between the small droplet layer 25 and the large droplet layer 207. In this device, by making the difference in the refractive index small, the reflection of red light can be kept down to less than 10%. Therefore, as in the case of the first embodiment, the optical device of the second embodiment is also capable of controlling the reflection and transmission of certain wavelengths band, thereby enabling to produce a bright color optical display apparatus of high light utilization, which is thin and portable, and does not require polarizers.

Method of Making the Optical Device

In the following, some typical examples of a method of making the optical devices presented in the first and second embodiments will be presented with reference to the drawings.

Figure 3A:
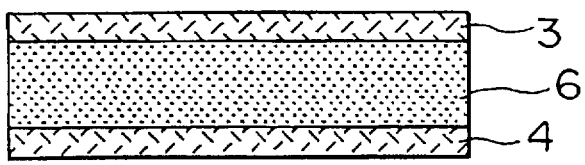
FIG. 3 (A) is a schematic illustration of the method of making the optical device of the present invention.
Figure 3B:
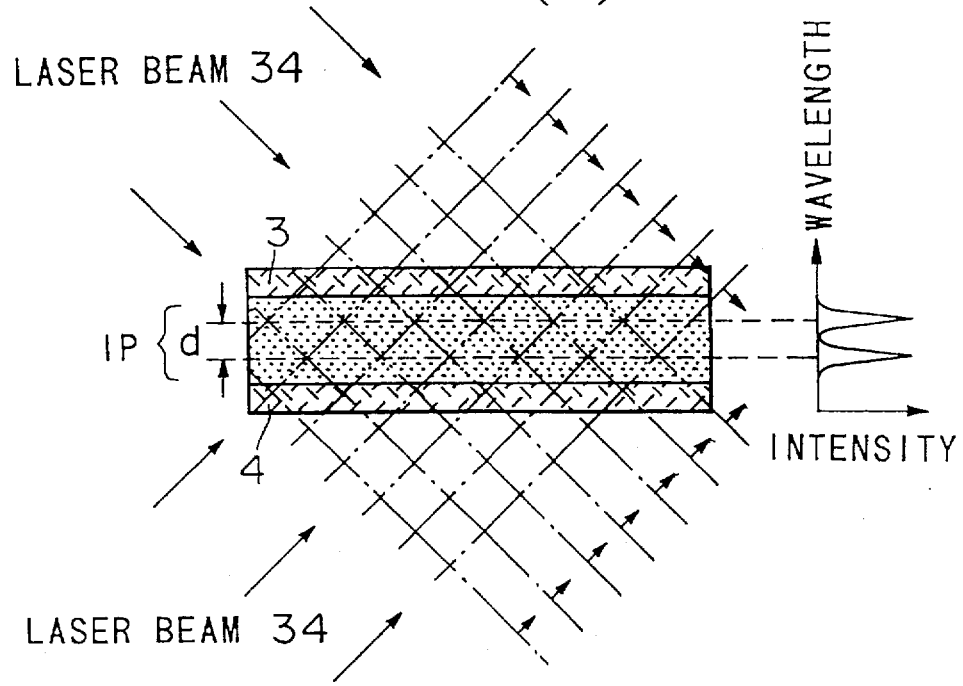
Figure 4:
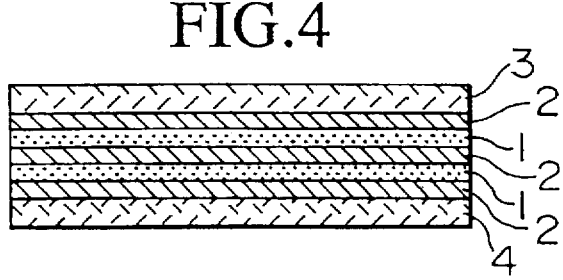
FIG. 4 is a schematic illustration of a layer configuration of the optical device made by the method shown in FIG. 3 (B).

FIG. 3 (A) and FIG. 3 (B) are schematic illustration of the method for making the optical device of the first and second embodiments. As shown in FIG. 3 (A), a mixture solution 6 of nematic liquid crystal material (MERCK, E-7, for example) and light hardenable polymer material (LUXTRAK™ LCR 208 made by ICI Co. for example) is placed between a pair of transparent electrodes 3, 4 made of ITO film of 500 Å thickness, for example. Next, argon laser light 34 (of wavelength 488 nm) is directed to the mixture from two directions, above and below the mixture solution 6, as shown in FIG. 3 (B). The two beams of the argon laser light generate an interference pattern IP, and generates a three dimensional layer pattern of high and low light intensity of a specific spacing d (for example, 1,600 Å spacing). The three dimensional pattern is determined by the wavelength of the laser light and the angles of incidence of the two laser beams. When the mixture solution 6 contains a light hardenable polymer material as in the above embodiments, the polymer material will harden in the regions where the laser light intensity is high in accordance with the interference pattern, and the liquid crystal material is precipitated out in the low light intensity regions in accordance with the interference pattern. The result is a formation of optical elements, i.e., layers 2 containing mostly the liquid crystal material alternating with layers 1 containing mostly the polymer material, as shown in FIG. 4. The inter-element spacing, that is periodicity, is extremely fine, and it is possible to produce, for example, a 1,600 Å spacing.

Figure 5:
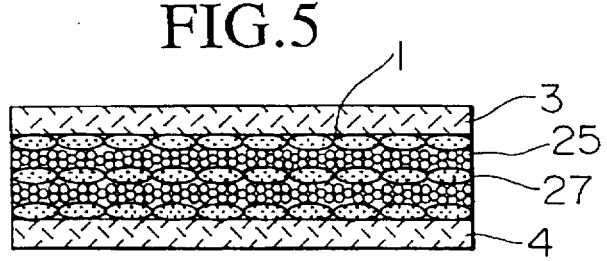
FIG. 5 is a schematic illustration of the droplet configuration of the optical device made by the method shown in FIG. 3 (B).

If the laser power is high, and the rate of hardening of the polymer is quick, the liquid crystal can be precipitated as droplets. The size of the droplets is smaller the quicker the rate of hardening of the polymer material. For example, when an argon laser of 4,880 Å wavelength is used, the diameter of the small droplets in the high intensity layers (20 mW or higher, for example) is about 100 Å. Where the laser light intensity is low, the diameter of the droplets formed is 1,000 Å or larger. The result is a formation of a multi-layer device, as shown in FIG. 5, having an alternating layers of small droplet layers 25 in which the rate of hardening was relatively quick, and large droplet layers 27 in which the rate of hardening was relatively slow. Because the liquid crystal contents are different in the two layers 25, 27 of small and large droplets, their refractive indexes are also different. Therefor, this method is able to form an optical device having a multi-refractive index configuration.

The liquid crystal layer 2 or large droplet layer 27 can change their refractive indexes continuously by the application of increasing electrical field, therefore, by suitably adjusting the difference in the refractive indexes between the liquid crystal material layer 2 and the polymer material layer 1 in the first embodiment, or between the the small droplet layer 25 and the large droplet layer 27 in the second embodiment, the light of a specific wavelengths band can be made to reflect or transmit through the optical device. The method is thus able to produce an optical device which can be used to produce a color display device of high light utilization which does not require polarizers.

In the above embodiments, liquid crystal was used to form regions of controllable refractive indexes, but other polymeric liquid crystal or highly dielectric material which display field-dependent refractive index may also be used. Also, argon laser was used to generate interference patterns, but any coherent light source which is suitable for generating interference patterns can be used.

(II) Application of the Optical Elements to control the Transmission and Reflection of Ambient Incident Light Embodiment 1

In the following, some typical examples of the application of the optical elements described in the first section will be presented with reference to the drawings.

Figure 6:
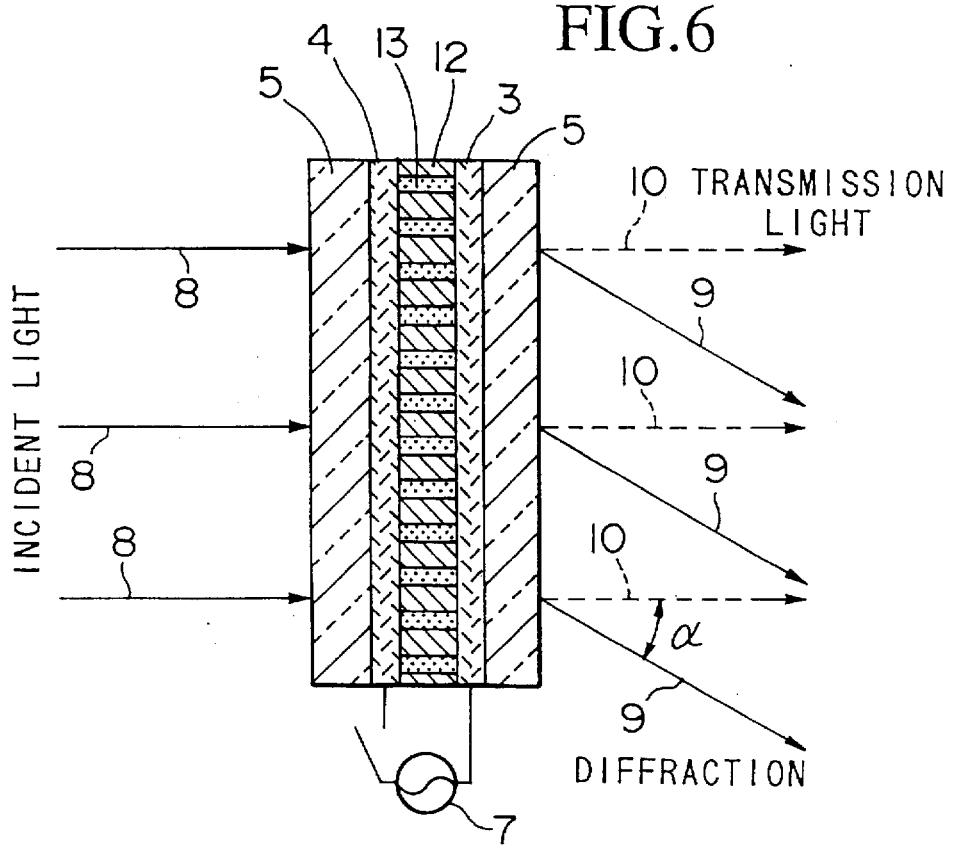
FIG. 6 is a schematic illustration of the optical device to control the transmission or bending of parallel incident light through the optical device.

In FIG. 6, a configuration is presented of an optical device to control the transmission and direction of propagation of the incident light based on the principle of the optical device of the present invention. This configuration is similar to the known optical device (for example, U.S. Pat. No. 4,938,568), but is distinct in that the polymer layer 12 is a light polymerized product of a mixture of polyene and polythiol group resin mixture. Between a pair of transparent electrodes 3, 4 made of ITO of 500 Å thickness, for example, an alternating layers of a hardened polymer layer 12 containing polyene and polythiol group resin mixture (made from NOA65 made by Norland Co., with a refractive index n3=1.52), and a nematic liquid crystal layer 13 (E-7 made by MERCK Co, n1=1.75 and n2=1.52) whose refractive index can be varied from n1 to n2 by the application of field so that n1>n2 and n2≈n3. An electrical source 7 is provided to control the field between the transparent electrodes 3, 4.

Tests were carried out to compare the diffracted light intensities from the optical device samples made of the conventional acrylic group resin (LUXTRAK™ LCR 208 made by ICI Co.) with those from the optical device made by laser hardening a mixture of polyene and polythiol resin mixture (NOA65 made by Norland Co.). The hardening of the resin mixture was carried out in accordance with the interference patterns formed by two lasers, thereby separating the liquid crystal material from the polymer material to generate an interference pattern of certain periodicity. The diffracted intensity was measured for the wavelength of 488 nm. The inter-element spacing of 500 nm, alternating a polymer material layer 12 and a liquid crystal material layer 13, was chosen so that the incident light would be diffracted at a relatively large angle α of 60°.

TABLE 1

| Resin used | Intensity of Diffracted Light |
|---|---|
| Polyene and Polythiol | 41,000 |
| Acrylic resin | 20,000 |

The units of the light intensity are reported in terms of the number of counts made on a Photomar counter. It can be seen in Table 1 that the use of the mixture of crolyene and polythiol group resin produces nearly twice the intensity of the diffracted light compared with the case the conventional acrylic resin.

Embodiment 2

Figure 7:
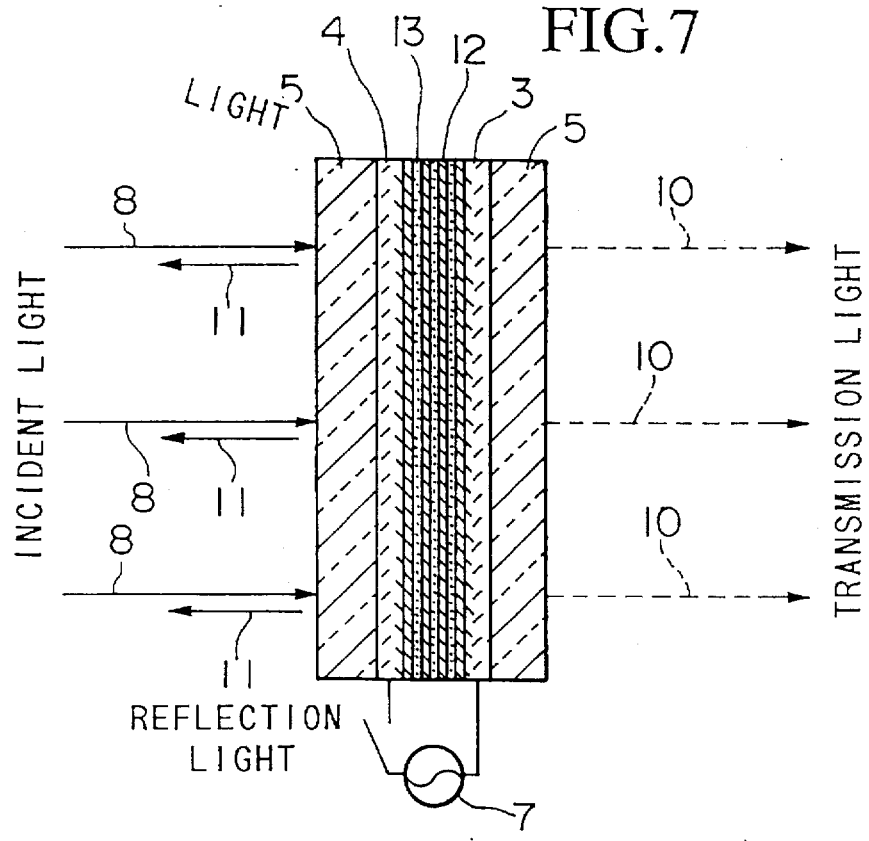
FIG. 7 is a schematic illustration of the optical device to control the transmission or reflection of parallel incident light through the optical device.

FIG. 7 illustrates a second embodiment of the optical device of the present invention by which the transmission or diffraction of the incident light is controlled. The details of the experimental procedure for the preparation of the material were the same as in the first embodiment, except that the interference patterns were changed from the parallel orientation (in which the pair of layers is parallel to the direction of the incident beam) shown in FIG. 6 to the perpendicular orientation shown in FIG. 7.

The operating principle of this device is the same as the previous embodiment. In this case, the reflection of the incident light of a particular wavelength is controlled by the difference in the refractive indexes of the liquid crystal layer in accordance with the field applied thereon.

Tests were carried out to compare the diffracted light intensities from the optical device samples made of the conventional acrylic group resin mixture LUXTRAK™ LCR 208 made by ICI Co.) with those from the optical device made by laser hardening a mixture of polyene and polythiol mixture (NOA65 made by Norland Co.). The hardening of the resin mixture was carried out in accordance with the interference patterns formed by two lasers, thereby separating the liquid crystal material from the polymer material to generate an interference pattern of certain periodicity. The diffracted intensity was measured for the wavelength of 488 nm. The inter-element spacing of 150 between layers, alternating a polymer material layer 12 and a liquid crystal material layer 13, was chosen.

The results of the measurements are shown in Table 2.

TABLE 2

| Resin used | Intensity of Back Reflection |
|---|---|
| Polyene and Polythiol | 110,000 |
| Acrylic resin | 30,000 |

The units of the light intensity are reported in terms of the number of counts made on a Photomar counter. It can be seen in Table 2 that the use of the mixture of polyene and polythiol resin mixture produces nearly three times the intensity of the diffracted light compared with the case of using the conventional acrylic resin.

The above embodiments demonstrated clearly that the use of polyene and polythiol group resin mixture enables a significant increase in the light reflection and diffraction efficiencies.

According to the method of producing the optical device of the present invention, a three dimensional interference pattern of desired direction and inter-element spacing can be produced by changing the direction of illumination of the lasers directed at the device, thereby producing regions of varying refractive indexes at any desired inter-element spacing. Therefore, the method enables the production of optical devices for diffracting and reflecting the light of a variety of wavelengths in a variety of directions.

It should be noted that although MERCK E-7 was used as the liquid crystal raw material in the above embodiments, but the choice for the liquid crystal is not limited to this material. It is necessary that the liquid crystal should have one of the principal refractive indexes, n1 and n2, to be nearly equal to the refractive index of the polymer material, n3, and that the multi-layer configuration be activated or de-activated by the application of the electrical field.

Also, the nematic liquid crystal was chosen as the field dependent liquid crystal, but it is not limited to such a material. It is necessary that the polymeric liquid crystal material or strongly dielectric liquid crystal material can also be used.

Also in the above embodiments, a mixture of polyene and polythiol group resins, NOA65 made by Norland Co. was used, but it is not necessary to restrict to this material. The objective of the method is to use a polyene and polythiol mixture which polymerize gradually, and other polyene and polythiol materials which exhibit such characteristics may also be used.

Figure 8:
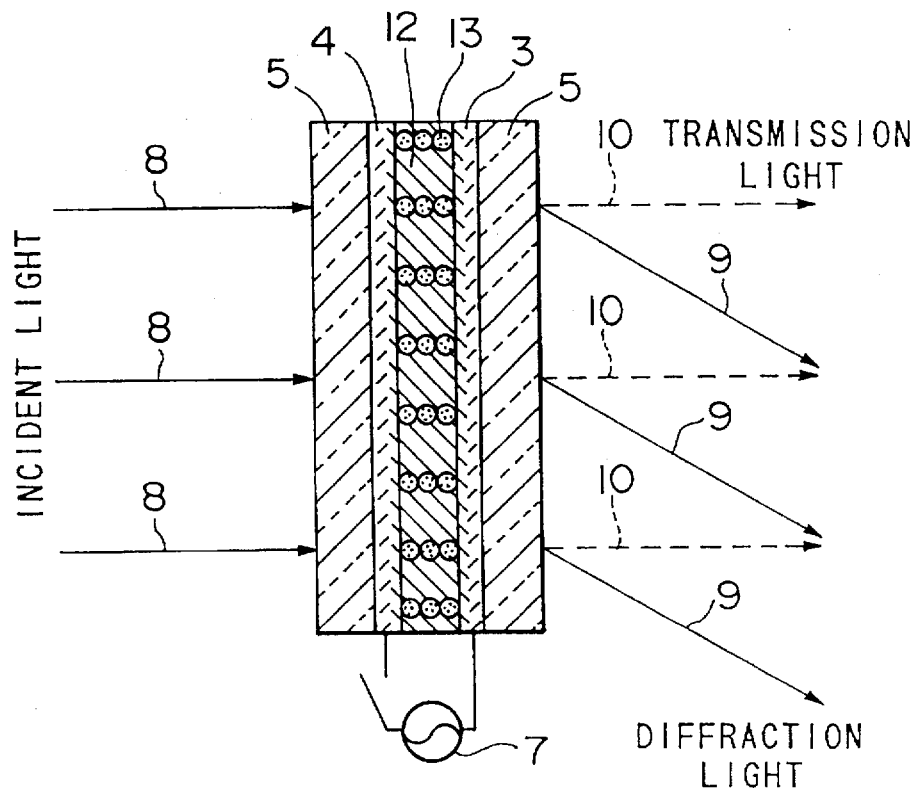
FIG. 8 is a schematic illustration of the optical device of a droplet configuration to control the transmission or bending of parallel incident light through the optical device.
Figure 9:
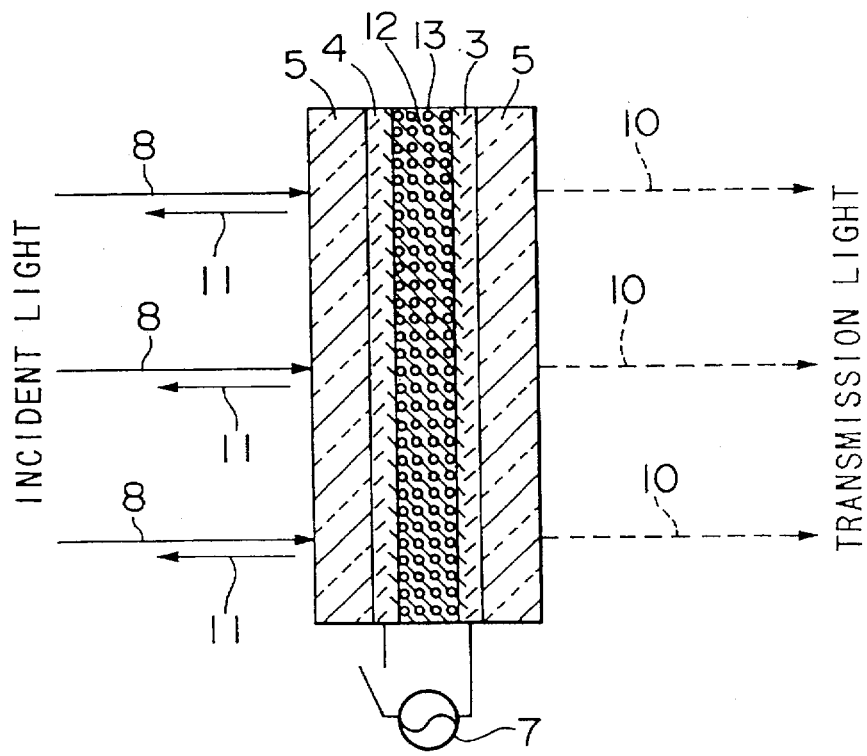
FIG. 9 is a schematic illustration of the optical device of another droplet configuration to control the transmission or reflection of parallel incident light through the optical device.

Furthermore, the embodiments showed examples of layered configuration, but the device structure is not limited basically to such a structure. A pair of regions of differing refractive indexes can be configured as shown in FIGS. 8 and 9, in which the regions are made of regions 13 formed by droplets. It is necessary that the incident light can be refracted by the regions of a polymer material and a liquid crystal material whose refractive indexes are different from each other but adjustable, and that the optical elements be configured to alternate with one or more regular periodic inter-element spacings.

(III) Application of the Optical Device to Regulate the Direction of Output Light from the Device In all the optical device embodiments presented above, reflected or diffracted output light was generated from incident light which was parallel. Therefore, to diverge or converge the output light from such optical devices, it was necessary to use separate optical devices to converge or diverge the output light, thus complicating the application of these optical devices to display devices that require dispersion or convergence. The following embodiments are presented to resolve such difficulties, and such an objective can be accomplished by having an optical device in which the optical elements are disposed so that they are oriented to converge or diverge the incident light.

The following embodiments demonstrate how the above objective is accomplished within the basic conceptual framework of the optical devices of the present invention. These embodiments will be presented with reference to the drawings.

Embodiment 1

Figure 10:
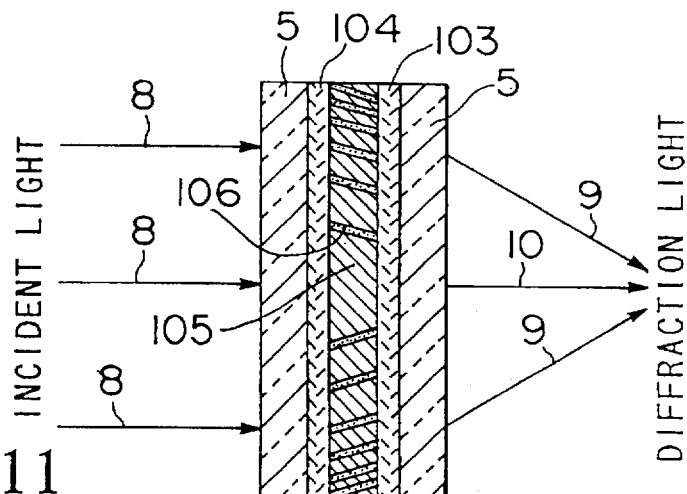
FIG. 10 is a schematic illustration of the optical device of the present invention to generate converging light from parallel incident light.

A first embodiment of the optical device which generates converging output light is shown in FIG. 10. This optical device contains a plurality of optical elements, alternating a light hardenable polymer material 105 and a liquid crystal material 106, disposed at different spacing between a pair of transparent electrodes 103, 104. The transparent electrodes are made of ITO of 500 Å thickness, and the polymer material was made of LUXTRAK™ LCR 208 of n3=1.50 made by ICI Co., and the liquid crystal was made from, for example, nematic crystal E-7 made by MERCK Co. having n1=1.75 and n2=1.52.

This optical device has a configuration such that the polymer material 105 and the liquid crystal material 106 are disposed as a pair at an angle to the incident light 8, and alternatingly in paired layers such that the inter-element spacing becomes wider near the center of the device. The optical elements are inclined at an angle to the incident light 8 so as to make the incident light 8 converge, as illustrated in FIG. 10. When there is a difference in the refractive indexes between the polymer material 105 and the liquid crystal material 106, the incident light is diffracted in accordance with Bragg reflection. The diffraction angle is larger the smaller the width of the optical element between the polymer layer 105 and the liquid crystal layer 106. The optical elements are inclined so as to diffract the incident light 8 towards the center of the optical device, by diffracting the incident light 8 near the periphery of the device at a large angle towards the center of the device to produce converging light 9. The incident light 8 near the center proceeds straight through, and becomes transmission light 10. The optical device of the configuration in FIG. 10 is thus able to converge the parallel incident light into converged output light.

In the device of this embodiment, when a field is applied between the transparent electrodes 103, 104 so as to make the on-state refractive index of the liquid crystal layer 106 to be n2, the difference in the refractive indexes between the layers becomes almost nil, thus preventing the diffraction of the incident light. In this condition of the device, the incident light proceeds through the device without being diffracted. In this embodiment, the refractive indexes are n1=1.75, n2=1.52 and n3=1.50, but these figures are examples only. The necessary condition is that either the on-state refractive index or the off-state refractive index of the liquid crystal be close to the refractive index of the polymer layer.

Also in this embodiment, the material which exhibits variable refractive indexes was a nematic liquid crystal, but it is not restricted to this material, and other possible materials include field-dependent polymeric liquid crystal material or highly dielectric liquid crystal material. The raw material used for making the polymer material was LUXTRAK™ LCR 208, but it is also not limited to this material. It is necessary that the polymer material be light hardenable.

Embodiment 2, 3, 4 and 5

The first embodiment demonstrated that the optical device of the present invention is capable of converging the incident light. Using this principle, it is possible to devise a number of other useful optical devices depending on the arrangement and the configuration of the optical elements.

Figure 11:
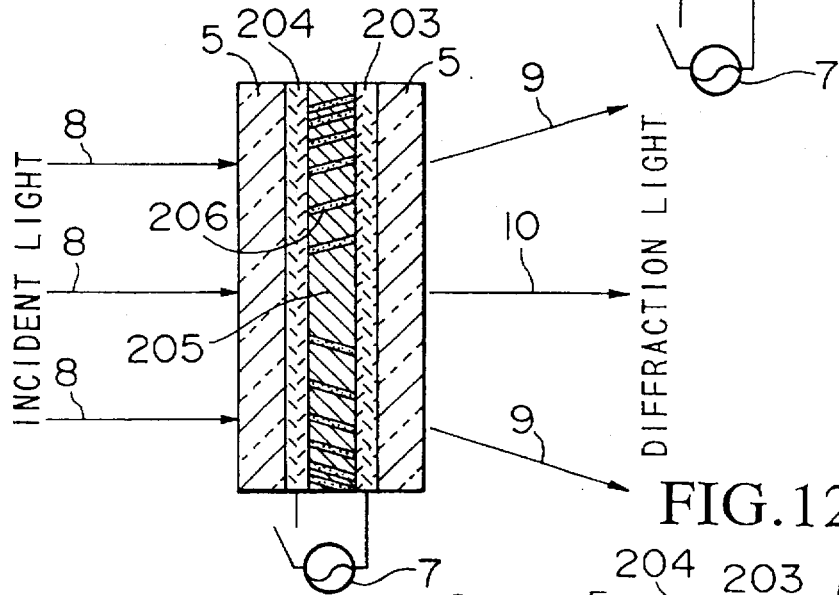
FIG. 11 is a schematic illustration of the optical device of the present invention to generate diverging light from parallel incident light.

The embodiment 2 illustrated in FIG. 11 is an application to diverge the incident light 8. It will be noted that the optical elements, alternating layers of the polymer layer 205 and the liquid crystal layer 206, are inclined at an angle to the incident light so as to diverge the incident light.

Figure 12:
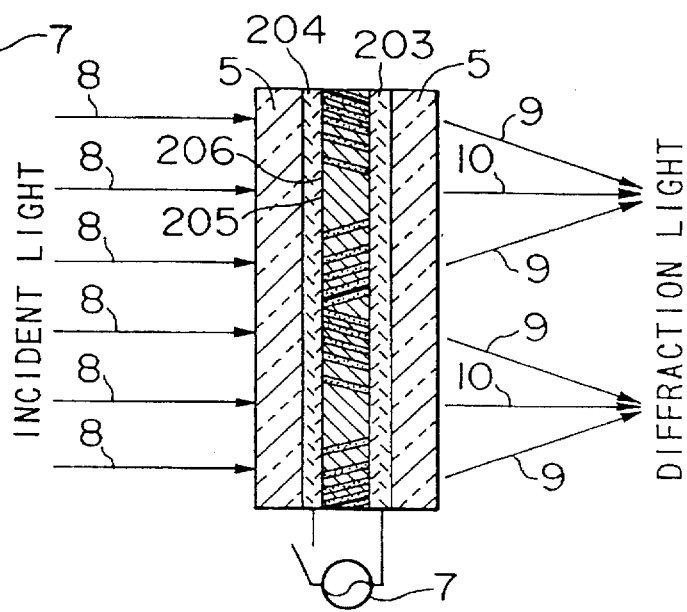
FIG. 12 is a schematic illustration of the optical device of the present invention to generate a plurality of converging light from parallel incident light.
Figure 13:
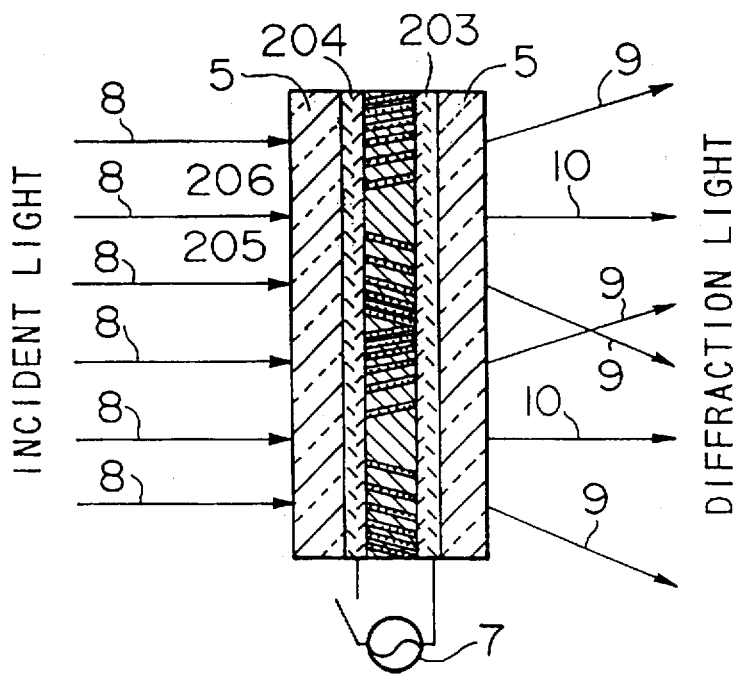
FIG. 13 is a schematic illustration of the optical device of the present invention to generate transmission, diverging and converging output light from parallel incident light.

The embodiments 3 and 4, illustrated in FIGS. 12 and 13 are capable of providing a plurality of regions in one device to, respectively, converge or diverge the incident light.

Figure 14:
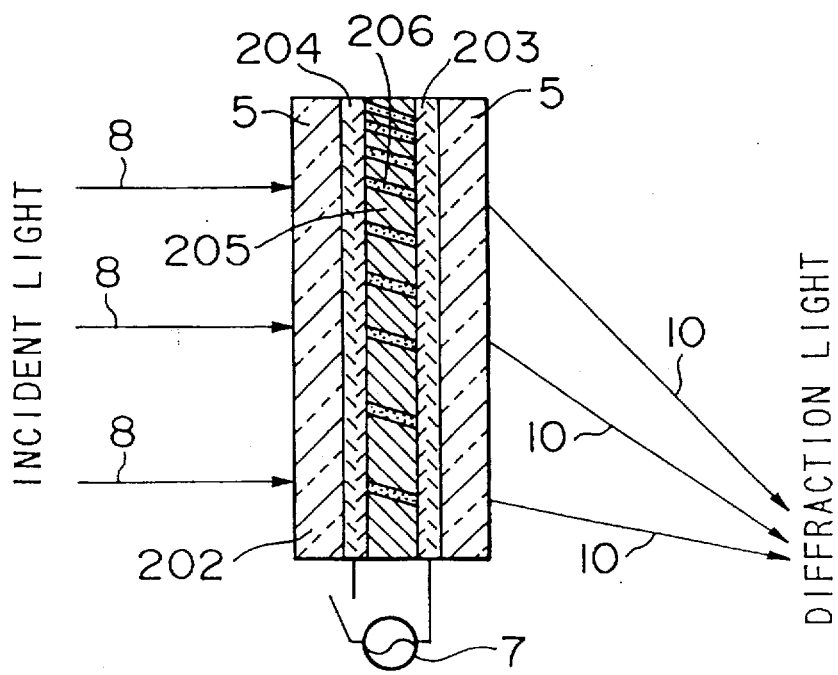
FIG. 14 is a schematic illustration of the optical device of the present invention to generate output light which converges off-center of the optical device.

The embodiment 5 illustrated in FIG. 14 is capable of providing all three modes of diffraction, i.e., divergence, convergence and transmission of incident light. It is also possible to make the convergence point of the light off-center by providing asymmetrical inclination of the optical elements, alternating layers of 205, 206.

Figure 15A:
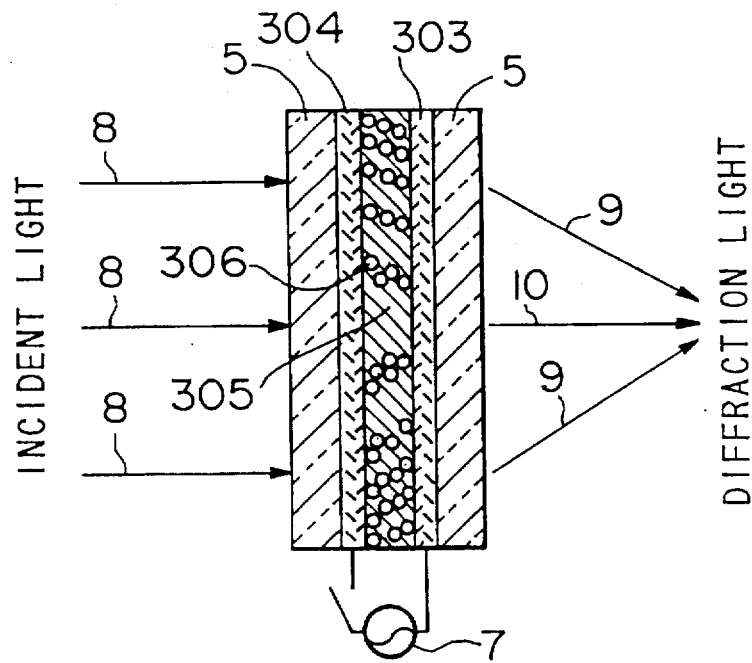
FIG. 15 (A) is a schematic illustration of the optical device of the droplet configuration which has uniform sized droplets.
Figure 15B:
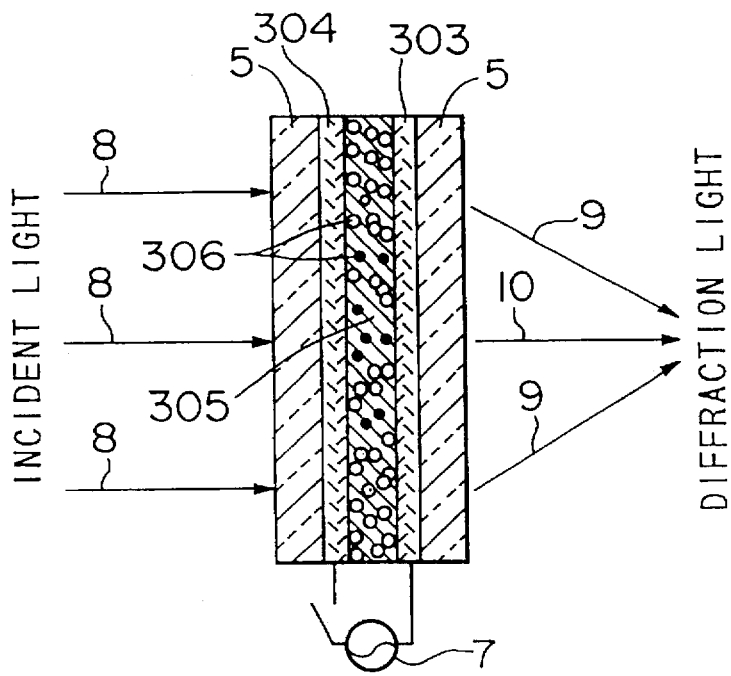

In the above embodiments, the periodicity in the refractive indexes was provided by a layer configuration. Possible configurations are not limited to layers, and other possible configurations include droplet regions of liquid crystal material dispersed in the matrix of polymer material. Examples are shown in FIGS. 15 (A) and 15 (B). The regions of droplets may be formed with uniform sized droplets of liquid crystal 306 as shown in FIG. 15 (A) or with non-uniform sized droplets of liquid crystal 306 illustrated by open circles and small dots in FIG. 15 (B), so long as the refractive indexes are distributed as shown in FIG. 10.

Figure 16A:
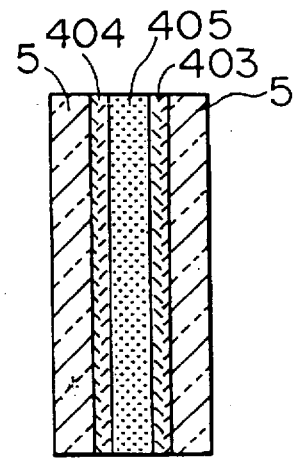
FIG. 16 (A) is a schematic illustration of a step in a method for making the optical device of the present invention.
Figure 16B:
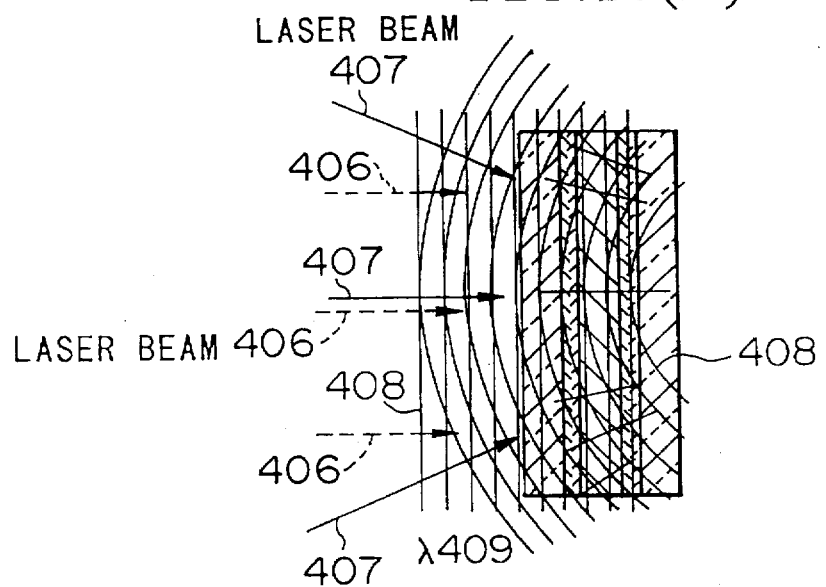
Figure 16C:
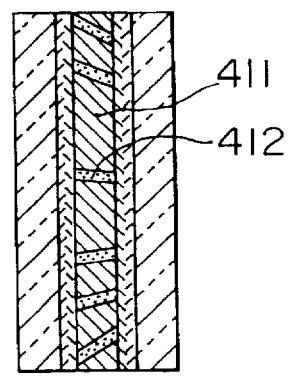

The optical devices of the embodiments 2 to 5 can be produced by the following methods, shown in FIGS. 16 (A), 16 (B) and 16 (C).

As shown in FIG. 16 (A), a mixture solution 405, containing a light hardenable polymer material (LUXTRAK™ LCR 208) and a nematic liquid crystal (MERCK E-7), is placed between a pair of transparent electrodes 403, 404 made by depositing a thin film of ITO of 500 Å thickness on a glass substrate material. The mixture solution 405 is irradiated with parallel laser beams 406 and converging laser beams 407, as shown in FIG. 16 (B). The two laser beams 406, 407, emitted from argon lasers of 488 nm wavelength, interact with each other to produce an interference pattern IP in accordance with the wavefront 408 and the wavelength 409. The interference pattern IP is determined unambiguously by the intensity and the direction of the laser beam 406 or 407. In other words, the interference pattern IP reproduces the intensity and the direction of the laser beam in the mixture solution 405, and as shown in FIG. 16 (C), the polymer material hardened in the regions of high intensity precipitated the liquid crystal material in the regions of weak intensity. The resulting interference pattern IP was produced by gathering of the liquid crystal material in the regions of weak intensity, thus producing a configuration, shown in FIG. 16 (C), in which the liquid crystal layer 412 is separated from the polymer material layer 411.

Therefore, according to the method for producing an optical device of the present invention, a three dimensional pattern of a periodic spacing, to correspond with the wavelength of a desired color, can be produced in the device material by irradiating a mixture solution containing a light hardenable polymer material and a liquid crystal material with laser light. Also, the direction of the output light can be varied by changing the direction of irradiation of the laser light on the mixture solution.

Figure 17A:
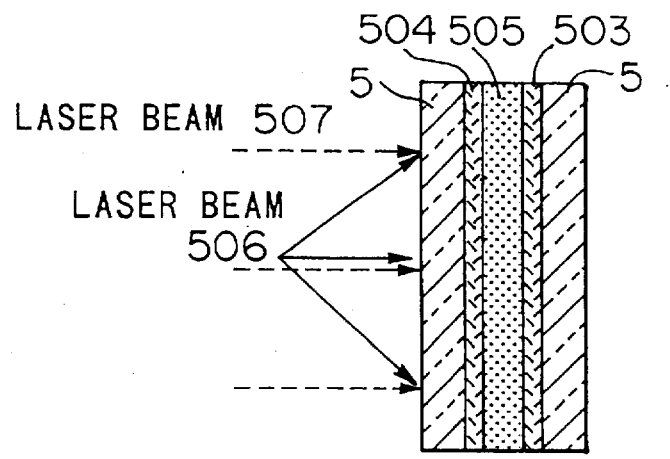
FIG. 17 (A) is a schematic illustration of a method of directing the processing laser beams to the mixture solution to produce the device shown in FIG. 11.
Figure 17B:
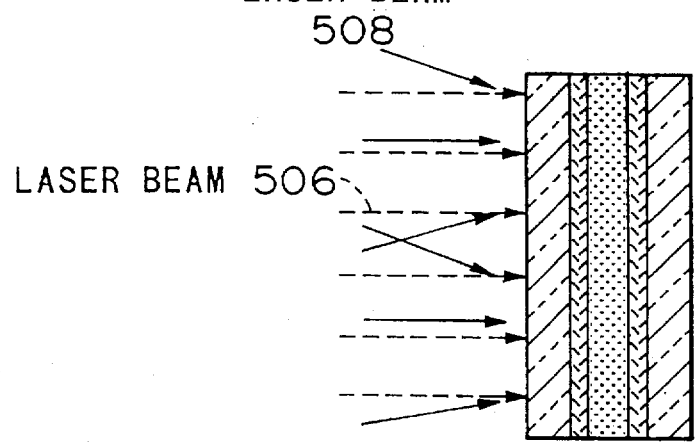
Figure 17C:
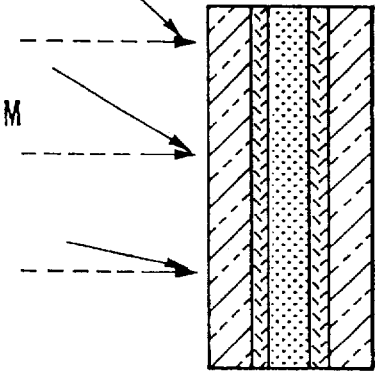

Summarizing the method presented above, it can be seen that the optical device presented in FIG. 11 can be produced by the method of laser irradiation illustrated in FIG. 17 (A); and the optical device presented in FIG. 12 by the method illustrated in FIG. 17 (B); and the optical device presented in FIG. 14 by the method illustrated in FIG. 17 (C).

Embodiment 6

Figure 18:
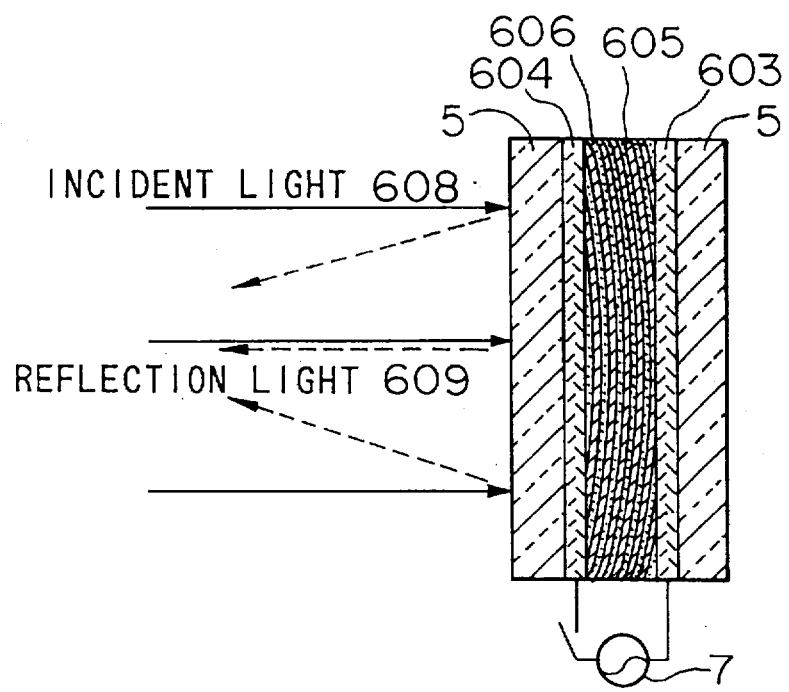
FIG. 18 is a schematic illustration of the optical device of the present invention to generate converging reflection light.

The sixth embodiment relates to an optical device, shown in FIG. 18. The structure of the paired layer is similar to that in the previous embodiments, the only difference being the shape of the optical element. The incident light falls on curved optical elements shaped like a concave mirror.

The device shown in FIG. 18 comprises a pair of transparent electrodes 603, 604, and the off-state refractive index of the liquid crystal 606 is n=1.75. The refractive index of the polymer material 605 is n3=1.50, and the structure is composed of the alternating indexes n3/n1/n3 ... n3/n1/n3. Therefore a light component of a specific wavelength in the incident light 8 will be reflected in accordance with Bragg reflection. Because the optical elements, alternating layers of 605, 606 are curved, the incident parallel light is not only reflected but can be converged. When the field is applied between the electrodes 603, 604, the on-state refractive index of the liquid crystal 606 becomes n2=1.52, and the device assumes a configuration of n3/n2/n3 ... n3/n2/n3 (where n2=1.52 and n3=1.50), thus nearly eliminating the difference in the indexes. Therefore, the reflection was nearly eliminated, and the incident light 8 was able to proceed through the device.

In this embodiment, the indexes were chosen to be n1=1.75, n2=1.52 and n3=1.50, but they are not restricted to these values. It is necessary that one of either the on-state index or the off-state index is close to the refractive index of the polymer material. Also, as in the previous embodiments, the liquid crystal material is not limited to nematic crystal. Other materials include polymeric liquid crystal and highly dielectric liquid crystals whose refractive index can be changed by electrical field.

The embodiment was concerned with the case of converging the incident light, but it is clear that optical devices which exhibit other modes of light propagation can be realized by choosing the structure of the optical element appropriately.

Embodiments 7, 8, 9 and 10

Figure 19:
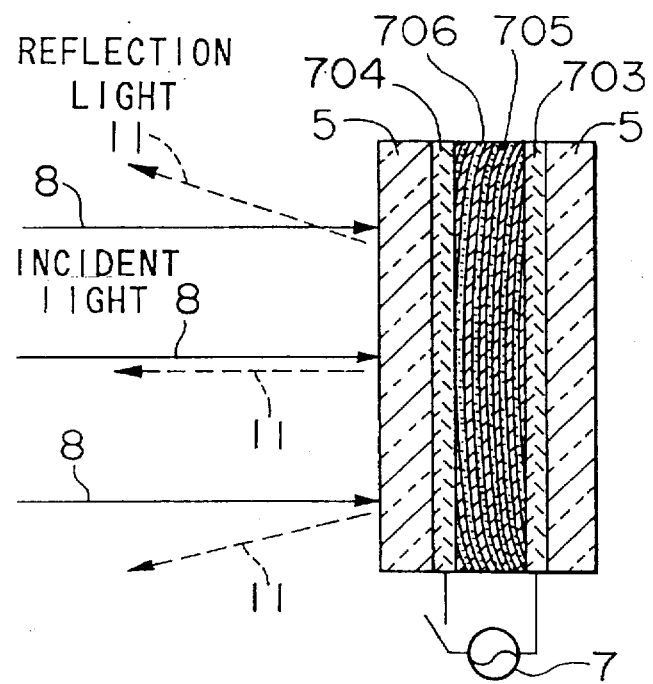
FIG. 19 is a schematic illustration of the optical device of the present invention to generate diverging reflection light.
Figure 20:
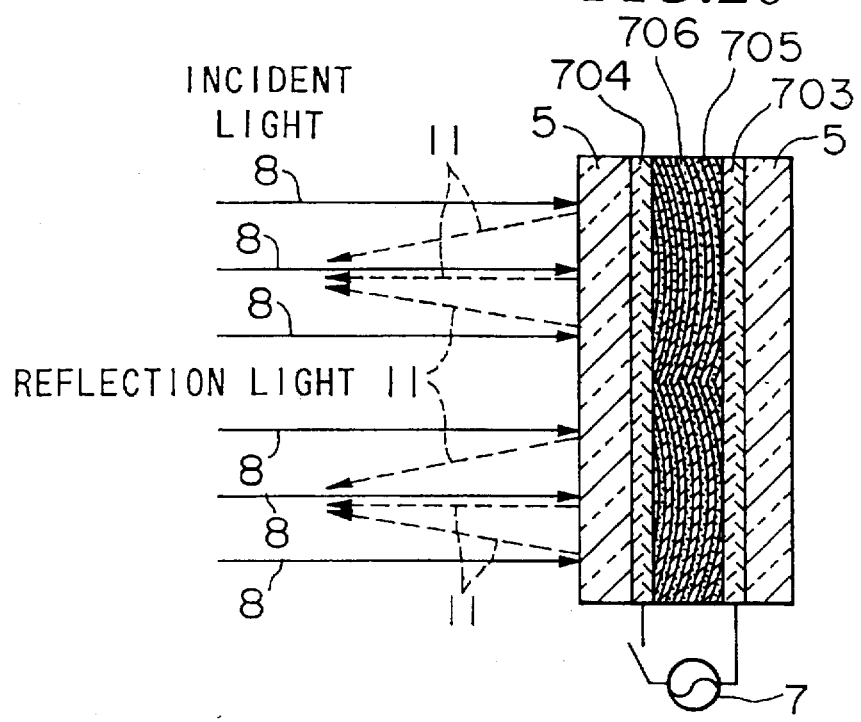
FIG. 20 is a schematic illustration of the optical device for generating a plurality of converging reflection light.
Figure 21:
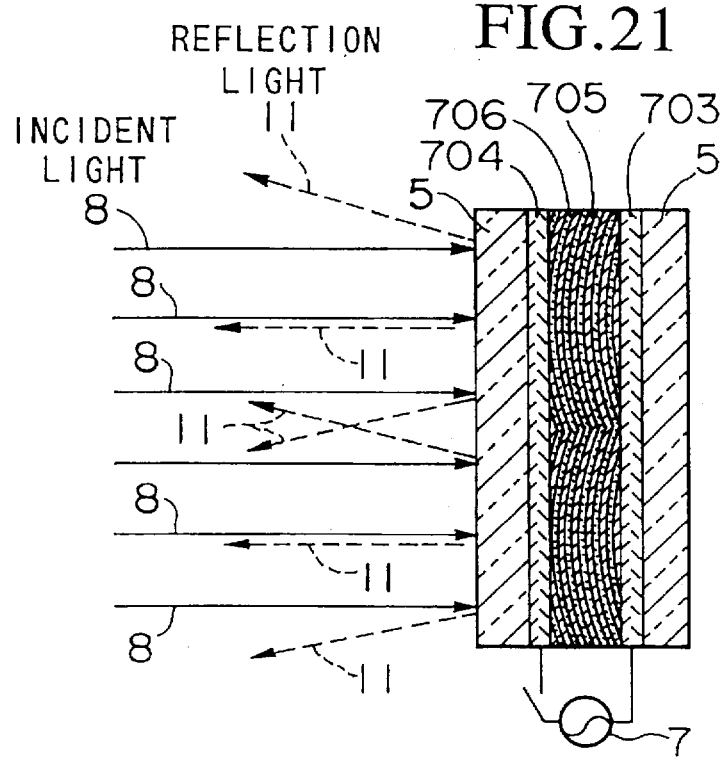
FIG. 21 is a schematic illustration of the optical device for generating normal, converging and diverging reflection light.
Figure 22:
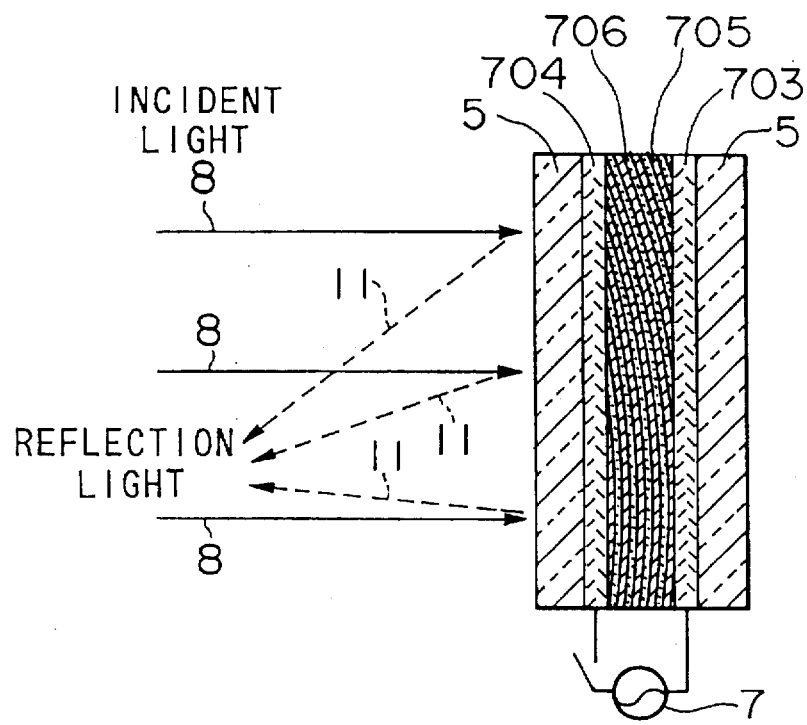
FIG. 22 is a schematic illustration of the optical device for generating off-center reflection light.

The optical device shown in FIG. 19 causes the parallel incident light 8 to become diverging reflection light. The device shown in FIG. 20 provides a plurality of regions of converging reflection light. The device shown in FIG. 21 provides a plurality of regions of diverging light. The device shown in FIG. 22 reflects incident light so as to converge away from the center of the device. It is also clear that the same modes of light propagation as presented above can be provided by the droplet configuration of the optical element having alternating refractive indexes.

Figure 23:
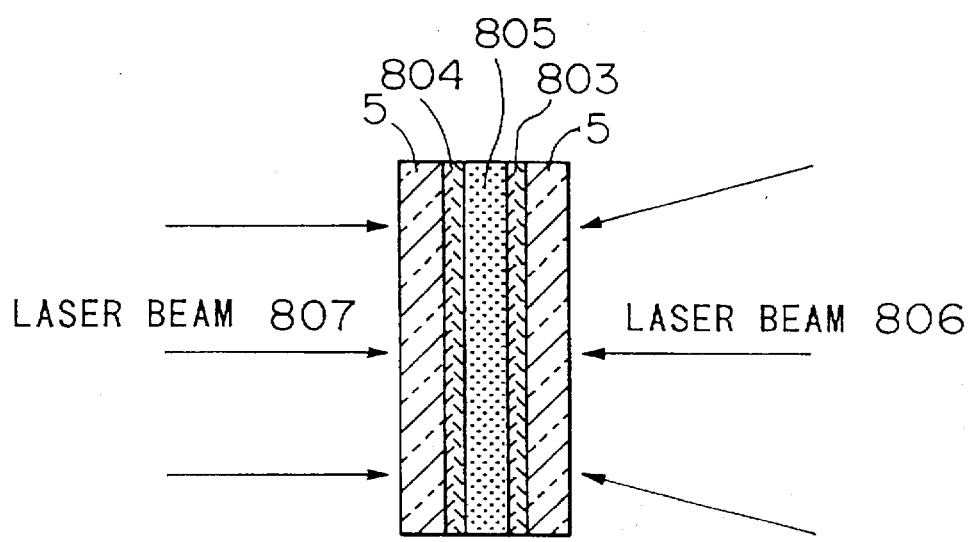
FIG. 23 is a schematic illustration of a method for making the optical device to generate converging reflection light.
Figure 24A:
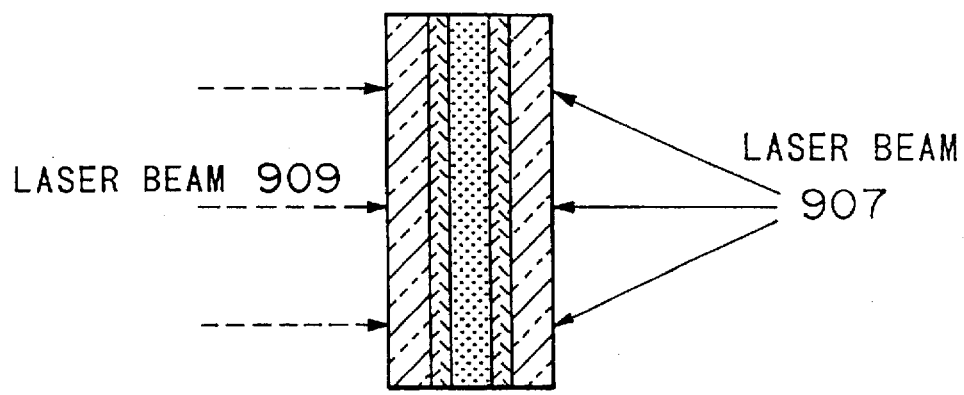
FIG. 24 (A) is a schematic illustration of a method for making the optical device shown in FIG. 19.
Figure 24B:
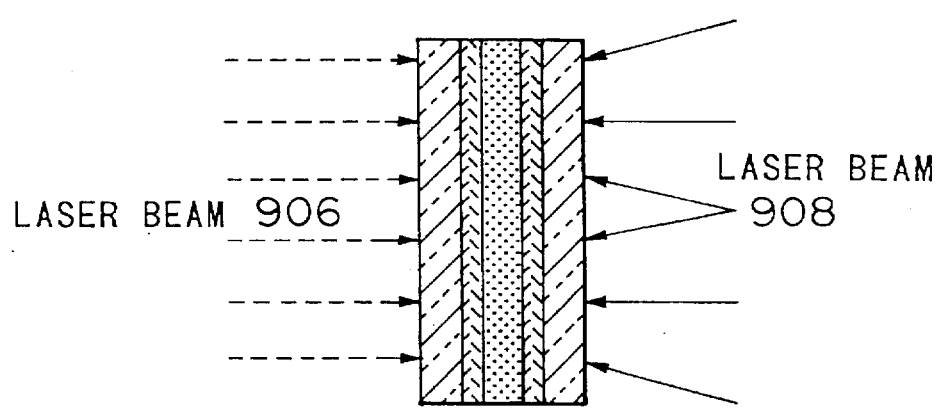
Figure 24C:
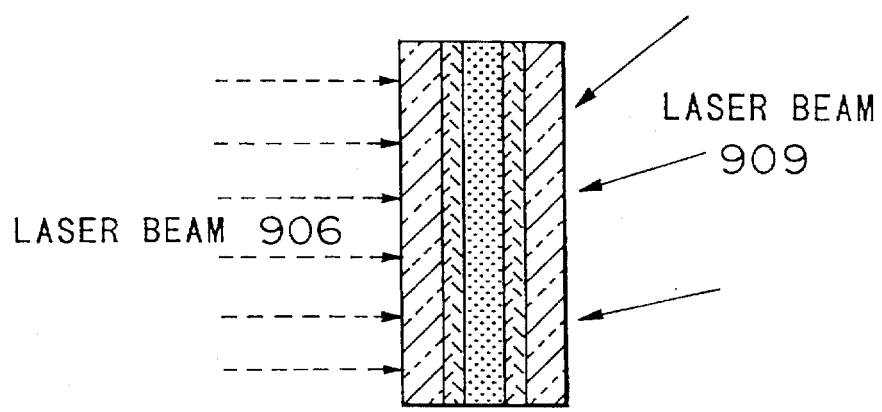

FIG. 23 is a schematic illustration of the method of producing the optical device of the present invention. The method is similar to those described for making the optical devices presented in embodiments 1-5. A suitable three dimensional interference pattern is generated by irradiating laser beams on a mixture solution of polymer and liquid crystal materials. For example, the device shown in FIG. 18 can be produced by the method illustrated in FIG. 23; the device shown in FIG. 19 by the method in FIG. 24 (A); the device shown in FIG. 20 by the method in FIG. 24 (B); and the device shown in FIG. 22 by the method in FIG. 24 (C).

Embodiment 11

Figure 25:
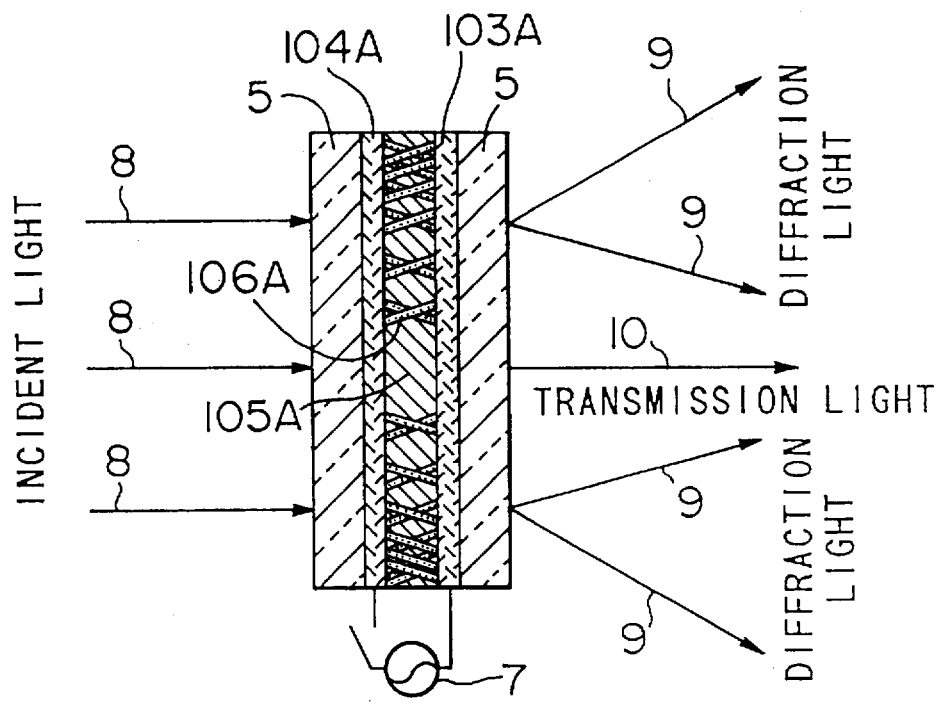
FIG. 25 is a schematic illustration of the optical device having two capabilities of normal transmission and diverging output light in one optical device.
Figure 26:
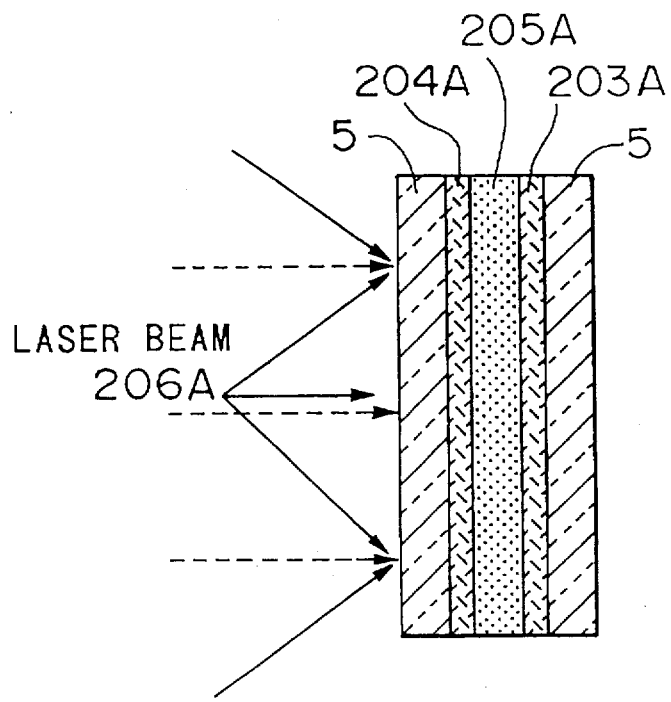
FIG. 26 is a schematic illustration of a method for producing the optical device shown in FIG. 25.

FIG. 25 shows an optical device according to embodiment 11. The optical device is provided with two kinds of optical elements in one device, one for divergence and one for convergence. Therefore, the parallel incident light 8 is transmitted and propagated in a plurality of directions. FIG. 26 illustrates the method of making the optical device of the eleventh embodiment. In this method, laser beams are directed to a mixture solution 205A from three directions: a direction parallel to the incident light; a converging direction; and a diverging direction. Interference patterns are produced according to the interferences generated by these laser beams, and the polymer material hardens where the laser intensity is high and the liquid crystal material is precipitated in accordance with the interference patterns to produce the device shown in FIG. 25.

Embodiment 12

Figure 27:
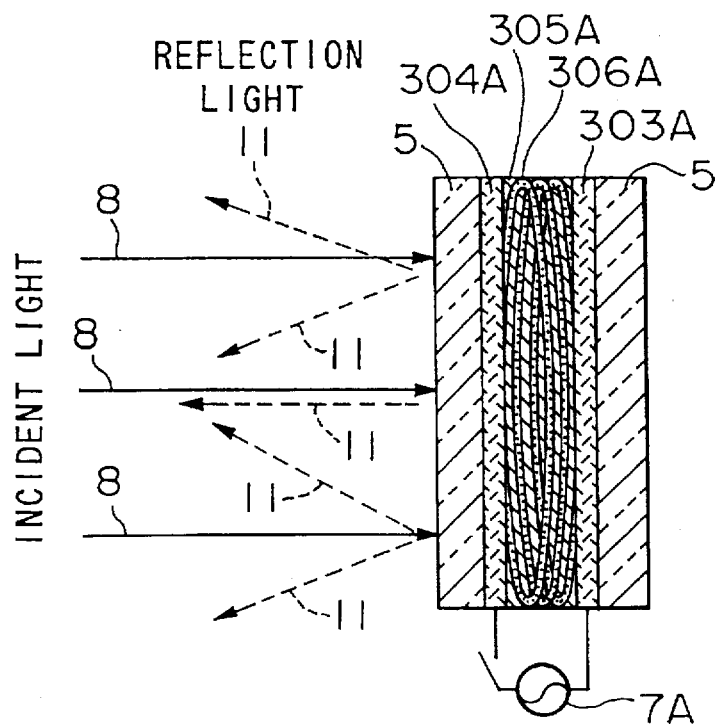
FIG. 27 is a schematic illustration of an optical device for generating normal and diverging reflection light.
Figure 28:
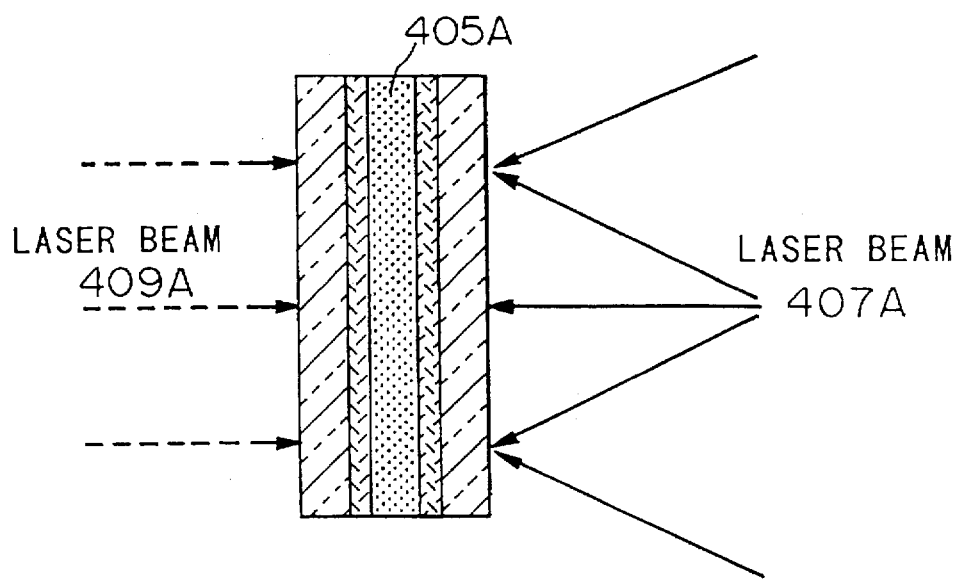
FIG. 28 is a schematic illustration of a method for producing the optical device shown in FIG. 27.

FIG. 27 shows an optical device according to embodiment 12. This device is provided with two kinds of optical elements in one device. The one optical element generates diverging reflection of incident light 8 and the other optical element generates converging reflection. The result is that the incident light is reflected in a plurality of directions. FIG. 28 illustrates the method of making the device of embodiment 11. A mixture solution 405A containing a polymer material and a liquid crystal material is irradiated with laser beams from three directions: a direction parallel to the incident light; a converging direction; and a diverging direction. Interference patterns are produced according to the interferences generated by these laser beams, and polymer material hardens where the laser intensity is high and the liquid crystal material is precipitated in accordance with the interference patterns to produce the device shown in FIG. 27.

Embodiment 13

Figure 29:
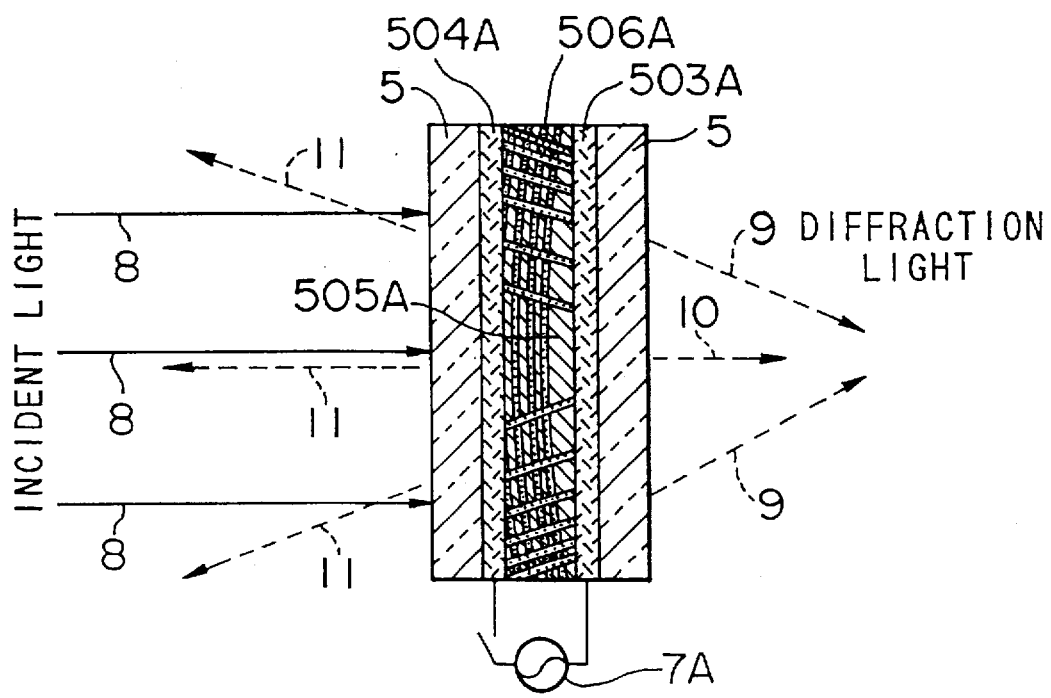
FIG. 29 is a schematic illustration of an optical device for generating diverging output light and converging output light.
Figure 30:
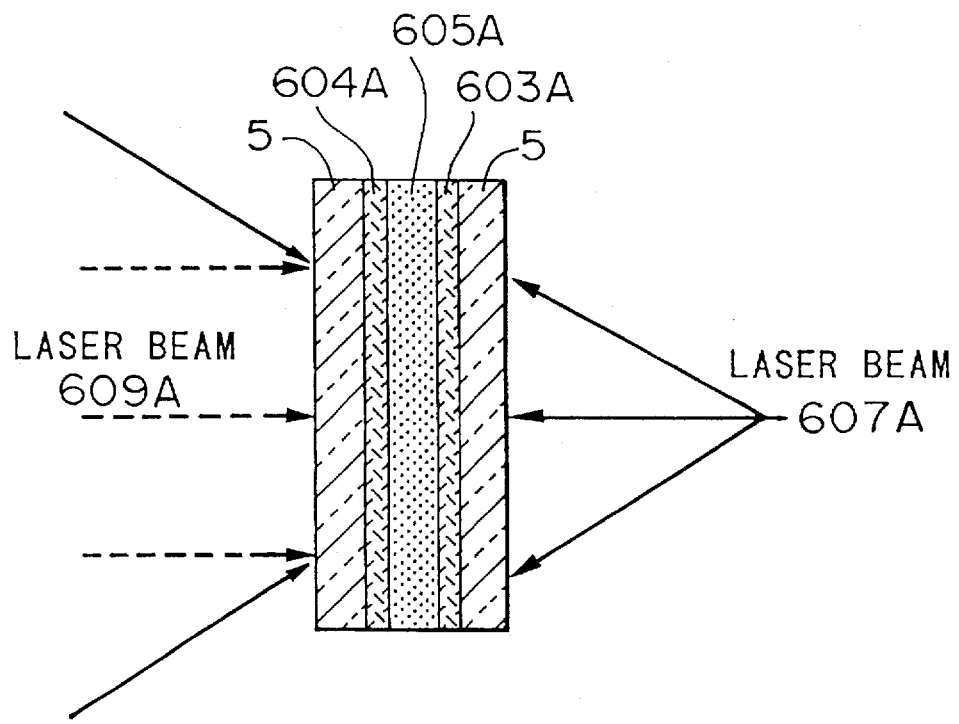
FIG. 30 is a schematic illustration of a method for producing the optical device shown in FIG. 29.

FIG. 29 shows an optical device according to Embodiment 13. The device is provided with two types of optical elements: a diverging optical element; and a converging optical element, so as to produce reflection light and converging transmission light. FIG. 30 illustrates the method of making the device of embodiment 13. To a mixture solution 605A, laser is irradiated from three directions: a direction parallel to the incident light; a converging direction; and a diverging direction. The beams are directed from one side of the solution 605A for the first two beams, and from the surface opposite to the above surface. The interference pattern produced by these laser beams generate hardening of the polymer material and precipitation of the liquid crystals material to produce the device shown in FIG. 29.

In the above embodiment, one device was provided with two kinds of diffracting elements. However, it is also possible to provide more than two optical elements in one device, by utilizing a plurality of lasers from a plurality of directions. Such a device would be able to generate outgoing light in a plurality of directions, in addition to reflecting the incident light.

Embodiment 14

Figure 31:
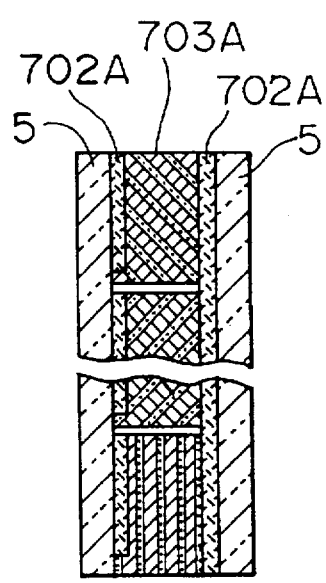
FIG. 31 is a schematic illustration of a planar arrangement the optical device of the present invention.

FIG. 31 shows an optical device of embodiment 14. This device comprises: a pair of transparent glass bases 5; a optical elements 703A made of a polymer material and a liquid crystal material disposed between a pair of electrodes 702A of a matrix-driven type. A plurality of optical devices of the type described in the previous embodiments are placed horizontally on a common electrode, and are controlled by the separate opposing electrodes which are electrically isolated from each other. Therefore, a plurality of optical devices can be controlled independently to provide various modes of light propagation, such as transmission through, diffraction and reflection from the optical device.

Embodiment 15 and 16

Figure 32:
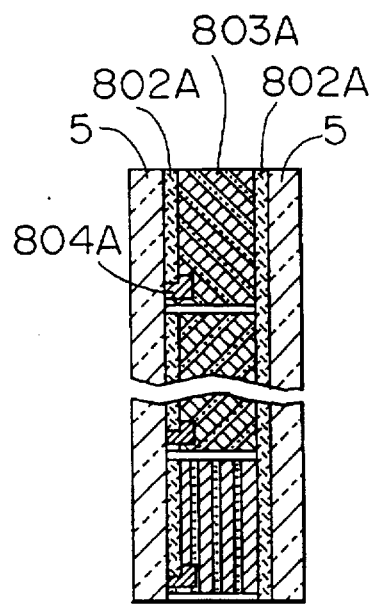
FIG. 32 is a schematic illustration of an optical device of the present invention of the active matrix driven type.
Figure 33:
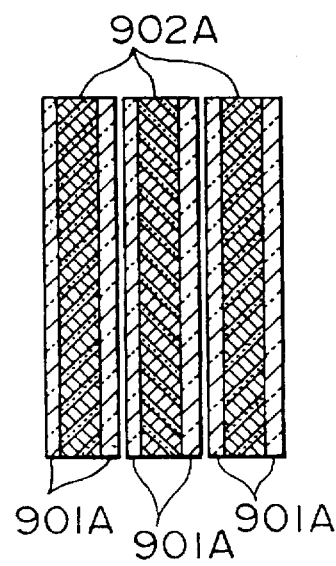
FIG. 33 is a schematic illustration of a stacked arrangement of the optical device of the present invention.

FIG. 32 shows embodiment 15 which has a similar layout to embodiment 14 of the optical device on the glass substrate, except that the device is operated by thin film devices 804A, such as thin film transistors (TFT) or thin film diodes, i.e. they are active matrix devices. In embodiment 16 shown in FIG. 33, the optical devices of the present invention 902A are arranged in a stacked structure, and the devices are operated independently by separate pair of transparent electrodes 901A. This type of device layout provides further flexibility in the operational capabilities of the optical devices.

In the above embodiments, a nematic liquid crystal was used, but other polymeric or highly dielectric liquid crystals having electrical field dependent refractive index can be utilized. Interference patterns in the mixture solution was generated by an argon laser, but other coherent light sources to produce an interference phenomenon can be utilized. The polymer material is not limited to LUXTRAK™ LCR 208, and other light polymerizable polymer materials can also be used.

(IV) Application of the Optical Devices for Generating Output Light of Specific Wavelengths, and Optical Display Apparatuses Based on the Optical Device.

The optical devices presented so far were designed to reflect back parallel incident light falling on a periodic spacing of alternating optical elements. Reflection or transmission of parallel incident light was controlled by selecting the refractive index of the liquid crystal material so as to match or mismatch the refractive index of the liquid crystal material with that of the polymer material.

The following embodiments of the optical devices of high reflectivity are able to provide reflection of multi-directional (non-parallel) incident light entering the device. When multi-directional incident light of a specific wavelength enters the device of this embodiment, light of the same specific wavelength is reflected back in a specific direction. When the incident light having a plurality of wavelengths enters the device of this embodiment, the device reflects back a specific wavelength in a specific direction. Based on this principle, the device is also capable of reflecting back an image pre-recorded in the optical device.

It is also an object of this embodiment to present examples of optical apparatus based on the optical device of this embodiment.

Embodiment 1

Figure 34:
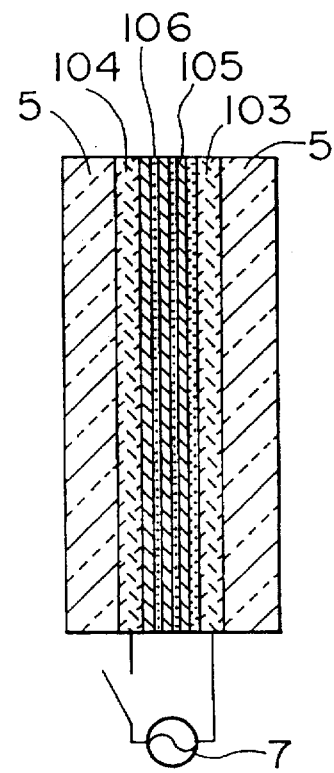
FIG. 34 is a schematic illustration of an optical device having optical elements to control the reflection direction of the output light or the wavelength of the output light.

FIG. 34 shows the basic structure of the device of embodiment 1 of the present invention. The basic structure of the optical device is similar to the periodic arrangement of the optical elements presented in earlier embodiments. The refractive index of the polymer material layer 105 is n3=1.47 (LUXTRAK™ LCR 509A), and the refractive index for the liquid crystal layer 106 (nematic crystal MERCK E-7) can be varied between n1=1.75 and n2=1.52 by the application of electrical field. The refractive indexes are controllable to any value within these limits by the applying the field between the transparent electrodes 103, 104.

When an electrical field is applied to such an optical device, the refractive index of the liquid crystal layer 106 changes. However, because the lower limit of the index of the liquid crystal layer (n2=1.52) is not equal to the index for the polymer layer (n3=1.47), the field does not eliminate the multilayer structure of the device, and the transmission of the incident light cannot take place. The field does alter the effective refractive index of the optical device, however, because the refractive index of the device now consists of a combination of indexes, 1.47 and 1.75/1.52, in going from the polymer layer to the liquid crystal layer. This means, in effect, that the application of the field alters the effective inter-element spacing, which can be expressed by a product of the actual thickness of the liquid crystal layer $d_{lc}$ and the refractive index of the liquid crystal $n_l$. In practice, this is represented by $(n_{lc} \cdot d_{lc} + n_p \cdot d_p)$ where the subscript p refers to the polymer material.

The device of the above configuration, therefore, has a field dependent inter-element spacing, and the structure reflects back light in accordance with the periodicity of the device structure, in a manner similar to the phenomenon of Bragg reflection of X-rays from a periodic atomic configuration. This will be demonstrated in the next two embodiments.

Embodiment 2

Figure 35:
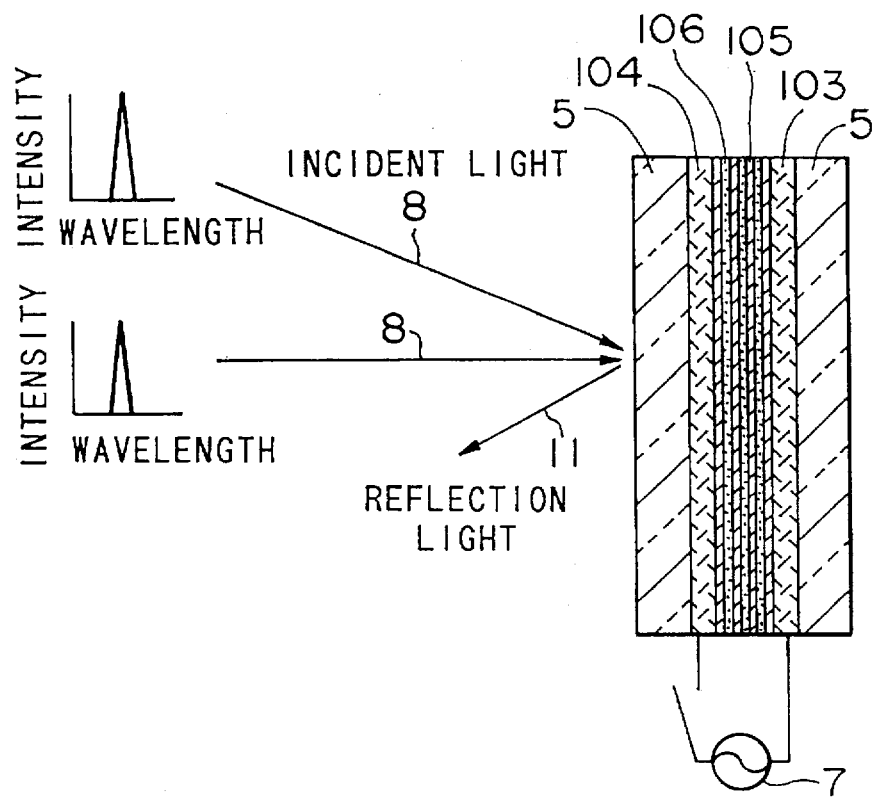
FIG. 35 is a schematic illustration of an optical device to control the reflection direction of incident light of a specific wavelength.

FIG. 35 shown a second embodiment of the present invention. In this device, the incident light 8 of a specific wavelength is directed to the device from two directions. In the off-state of the device, the device reflects back light 11 of the same wavelength only in a specific direction in accordance with the Bragg law of reflection.

Embodiment 3

Figure 36:
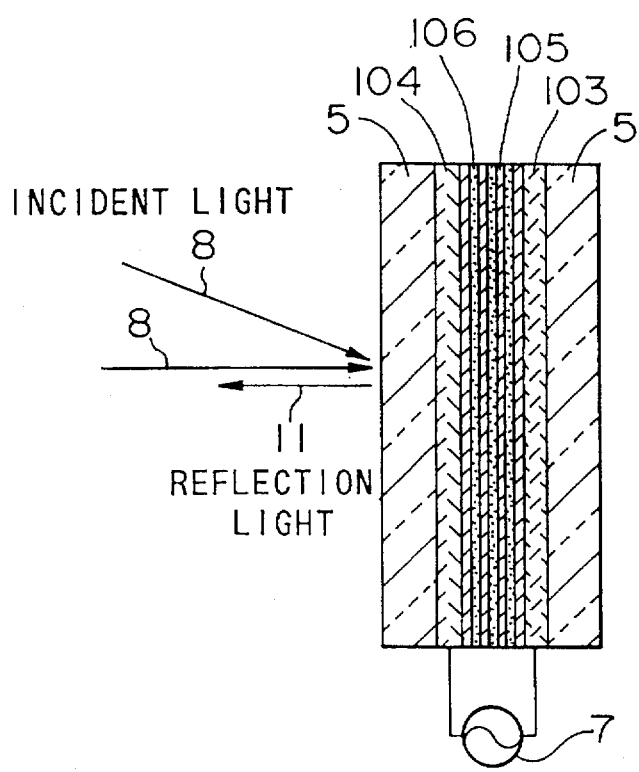
FIG. 36 is a schematic illustration of an optical device to control the reflection direction of the output light.

FIG. 36 shows the on-state of the same device shown in FIG. 35. The application of the field alters the inter-element spacing of the device, and the incident light 8 and the reflection light are governed by a strict rule of Bragg reflection. For example, when the device comprises a polymer layer 105 of thickness $d_p$=83.0 nm with refractive index of $n_p$=1.47, and the liquid crystal layer 106 of a layer thickness $d_{lc}$=80.3 nm, this device produces reflection light 11 depending on the angle of incidence of the incident light 8. For example, when the refractive index is n1=1.7, the incident light 8 (488 nm from an argon laser) with the incident angle of θ=21°, generated reflected reflection light 11 of high intensity. On the other other hand, when the refractive index was adjusted to be n2=1.52, incident light 8 entering the device at θ=0° was reflected. By adjusting the refractive index of the liquid crystal material suitably, the reflection angle could be changed to any value between these limits.

Embodiment 4

Figure 37:
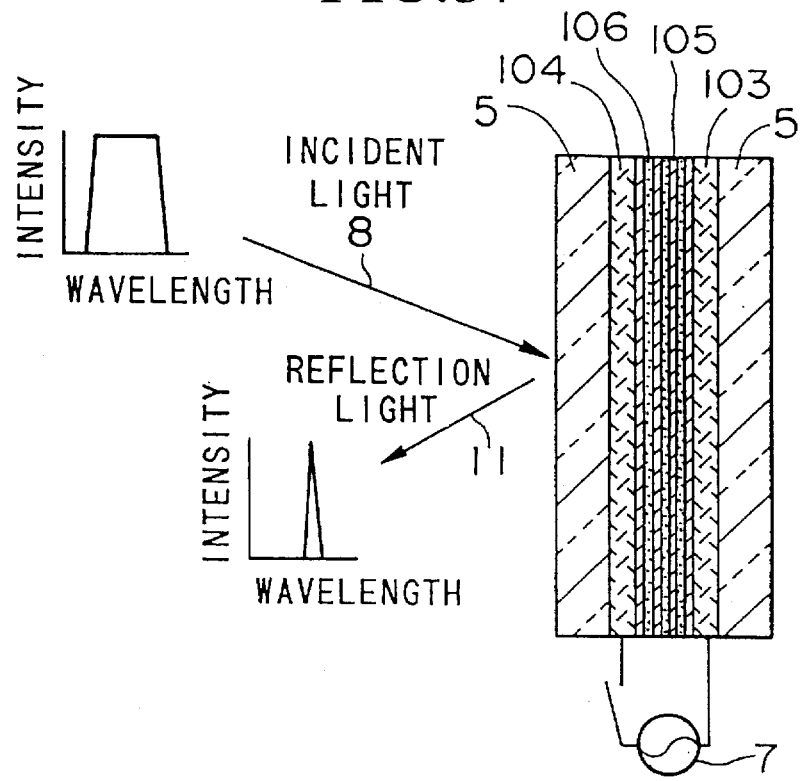
FIG. 37 is a schematic illustration of the off-state of the optical device shown in FIG. 37 to generate reflected light of a specific wavelength.

FIG. 37 shows a case of irradiating the device of this invention with white incident light 8. In the off-state condition, this device produced reflection light 11 of a specific wavelength.

Embodiment 5

Figure 38:
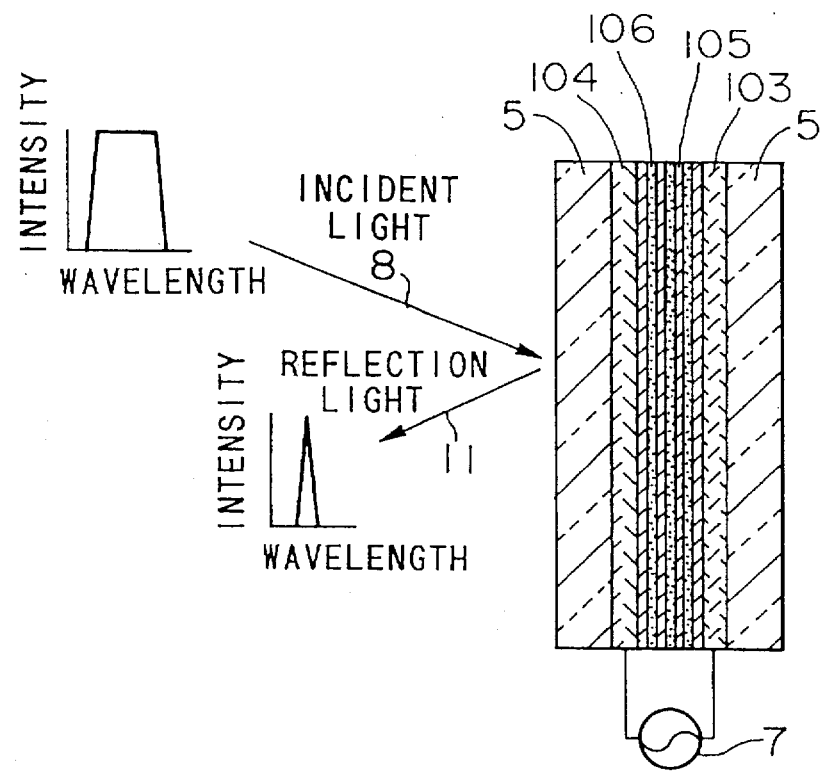
FIG. 38 is a schematic illustration the on-state of the optical device shown in FIG. 37 to generate reflected light of another wavelength.

FIG. 38 shows the same device in the on-state. The Bragg reflection condition is now different from that shown in embodiment 4, and the reflection light 11 was of a different wavelength.

As demonstrated in embodiments 4 and 5, according to the device of this invention, it is possible to vary the Bragg reflection condition of the device of the present invention, such that the wavelength of the reflection light can be selected depending on the magnitude of the electrical field applied to the transparent electrodes 103, 104. For example, the device having $d_p$=83.0 nm, $n_p$=1.47 for the polymer layer 105; and $d_{lc}$=80.3 and $n_{lc}$=1.75 for the liquid crystal layer 106, white incident light 8 entering the device at θ=0° produced high intensity reflection light 11 of 525 nm. When the value of n was changed to 1.52 with all other conditions remaining the same, the device reflection light 11 of 488 nm wavelength.

Embodiment 6

It has been demonstrated in sections (I) to (III) that the mixture solution consisting of a liquid crystal material and a light hardenable polymer material is able to generate a three dimensional pattern in accordance with an interference pattern produced by laser beams. Making use of such a phenomenon, a holographic image can be recorded in the device of the present invention.

Figure 39:
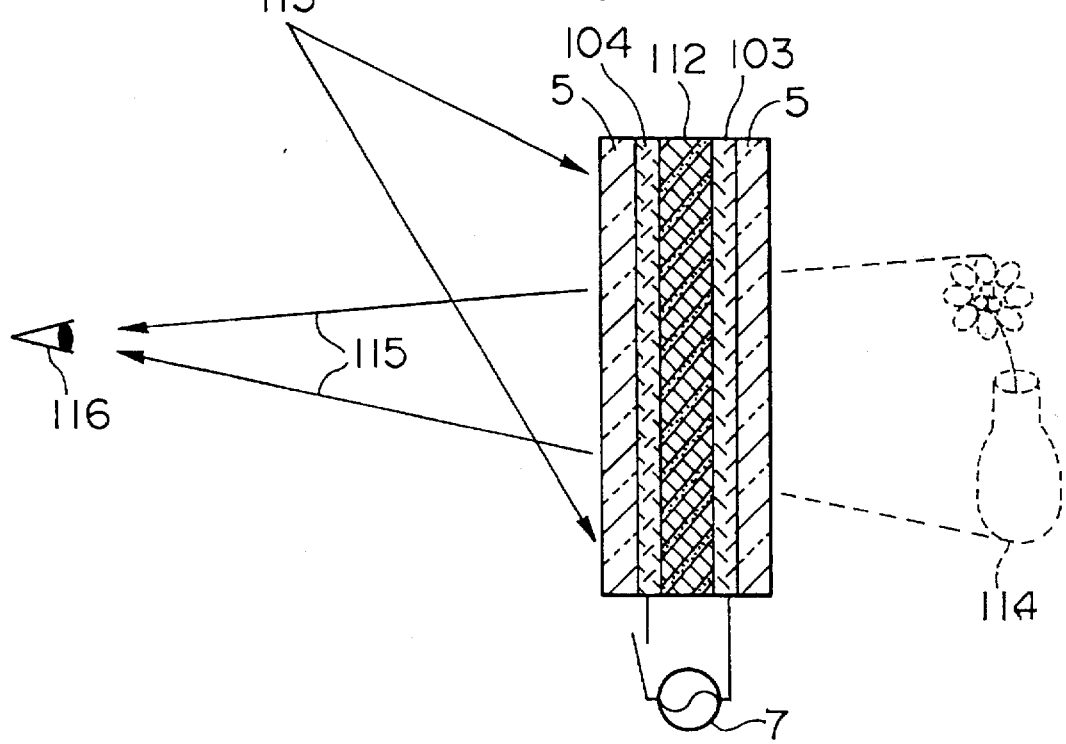
FIG. 39 is a schematic illustration of a holographic optical display apparatus based on the optical device shown in FIG. 34 of the present invention.

FIG. 39 shows an example of such an experiment. In FIG. 39, the device has the usual structure of a plurality of optical elements 112 disposed between a pair of transparent electrodes 103, 104 deposited on glass substrate bases 5, and connected to an electrical source 7. An object 114 to be recorded on the optical elements 112 is radiated with an object beam and a reference beam from an argon laser of 488 nm output beam so as to register and pre-record its image 114' (not shown) in the optical elements 112. Under the ambient white light, the eye 116 viewing the optical device is able to observe a holographic image 114' formed by the wavelength of 488 nm behind the device, as illustrated. The wavelength of the output light can be altered by adjusting the refractive index of the liquid crystal material by applying electrical field. The position of the holographic image can be adjusted so that the pre-recorded image 114' will appear to be within the optical elements 112, in front or behind the optical elements 112.

In this embodiment, the polymer material used was LUX-TRAK™ LCR 509A, and the liquid crystal material used was MERCK E-7. The materials for making the device of the present invention are not limited to these materials, and it is necessary that the liquid crystal material to be have electrical field-dependent index of refraction, such that the orientation of the liquid crystal molecules be adjustable by the application of electrical field. Also a nematic crystal was used, but other types of polymeric or highly dielectric liquid crystals can also be used so long as the index of refraction can be adjusted by the application of electrical field.

Furthermore, the embodiments shown had a layered structure, but the device is not limited to the layered structure. It is necessary that the optical elements be constituted by a material having a refractive index with a material having a refractive index which can be controlled by electrical field.

Also, the pre-recorded image was generated by monochromatic light, but it is not necessary that the object wavelength and the reference wavelength be the same. If a plurality of wavelengths were used to record an image, the output image can be generated based on the angle of incidence or the wavelength of the ambient light.

Embodiment 7

Figure 40:
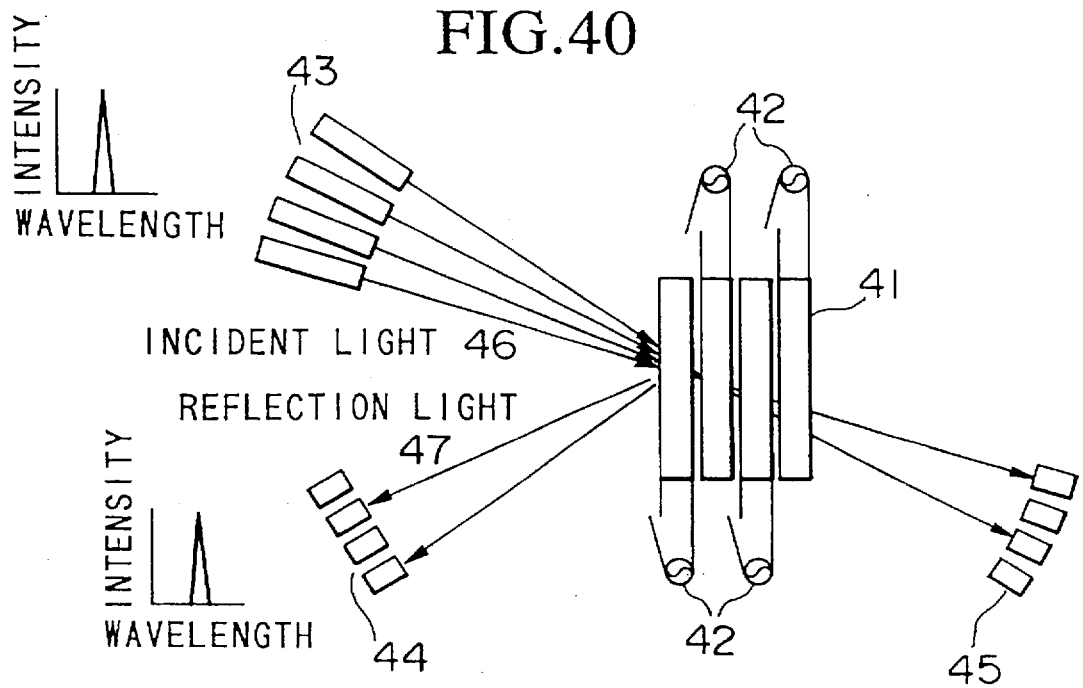
FIG. 40 is a schematic illustration of another optical display apparatus based on the optical device shown in FIG. 34 of the present invention.

FIG. 40 shows an example of a display apparatus based on a plurality of optical devices which can selectively reflect incident light entering the device from a plurality of angles of incidence. The reference numeral 41 refers to the optical device of the present invention; 42 is an electrical source; 43 is a light source, such as fiber optic source, for producing the incident light; 44 is an array of photo-detector devices for receiving the reflection light from the device 41; 45 is an array of photo-detector devices for receiving the transmission light from the device 41; 46 is incident light; and 47 is reflection light.

In the embodiment illustrated, there are four optical devices 41, thus enabling to reflect incident light entering the device 41 from four directions. However, it is clear that this number is illustrative, and any number of such devices can be used depending on the number of incident light being utilized.

Embodiment 8

FIG. 41 shows embodiment 8 which is an optical switching apparatus comprising a plurality of optical devices of the present invention. Multi-wavelength incident light entering the apparatus is separated into reflected light of individual wavelength, as shown in FIG. 41. Electrical field applied to each optical device determines the wavelength of the reflection light to be reflected from the device. The reference numeral 48 refers to the optical device of the present invention; 42 is an electrical source; 51 is a light source, such as fiber optic source, for producing the incident light; 52 is an array of photo-detector devices for receiving the reflected light from the device 48; 49 is incident light; and 50 is reflection light.

In the embodiment illustrated, there are four optical devices 48, thus separately reflecting incident light of four different wavelengths. However, it is clear that this number is illustrative, and any number of such devices can be used depending on the number of wavelengths in the incident light.

Embodiment 9

Figure 42A:
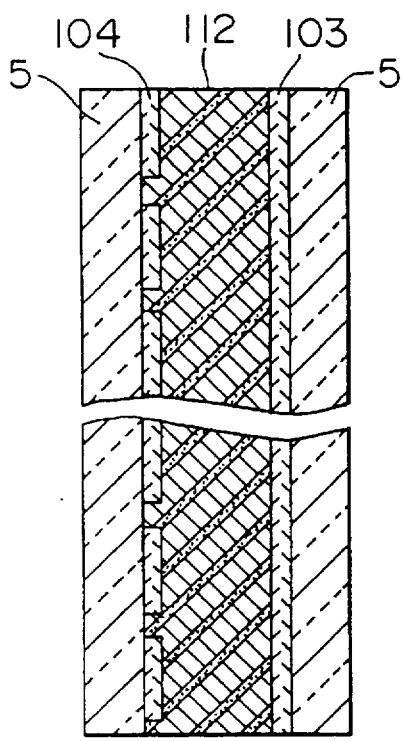
FIG. 42 (A) is a schematic illustration of the simple drive type planar arrangement of the optical devices shown in FIG. 34.
Figure 42B:
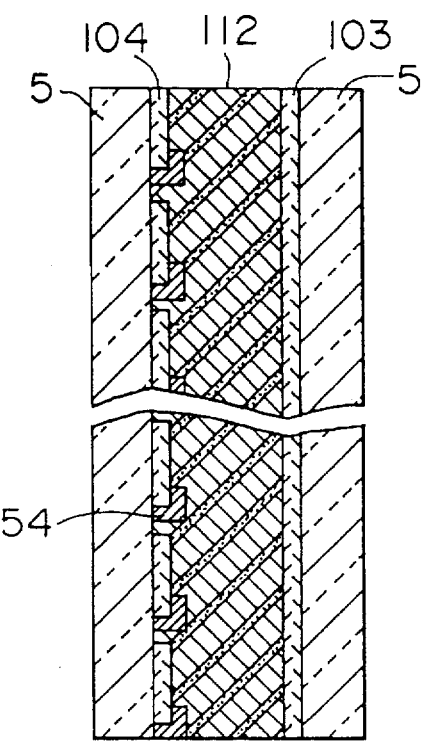

Embodiment 9 is a planar arrangement of the optical devices of the present invention. FIG. 42 (A) shows a plain control provided between a common electrode 103 and individual electrode 104 which provide independent control of the separated optical devices disposed between the respective electrodes. FIG. 42 (B) shows an example of the matrix-driven type device. The device comprises: glass substrate bases 5; transparent electrodes 103, 104; optical elements 112 for reflecting light of a specific wavelength; thin film devices 54, such as thin film transistors, diodes and non-linear resistors. These optical devices function in the same manner: that is, when multi-directional incident light enters the device, light of a specific wavelength is reflected in a specific direction; or when multi-wavelength incident light enters the device, light of a specific wavelength is reflected in a specific direction. The difference between the two types of the planar arrangement is that in the case of the simple drive in FIG. 42 (A), field on- or off-state on the optical elements 112 is controlled directly through the electrodes 103, 104, therefore, any variation in the field will affect the performance of the optical elements 112 directly. However, in the case of the embodiment illustrated in FIG. 42 (B), the on- or off-state control is through the thin film devices 54, the performance of the optical device is not affected by the variations in the electrical field.

(V) Application of the Optical Devices for Generating Reflected Light of Different Wavelengths The optical devices presented so far generated output light by reflection, transmission and diffraction of ambient incident light, but the output light was essentially monochromatic. In the following embodiments of the optical device of the present invention, the output light comprises at least two wavelengths generated from two regions of the optical device.

(V-1) Optical Devices

Figure 43:
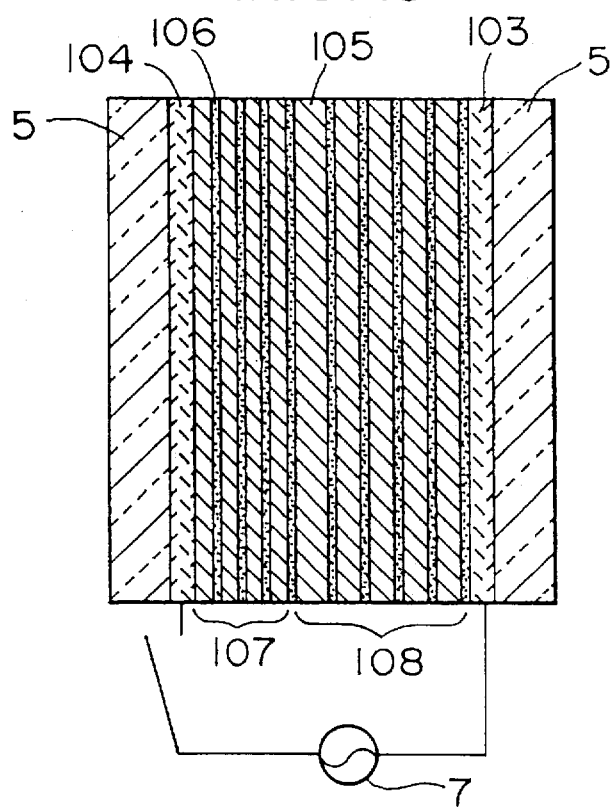
FIG. 43 is a schematic illustration of an optical device having two regions of the optical elements of the present invention.

FIG. 43 shows an example of the device of this embodiment which has basically the same optical elements as presented in earlier embodiments, i.e. an optical element made of a polymer material 105 and a liquid crystal material 106. The optical elements are disposed between a pair of transparent electrodes 103, 104 disposed on glass substrate bases 5. The polymer material is made of LUXTRAK™ LCR 208 of n=1.52. The liquid crystal material is made of MERCK E-7 having electrical field dependent refractive index, which can vary from the on-state index n2=1.52 to the off-state index n1=1.75.

The feature of the device of this embodiment is that there are two regions of optical elements each having an inter-element spacing (periodicity) different from that of the other optical element. For example, in FIG. 43, the region 107 has an inter-element spacing to reflect light of 488 nm wavelength, and the region 108 has an inter-element spacing to reflect light of 514.5 nm wavelength.

In the off-state of the device, there is a large difference in the refractive indexes of the polymer material (n=1.52) and the liquid crystal material (n=1,75), and incident white light entering the device produce reflected light of wavelengths at 488 and 514.5 nm. Therefore, the display apparatus based on the optical device of this embodiment was brighter than those made of optical devices which reflect monochromatic light. In the on-state of the device, the difference in the refractive indexes between the polymer material and the liquid crystal material was nearly eliminated, and the device produced no reflected light and the incident white light was almost all transmitted through the device.

Figure 44:
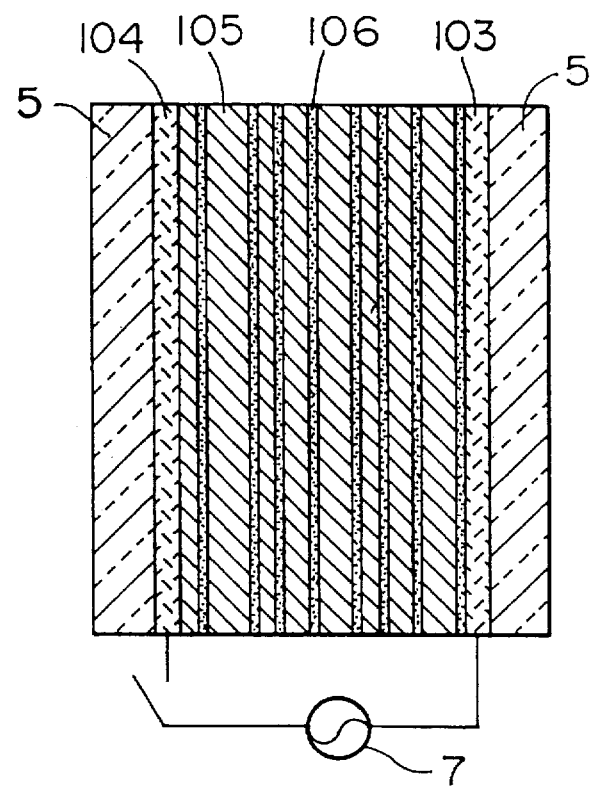
FIG. 44 is a schematic illustration of an optical device having a stacked arrangement of the optical elements of the present invention.

FIG. 44 shows another example of the device of this embodiment in which an optical element of one periodicity to reflect a wavelength of 488 nm is stacked upon another optical element of another periodicity to reflect a wavelength of 514.5 nm.

In the off-state of the device having such a configuration, the reflected light contains two wavelengths, and was therefore brighter than the device which produces only monochromatic reflected light. In the on-state of the device, the refractive index of the liquid crystal material changed so as to make the refractive index of the liquid crystal material to be nearly the same as that of the polymer material, therefore, there was little reflection, and the incident light was transmitted through the device. An advantage of this stacked configuration is that because the two optical elements (for reflecting back two different wavelengths) are formed in the same region of the device, the thickness of the optical device can be made thinner than a flat configuration shown in FIG. 43.

Figure 45:
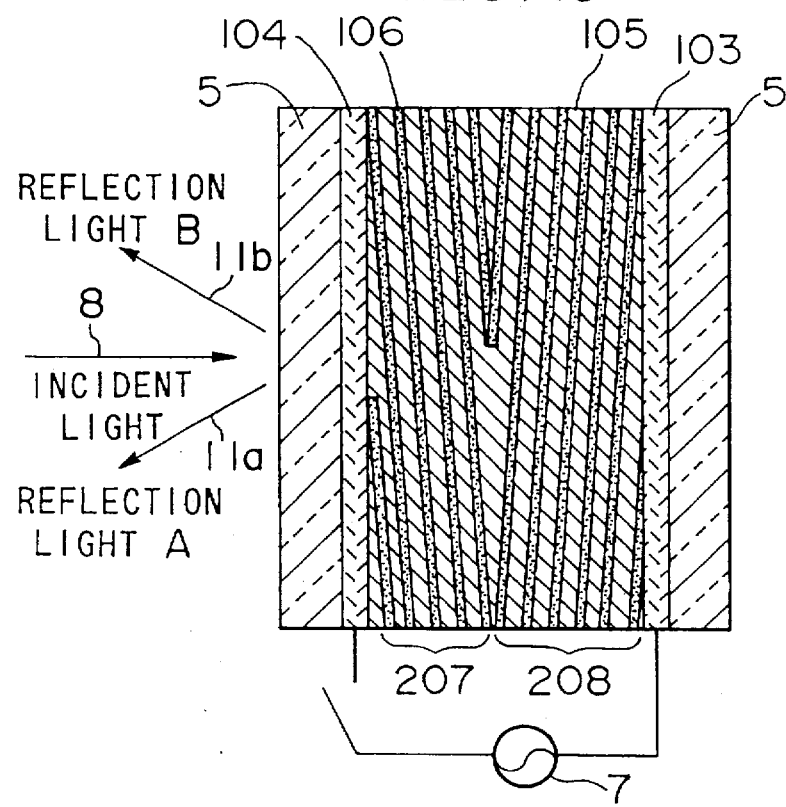
FIG. 45 is a schematic illustration of an application of the optical device shown in FIG. 43 to generate diverging reflection light.

FIG. 45 shows another example of the device of this embodiment having the periodic spacing of the same basic optical element, 106, 105, but is different from the previous example in that the optical elements are orientated at an angle to the incident surface of the device so as to reflect the incident light 8 in direction other than normal to the incident surface. There are two regions 207, 208 of optical elements whose spacing is chosen to reflect light of 488 nm wavelength. The region 207 reflects the incident light in the direction a, and the region 208 reflects the incident light in the direction b.

In the off-state of the device, the incident white light 8 entering the device at right angles, for example, as shown in FIG. 45, was reflected back in the directions indicated by reflection light 11a and 11b. By choosing the orientation of the optical elements with respect to the incident surface of the device, it becomes possible to reflect the incident white light 8 in a plurality of directions. The result is that the field of view of the device is increased. In the on-state of the device, the refractive index of the liquid crystal material changes so as to be close to that of the polymer material, and most of the incident white light 8 is transmitted through the device.

Figure 46:
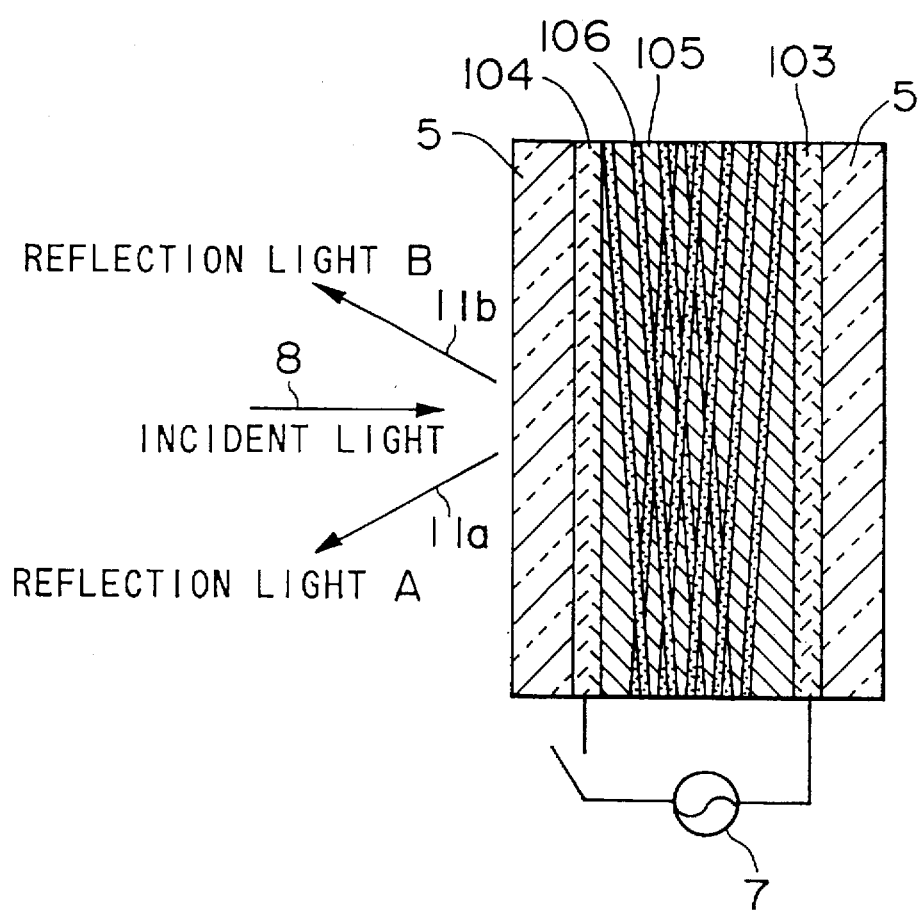
FIG. 46 is a schematic illustration of an optical device having a superimposed arrangement of the optical elements shown in FIG. 45.

FIG. 46 is another example of the device of this embodiment. The basic structure of the device is similar to the that of the device shown in FIG. 45, but the two sets of optical elements 105, 106 having inter-element spacing to reflect the incident light of 488 nm wavelength are stacked on top of the other. The operations in the on-state and the off-state of the optical device are the same as described above. The advantage of this configuration over that shown in FIG. 45 is that the device becomes more compact, while providing the same degree of increase in the field of view of the device as the device shown in FIG. 45.

Figure 47:
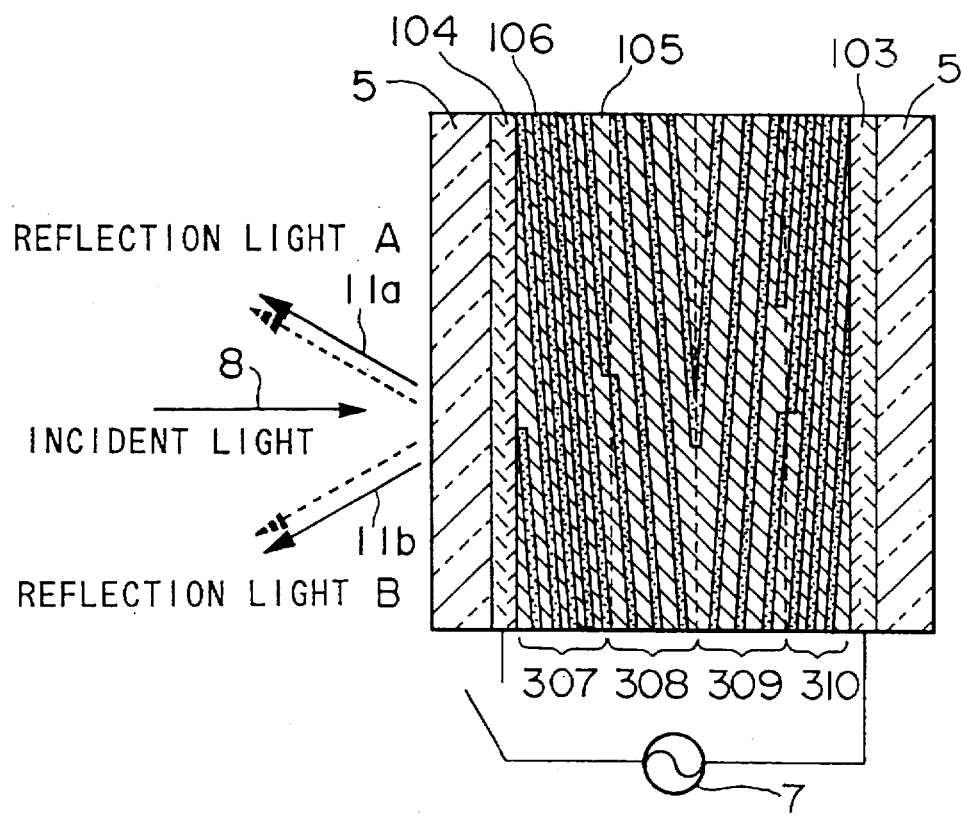
FIG. 47 is a schematic illustration of an optical device having three regions of the optical elements of the present invention.

FIG. 47 is another example of the device of this embodiment. The basic structure of the optical device is similar to that shown in FIG. 46, but the device contains four orientated regions, 307 to 310, in which the optical elements are provided in duplicate pairs to generate two reflected light of two wavelengths in the directions 11a, 11b. In more specific details, the region 307 is for reflecting the light of 488 nm in direction 11a, the region 308 is for the light of 514.5 nm in direction 11a, the region 309 is for the light of 514.5 nm in direction 11b and the region 310 is for the light of 488 nm in direction 11b.

In the off-state of the device, incident white light 8 entering the device generated reflected light of wavelengths to correspond with the inter-element spacings of the regions. The light of 488 nm wavelength was reflected in direction 11a, and the light of 514.5 nm wavelength was reflected in direction 11b. The result is increased intensity of the reflection light 11 while providing improved viewing angle. In the on-state of the device, when the difference in the refractive indexes between the liquid crystal material and the polymer material was nearly eliminated, the reflection was nearly eliminated and the incident light was mostly transmitted through the device.

Figure 48:
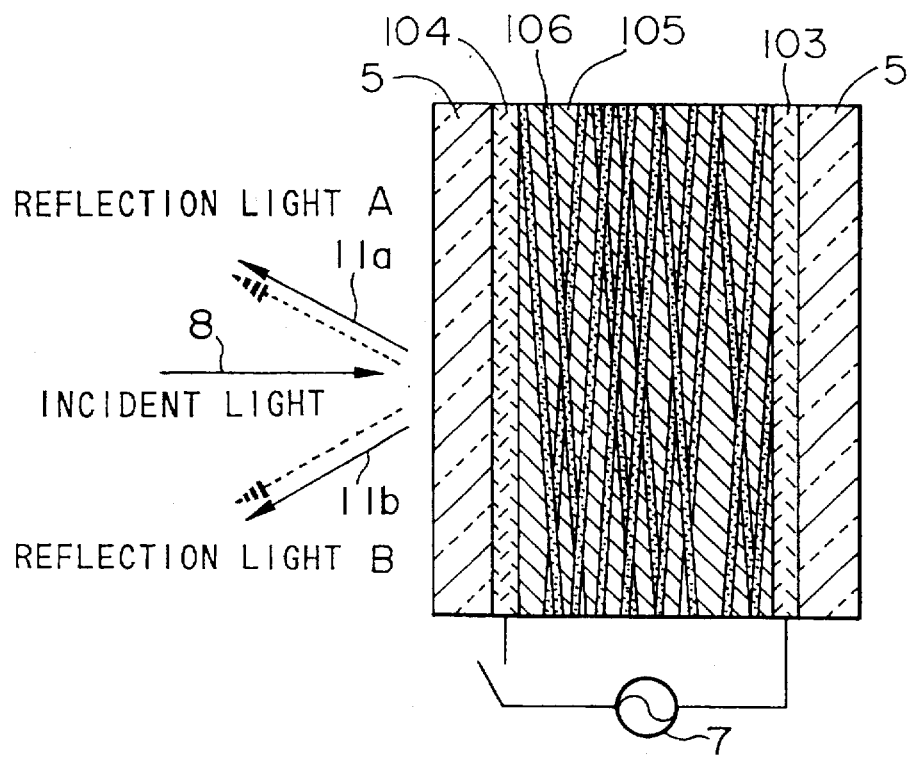
FIG. 48 is a schematic illustration of an optical device having a superimposed arrangement of the optical elements shown in FIG. 47.

FIG. 48 shows another example of the device of this embodiment. The feature of this device is that the regions of different inter-element spacings and orientations are superimposed on top of each other in one region, instead of being stacked one after another as shown in FIG. 47. In more specific details, the region to reflect the light of 488 nm in directions 11a, 11b was superimposed on a region to reflect the light of 514.5 nm in directions 11a, 11b. In the on-state of the device, the incident light was transmitted through as in the previous examples.

The advantage of this configuration is that because the optical elements are superimposed upon another, the thickness of the optical device is reduced, and the device can be made compact while providing a high degree of brightness of the reflected light and a wide angle of viewing.

Figure 49:
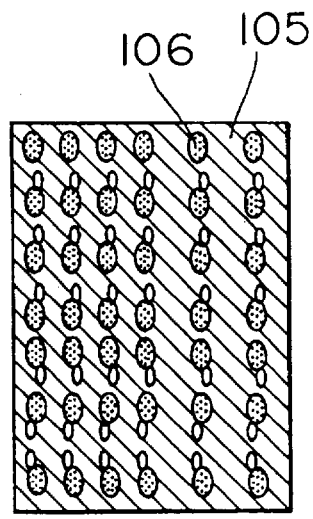
FIG. 49 is a schematic illustration of an optical device having a droplet configuration of the optical elements shown in FIG. 43.

In all the above examples shown in FIGS. 43 to 48, the optical element was made of a layer configuration of a polymer material and a liquid crystal material. It should also be noted that the optical element can be made of a droplet configuration, as shown in FIG. 49, in a periodically spaced arrangement. It is necessary that the refractive index of the polymer material be different from that of the liquid crystal material, and that the refractive index of the liquid crystal be adjustable to provide the necessary variations in the refractive indexes.

Figure 50:
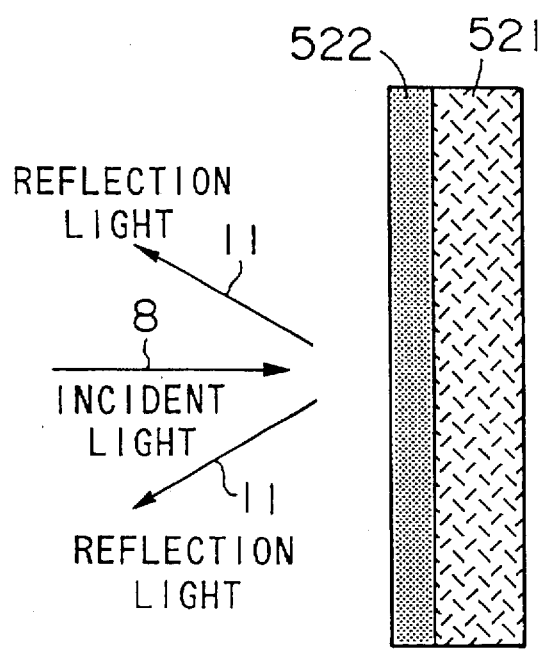
FIG. 50 is a schematic illustration of disposing a scattering device on the optical device shown in FIG. 43.

In a variation of the embodiment, multi-directional reflections can be generated, as shown in FIG. 50, by providing a scattering device 522, such as a microlens, on the incident surface of the optical device 521 of the present invention. The angle of viewing of this device was wide because of the scattering of the reflection light 11 in various directions.

In the following, various methods of making the devices of this embodiment, shown in FIGS. 43 to 50, will be explained with reference to the drawings.

(V-2) Method of making the optical devices

FIGS. 51 to 56 explain the steps of making the optical devices of this embodiments shown in FIGS. 43 to 50.

Figure 51:
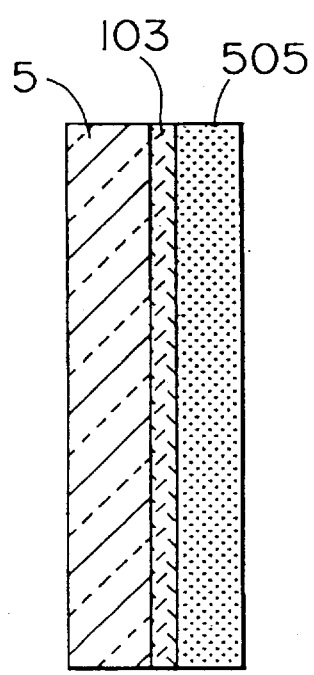
FIG. 51 is a schematic illustration of a step of coating a mixture solution on an electrode base.

First, as shown in FIG. 51, a glass substrate plate 5 having a transparent electrode 103 formed thereon is coated with a mixture solution 505 containing a polymer material and a liquid crystal material.

Figure 52:
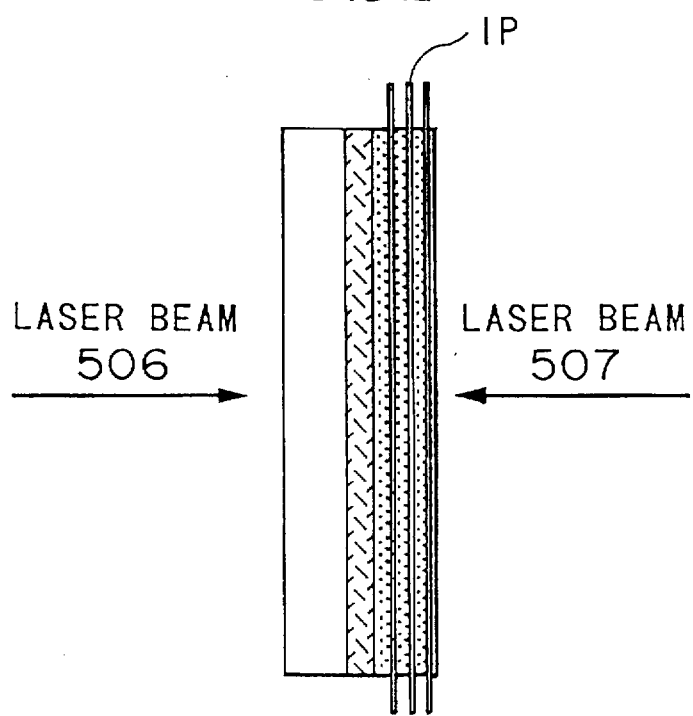
FIG. 52 is a schematic illustration of a step of irradiating the mixture solution with laser beams from both sides of the solution.
Figure 53:
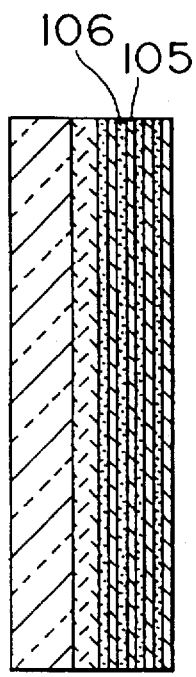
FIG. 53 is a schematic illustration of the optical device after the completion of the step shown in FIG. 52.

Next, as shown in FIG. 52, flat laser beams 506, 507 from an argon laser of 488 nm are directed to the substrate plate 5 from both sides of the mixture solution 505. An interference pattern IP is produced in the mixture solution 505, and the polymer material hardens in conformity with the interference pattern IP. The result is a production of a layer of optical device comprising a plurality of optical elements, as shown in FIG. 53, containing alternating layers of the polymer material 105 and the liquid crystal material 106.

Figure 54:
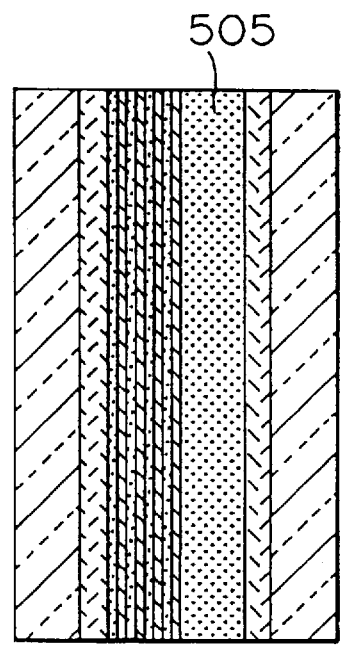
FIG. 54 is a schematic illustration of a step of disposing another electrode base having a coating of the mixture solution on the device shown in FIG. 53.

Next, as shown in FIG. 54, another coating of the mixture solution 505 is applied on top of the optical device produced in the preceding step, and another glass substrate plate 5 is placed on top.

Figure 55:
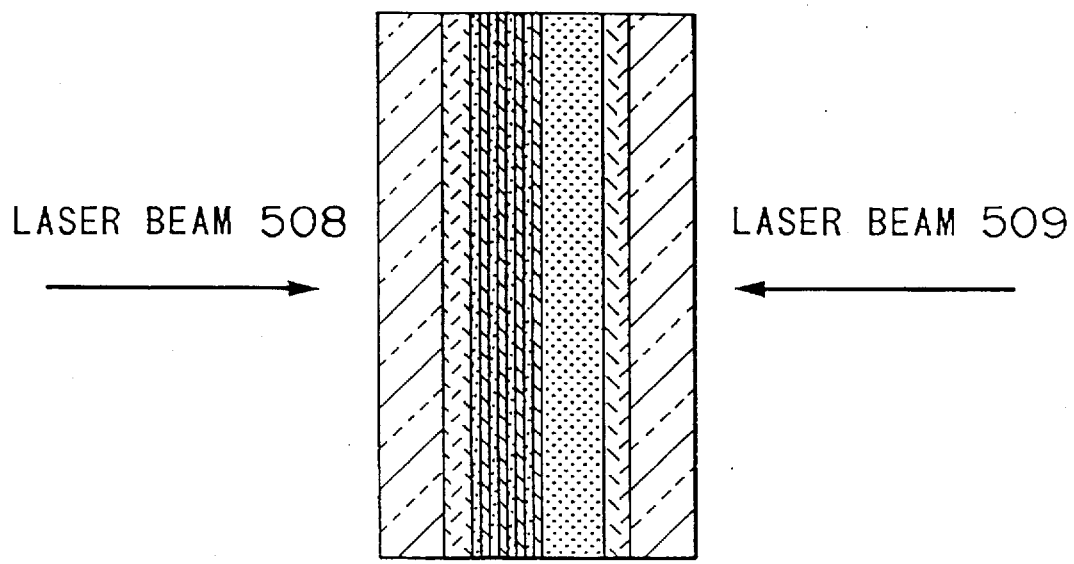
FIG. 55 is a schematic illustration of a step of irradiating the device shown in FIG. 54 with laser beams from both sides of the device.

Next, as shown in FIG. 55, laser beams 508, 509 from an argon laser of 514.5 nm are directed to the mixture solution from both sides of the optical device. This step produces an optical device shown in FIG. 56. The inter-element spacings of the optical elements shown in FIG. 56 are different from that of the optical device shown in FIG. 53, because the inter-element spacing is dependent on the interference patter IP which is, in turn, dependent on the wavelength of the processing laser.

It can be seen that to produce the optical device shown in FIG. 45, it is necessary to produce an orientated interference patter IP by altering the angle of incidence of the laser beams.

Figure 59:
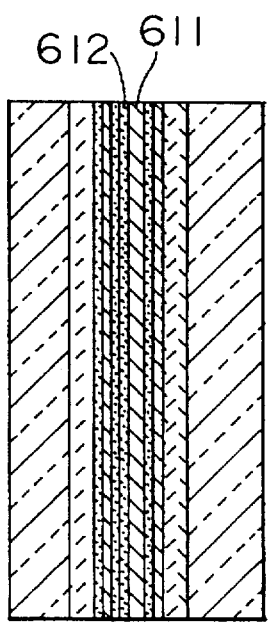
FIG. 59 is a schematic illustration of the optical device after the completion of the step shown in FIG. 58.

The steps for making the device shown in FIG. 44 will be explained with reference to FIGS. 57 to 59.

First, as shown in FIG. 57, a mixture solution 605 containing a polymer material 611 and a liquid crystal material 612 is disposed between glass substrate plates 601, 602 having a transparent electrodes 103, 104 formed thereon.

Next, as shown in FIG. 58, flat laser beams 606, 609 from an argon laser of 488 nm, and flat laser beams 608, 609 from an argon laser of 514.5 nm, are directed to the substrate plates 601, 602 from both sides simultaneously. An interference pattern IP is produced in the mixture solution 605 by each wavelength, thus forming two different interference patterns IPs in the mixture solution 605. The result is the hardening of the polymer material in accordance with the interference patterns IPs, resulting in the production of an optical device, as shown in FIG. 59, which has optical elements of two different inter-element spacings made of the polymer material 611 and the liquid crystal material 612.

It can be seen that to produce the optical device shown in FIG. 46, it is necessary to generate an appropriately orientated interference pattern IP by altering the angle of incidence of the laser beams.

(V-3) Optical Apparatuses Based on the Optical Devices of this Embodiment

In the following, applications of the optical devices of the present invention to display apparatuses will be presented.

Figure 60:
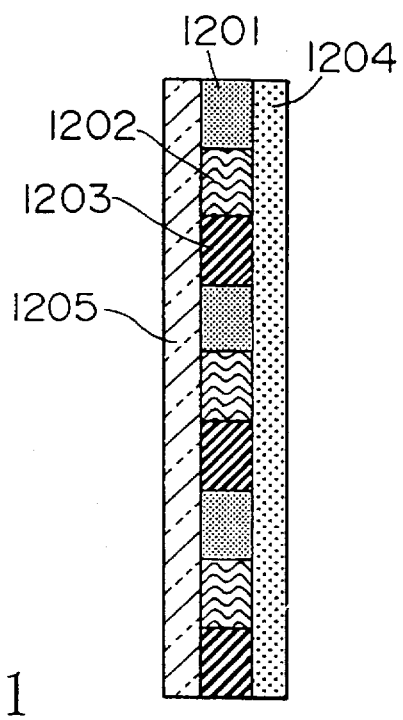
FIG. 60 is a schematic illustration of a planar arrangement of the optical device shown in FIG. 47.

FIG. 60 is a schematic illustration of a planar configuration of an optical apparatus based on the optical devices of this embodiment. The optical apparatus comprises a TFT-driven active matrix base 1204; an opposing electrode base 1205; and optical devices of the present invention consisting of an optical device 1201 to reflect blue color wavelengths, an optical device 1202 to reflect green color wavelengths and an optical device 1203 to reflect red color wavelengths.

The optical apparatus of such a structure is operated by applying appropriate signals to the matrix, the optical devices 1201 to 1203, the blue, green and red component colors are reflected from the respective pixel areas, and are observed by the observer as a bright dynamic image of full color which can be viewed over a wide viewing angle.

Figure 61:
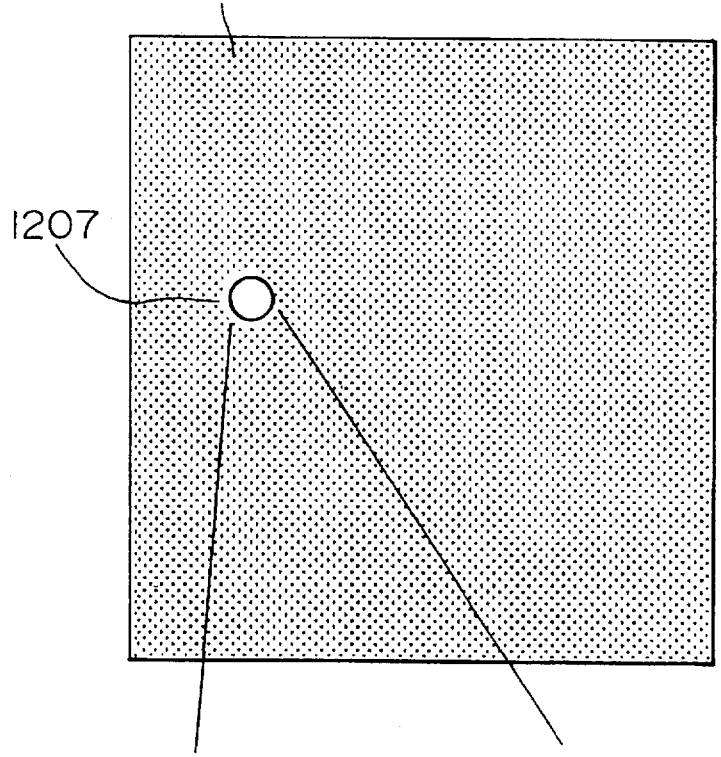
FIG. 61 is a schematic illustration of other potential arrangement of the optical elements shown in FIG. 60.

In the apparatus shown in FIG. 60, the optical devices 1201 to 1203 were arranged unidirectionally, but the invention is not limited to this arrangement. For example, in a display apparatus 1206 shown in FIG. 61, other possible types of arrangements of the optical devices 1201 to 1203 are shown.

Figure 62:
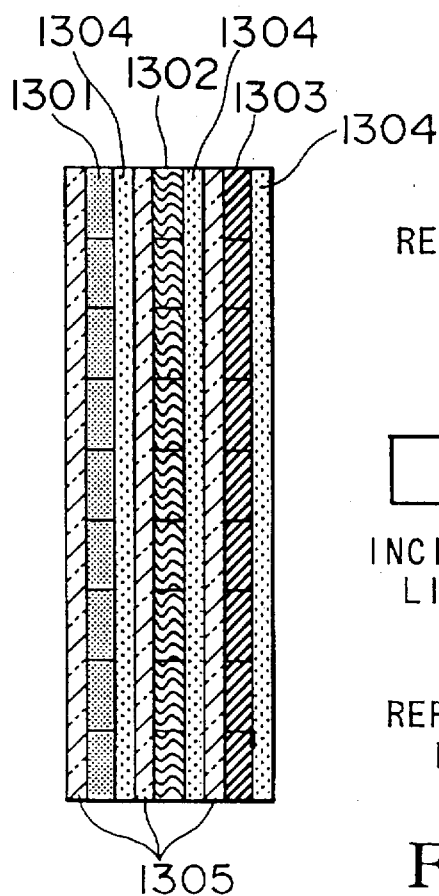
FIG. 62 is a schematic illustration of a stacked arrangement of the optical elements shown in FIG. 60.

FIG. 62 is another example of a display apparatus based on the optical devices of the type shown in FIG. 43. In this apparatus, the optical devices, 1301, 1302 and 1303, to reflect blue, green and red colors, respectively, are arranged in a stacked configuration between a TFT-driven active matrix base 1304 and an opposing electrode 1305. When this display apparatus is operated by applying suitable signals to the active matrix, full-color dynamic images can be produced by the reflecting lights of blue, green and red color components generated by the optical devices of the present invention.

In these examples of the display apparatuses, nematic liquid crystal (MERCK E-7) was used, but it is not necessary to be limited to this type of liquid crystal. Polymeric or highly dielectric liquid crystal material can also be used for making the optical devices. Also, the polymer material used in the devices was LUXTRAK™ LCR 208, but other polymeric materials usable include those which exhibit a different refractive index from either the on- or off-state refractive index of the liquid crystal.

Also, in the above apparatuses, glass substrate plates were used, but other transparent materials are also applicable.

In forming the optical devices of the display apparatus of this embodiment, argon lasers emitting 488 and 514.5 nm wavelengths were used. It is not necessary to be limited to such lasers. It is necessary that the light source be coherent so that interference patterns can be generated by the light sources. For example, by using a helium neon laser beam which contains a red color component, it is possible to produce an optical element for reflecting red color.

Figure 63:
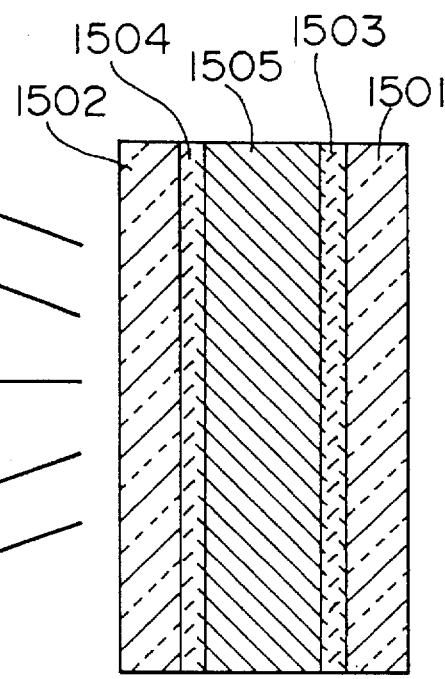
FIG. 63 is a schematic illustration of an optical device having three optical elements for reflecting white incident light in three directions.

In the above examples of display apparatuses, optical devices for reflecting two individual wavelengths were used to reflect light in two directions. However, in the optical apparatus shown in FIG. 63, the optical region 1505 contains not less than three optical devices between the transparent electrodes 1503, 1504 formed between a pair of glass substrate plates 1502, 1503, thus white incident light entering the apparatus is reflected in not less than three directions. A display device of such a structure provides a wider range of reflection wavelengths to provide a brighter full color image which can be viewed from a wide viewing angle.

The formation of such a display apparatus required a plurality of lasers, emitting different wavelengths.

Figure 64:
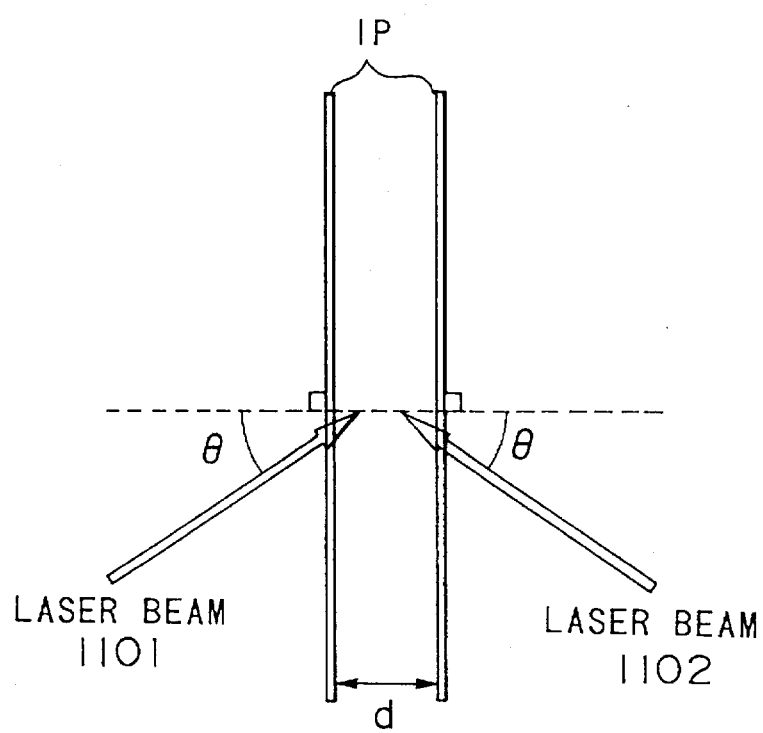
FIG. 64 is a schematic illustration of the principle of forming an optical element having an inter-element spacing d by irradiating the mixture solution with two laser beams.

For making the display apparatuses presented in the above examples, lasers emitting different wavelengths were used to generate optical devices of different inter-element spacing. It is also possible to use lasers emitting the same wavelength, and direct the lasers at different angles to the mixture solution contained between the electrodes. For example, as shown in FIG. 64, the inter-element spacing, d, in the interference pattern IP generated by the laser beams 1101, 1102 is governed by the angle of incidence θ of the laser beam to the mixture solution, and the value of d can be calculated from the Bragg reflection relationship, relating the wavelength λ of the laser to the angle of incidence θ as follows: $d=\lambda/(2 \cdot \cos \theta)$. Therefore, it is possible to alter the inter-element spacing by using lasers emitting the same wavelength and varying the angle of incidence.

It should be noted that although the above explanations related to devices and apparatuses for display purposes, it is possible to apply the same techniques to making other optical devices such as optical switches.

Also, it should be noted that although the above explanations related to making full color display devices containing blue, green and red color components, a multi-color display device requires that the display device contain at least two optical devices of the present invention to reflect at least two colors.

(VI) Application of the Optical Device to Generate Output Light of Infrared Wavelengths.

In all the embodiments presented so far, the wavelength of the output light could only be changed by changing the wavelength of the processing laser for hardening the polymer material. It was also necessary that the polymer material be hardenable at the wavelength being used. However, it is sometimes desirable to obtain outgoing light of longer wavelength. Although lasers emitting light of long wavelengths are available, polymer materials which can be hardened at the long wavelengths are not readily available. To overcome this difficulty, a method of generating an incident light having a longer wavelength than the wavelength of the processing laser beam was devised.

Figure 65:
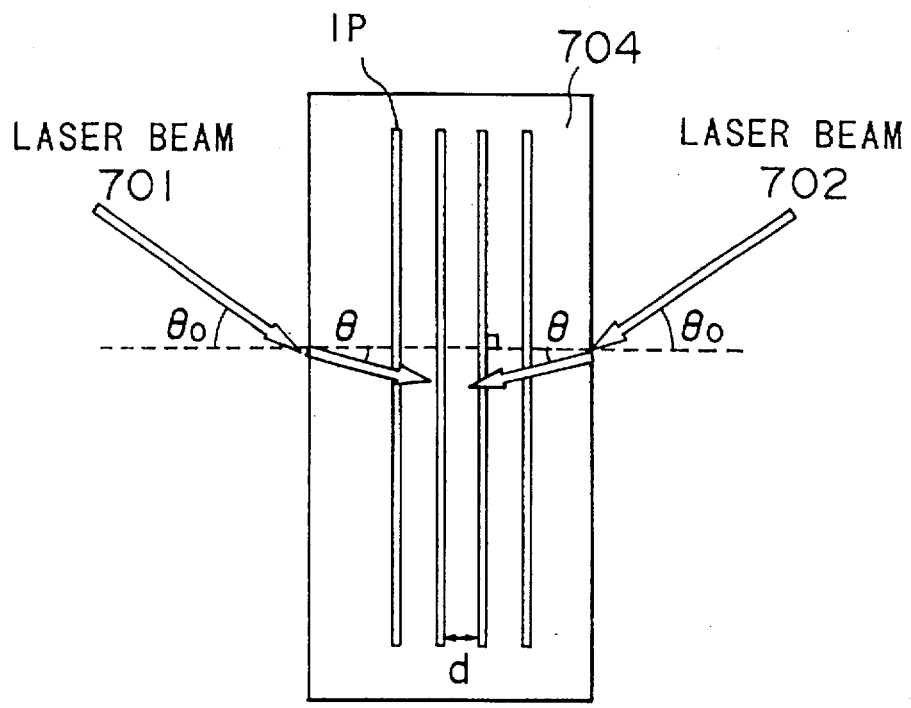
FIG. 65 is a schematic explanation for generating a large angle of incidence for the process laser beam.

FIG. 65 is a schematic illustration of generating a large angle of incidence of the processing laser beam. Letting the wavelengths of the laser beams, 701, 702 be $\lambda$, and the angles of incidence be $\theta_0$ for both laser beams 701, 702, and the refractive index of the refraction medium be n; they are related by the Snell's law:

$$n_0/n = \sin\theta/\sin\theta_0$$

From the above equation, the inter-element spacing d can be calculated as:

$$d = \tfrac{1}{2}\lambda\sqrt{\{n^2 - (\sin\theta_0)^2\}}$$

The refractive index of the light hardenable polymer material used in the present invention is 1.50, by changing the angle of incidence $\theta_0$ of the laser emitting 488 nm wave from $\theta_0 = 0$ to 90°, it is possible to change the value of d from 163 nm to 218 nm. When incident white light enters the optical device of this inter-element spacing, the device reflects light of wavelengths from 488 to 650 nm.

The above example demonstrates that it is possible to alter the angle of incidence $\theta$hd 0of the processing laser beam to control the inter-element spacing d of the optical device, thus controlling the reflection wavelength of the device to be longer than the wavelength of the processing laser.

However, with the technique illustrated in FIG. 65, it is not possible to produce an optical device for reflecting light of wavelengths in the infrared region near .1 μm which is useful in the fiber optic communications technology.

To resolve the above problem, a technique was developed to produce an optical device by placing a mixture solution in a thin plate vessel, and holding the vessel in a refraction medium having non-parallel opposing surfaces, and irradiate the medium with at least one laser beam of shorter wavelength than the reflected light to generate an interference pattern in the mixture solution.

Figure 66:
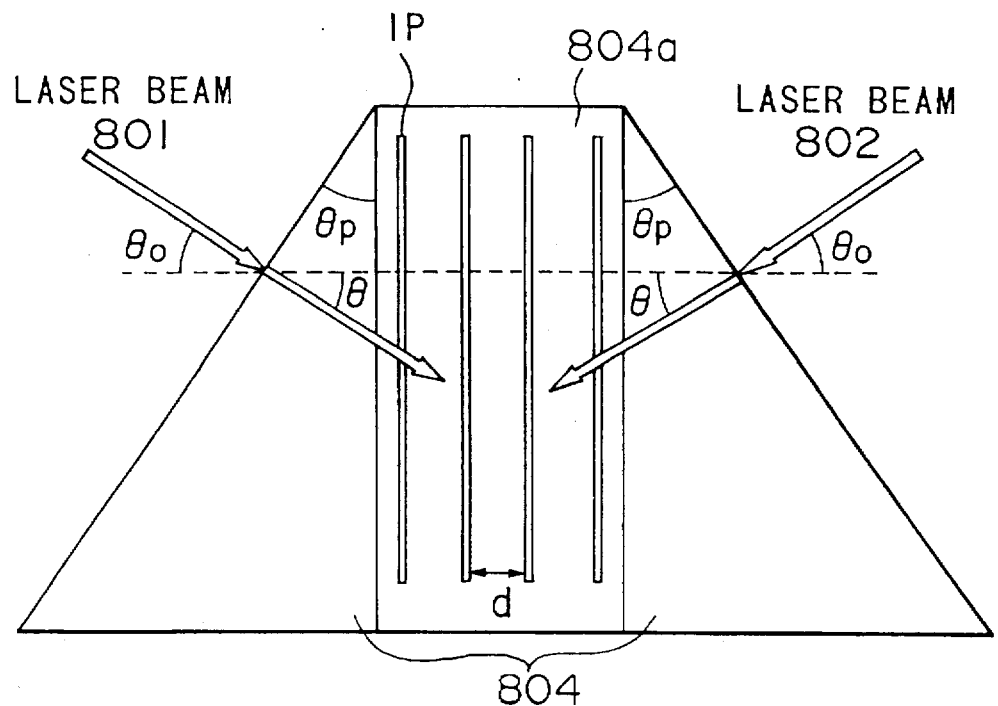
FIG. 66 is a schematic explanation of the principle of generating a desired large angle of incidence for the process laser beam.

First, the principle of the technique will be explained. As shown in FIG. 66, laser beams 801, 802 of wavelength $\lambda$ are directed to the refraction medium 804 of a refractive index n, and having non-parallel side surfaces which intersect at an (apex) angle $\theta_p$ to the mixture solution 804a. The inter-element spacing d formed by the interference pattern IP is expressed by the following equation:

$$d = 1/\{2n \cdot (\cos\theta_p - \theta_x)\}$$

where $\theta x$ is given by the following equation:

$$\theta x = \{1/n \cdot \sin(\theta_p - \theta_0)\}^{-1}$$

The above equation demonstrates that the inter-element spacing d can be controlled by the angle of incidence $\theta_0$ of the process laser beams. For example, if the wavelength $\lambda$ is 488 nm (from an argon laser), the apex angle $\theta_p$ is 60°, the angle of incidence $\theta_p$ of the laser beam is 90° and the refractive index is 1.50, the spacing d is 890 nm. The technique of the present invention is thus able to produce inter-element spacing d which could not be produced by the techniques demonstrated in the foregoing sections. The optical device of such a large inter-element spacing will be able to reflect light of over 2 μm wavelength. Therefore, this technique enables to conveniently utilize a polymer material which can be hardened by the usual argon laser emitting 488 nm beam, and yet to produce an optical element which reflects light much longer than the wavelength of the processing laser. Therefore, it is clear that the technique is readily able to produce optical device responsive to an optical communication wavelength of the order of 1 nm.

Figure 67A:
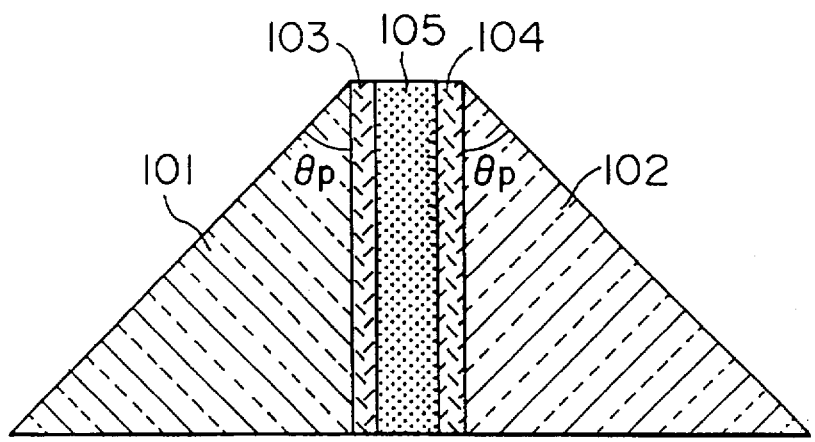
FIG. 67 (A) is a schematic explanation for the principle of a method for making the optical device.
Figure 67B:
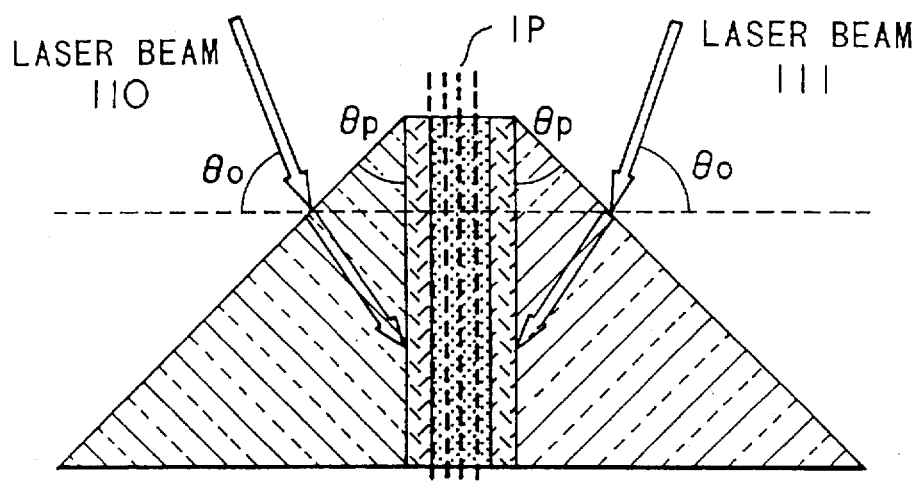
Figure 67C:
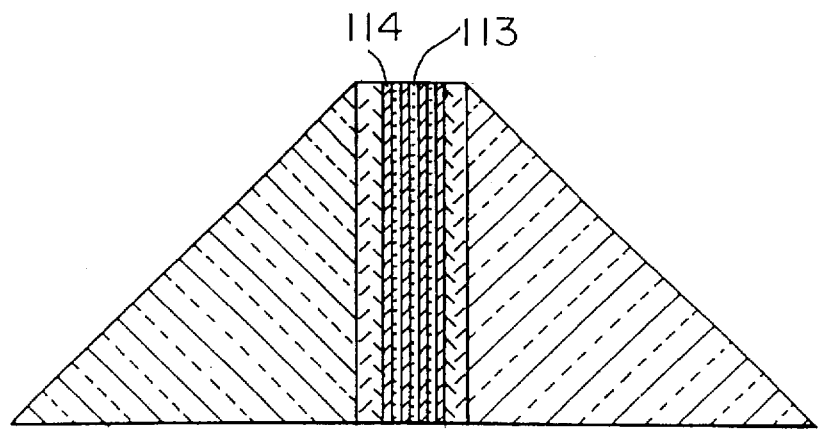

FIGS. 67 (A), 67 (B) and 67 (C) provide an explanation of the basic approach to producing the optical device of this embodiment.

First, as shown in FIG. 67 (A), a pair of acrylic bases 101, 102 of a pyramidal shape (apex angle of $\theta_p$) was prepared by forming ITO electrodes 103, 104. A mixture solution 105 containing a liquid crystal material (which exhibits off-state refractive index n1=1.75 and on-state refractive index n2=1.52, MERCK E-7) and blue light hardenable polymer material (LUXTRAK™ LCR 208) of n3=1.50 was disposed between the acrylic bases 101, 102.

Next, as shown in FIG. 67 (B), argon laser beams 110, 111 were directed to the bases 101, 102 at an angle of incidence of $\theta_0$. The laser beams 110, 111 generated an interference pattern IP in the mixture solution 105. Here, for a specific case of $\theta_p=60°$, $\theta_0=60°$, the inter-element spacing d was about 325 nm. The polymer material hardened in accordance with this spacing, and produced an optical device having a periodic spacing of the optical elements, consisting of a polymer material 114 and the liquid crystal material 113, as illustrated in FIG. 67 (C).

Next, the acrylic bases 101, 102 were machine finished to produce an optical device having roughly parallel side faces.

The normal incident light entering this optical device generated reflected light of about 970 nm wavelength, and the intensity of the reflected light was adjustable by varying the magnitude of the electrical field applied to the electrodes 103, 104.

Figure 68A:
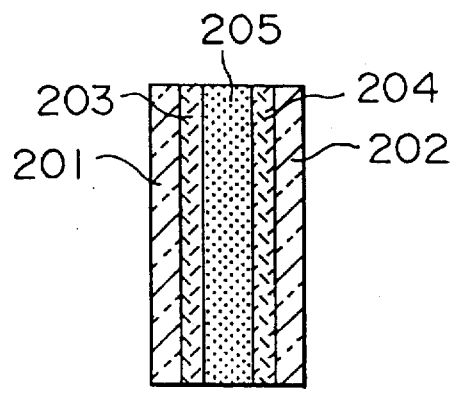
FIG. 68 (A) is a schematic illustration of a step of preparing a mixture solution held in a parallel sided container.
Figure 68B:
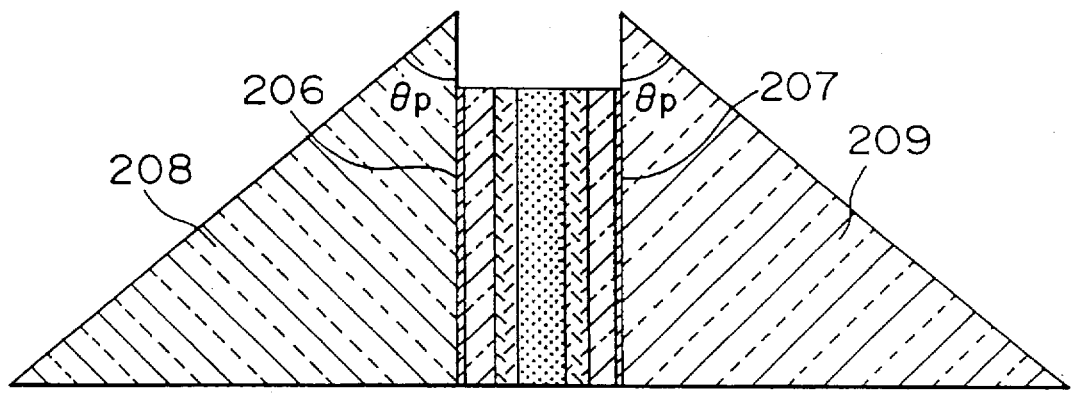
Figure 68C:
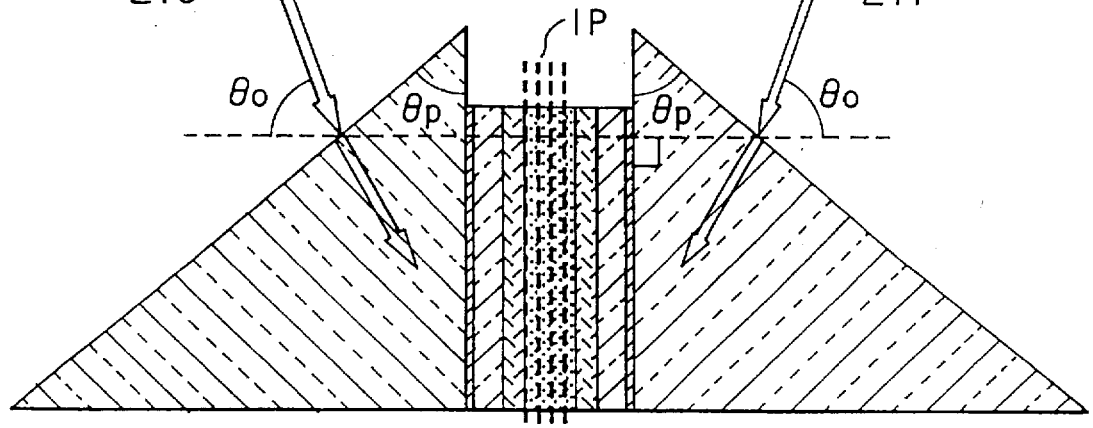

FIGS. 68 (A), 68 (B) and 68 (C) illustrate the detailed steps involved in making the device of this embodiment.

First, as shown in FIG. 68 (A), thin film electrodes 203, 204 made of ITO are formed on a pair of glass substrate plates 201, 202; a mixture solution 205 containing a liquid crystal material and blue light hardenable polymer material is disposed between the glass substrate plates 201, 202. The liquid crystal material MERCK E-7 exhibits a field-dependent refractive index varying between the off-state refractive index n1=1.75 and the on-state refractive index n2=1.52 and a polymer material, LUXTRAK™ LCR 208) has a refractive index n3=1.50. Next, as shown in FIG. 68 (B), a pair of glass prisms 208, 209 (having an apex angle $\theta_p$) are attached to the glass substrate plates 201, 202 with intervening layers of a refractive index adjusting oil films 206, 207. Next, as shown in FIG. 68 (C), blue color beams 210, 211 from argon lasers are directed to the mixture solution 205 at an angle $\theta_0$. The laser beams 210, 211 generates an interference pattern in the mixture solution 205. For a specific case of $\theta_p=60°$, $\theta_0=60°$, the spacing of the interference pattern is about 325 nm, and the polymer material is hardened in accordance with the interference pattern to produce an inter-element spacing of 325 nm.

The optical device thus produced reflected a light of about 970 nm wavelength, and the intensity of the reflected light was adjustable by varying the magnitude of the electrical field applied to the electrodes 103, 104.

Figure 69:
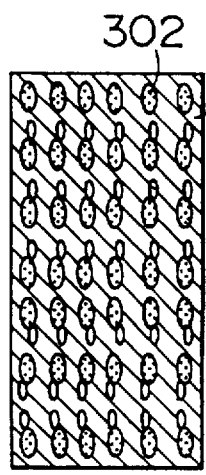
FIG. 69 is a schematic illustration of a droplet configuration of the optical device of a general type shown in FIG. 66.

In the optical devices presented above, the optical element was made of a layer configuration of a polymer material and a liquid crystal material. It should also be noted that a droplet configuration of the optical elements, as shown in FIG. 69, of a certain periodicity arrangement is also permissible.

The polymer and liquid crystal materials used used in the above examples, LUXTRAK™ LCR 208 and MERCK E-7, may be replaced with other substances. It is necessary that the refractive index of the polymer material be different from that of the liquid crystal material, and that the refractive index of the liquid crystal be adjustable between the on-state and the off-state to provide the necessary variations in the refractive indexes.

The liquid crystal material is not limited to nematic crystal. Other materials include polymeric liquid crystal and highly dielectric liquid crystals whose refractive index can be changed by electrical field.

Also, in the above examples, the liquid crystal layer and the polymer layer were separated, but such a layered structure is not mandatory. It is required that a periodic variation in the inter-element spacing be provided by a material having field-dependent refractive index and a material having field independent refractive index, and that these materials are arranged in an alternating configuration having a specific periodicity.

Also, the light source used in the above embodiments was an argon laser, but it is not limited to this light source. it is necessary that the light source is coherent so as to generate an appropriate interference pattern.

Figure 70:
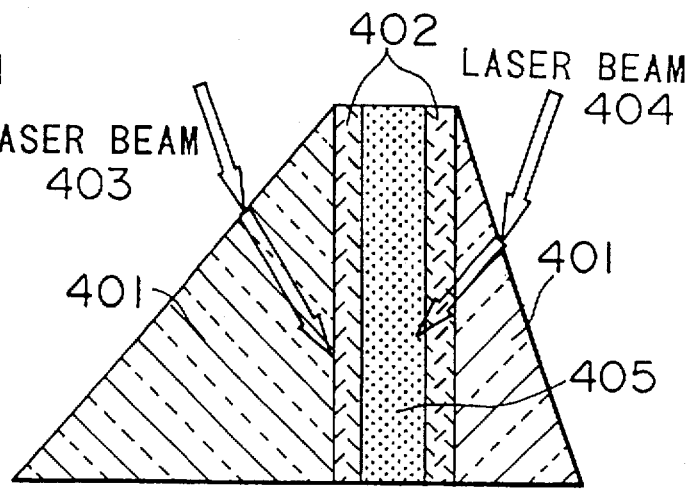
FIG. 70 is a schematic illustration of another configuration of prism shaped refraction medium for making the device of a general type shown in FIG. 66.

In the above example of this embodiment, the apex angle $\theta_p$ of 60° was chosen for the acrylic pyramidal bases 101, 102, but it is not limited to this angle. It is permissible that, as shown in FIG. 70, a pair of refraction media 401 having different apex angles can also be used. As before, transparent electrodes 402 are deposited on the refraction media 401, and a mixture solution 405 is disposed between the pair of refraction media 401. Laser beams 403, 404 are directed at the mixture solution 405 as before to generate an interference pattern therein.

Figure 71:
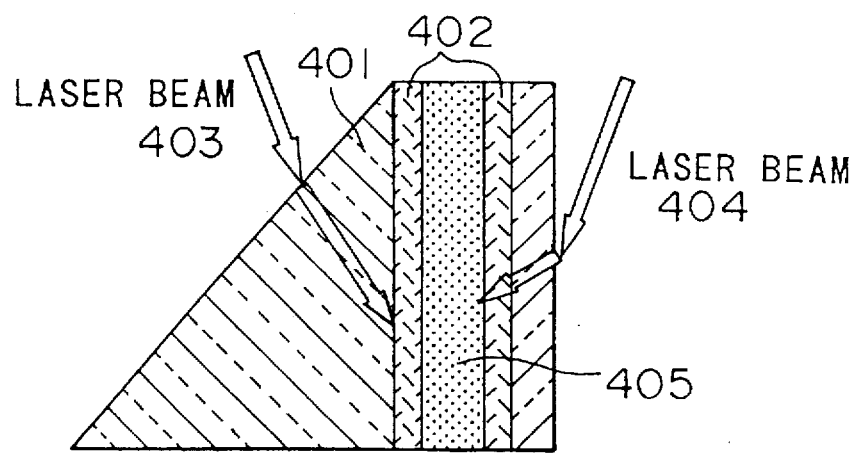
FIG. 71 is a schematic illustration of another configuration of a prism shaped refraction medium for making the device of a general type shown in FIG. 66.

Another example is shown in FIG. 71, in which only one of the pair of the refraction media 401 has an inclined surface.

Figure 72:
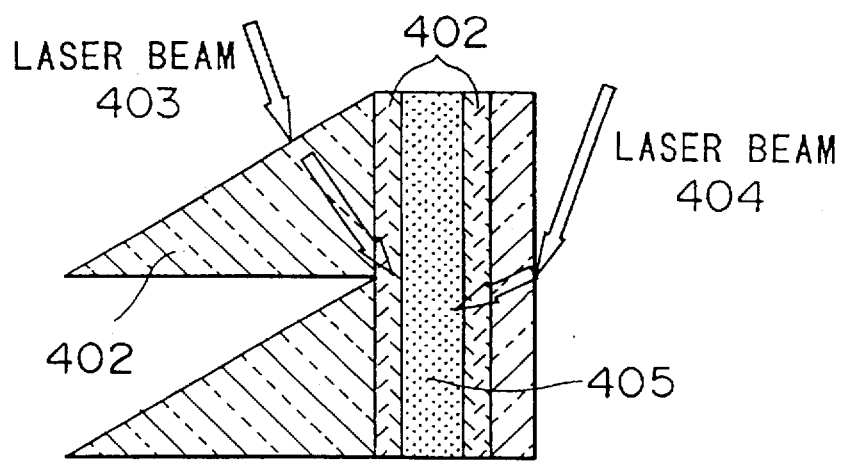
FIG. 72 is a schematic illustration of still another configuration of a prism shaped refraction medium for making the device of a general type shown in FIG. 66.

Another possibility is shown in FIG. 72 in which a plurality of refraction media having the same intersection angle are used on one side of the mixture solution 405.

Figure 73:
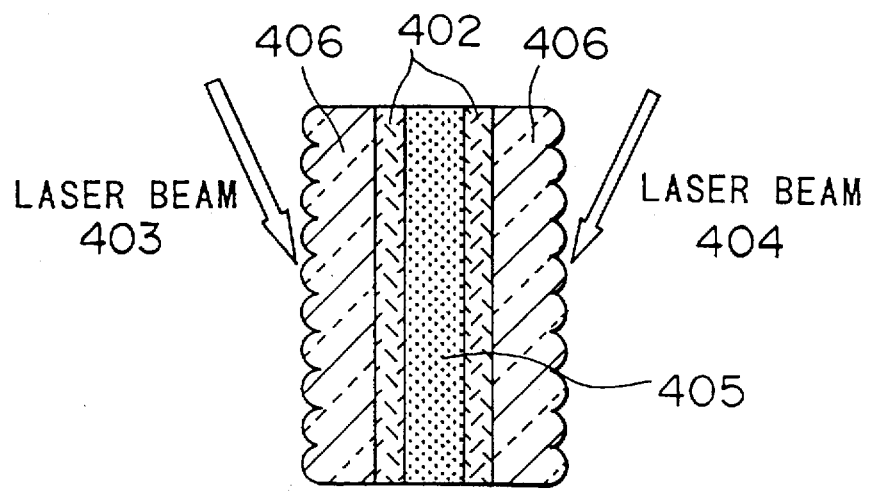
FIG. 73 is a schematic illustration of still another configuration of a prism shaped refraction medium for making the device of a general type shown in FIG. 66.
Figure 74:
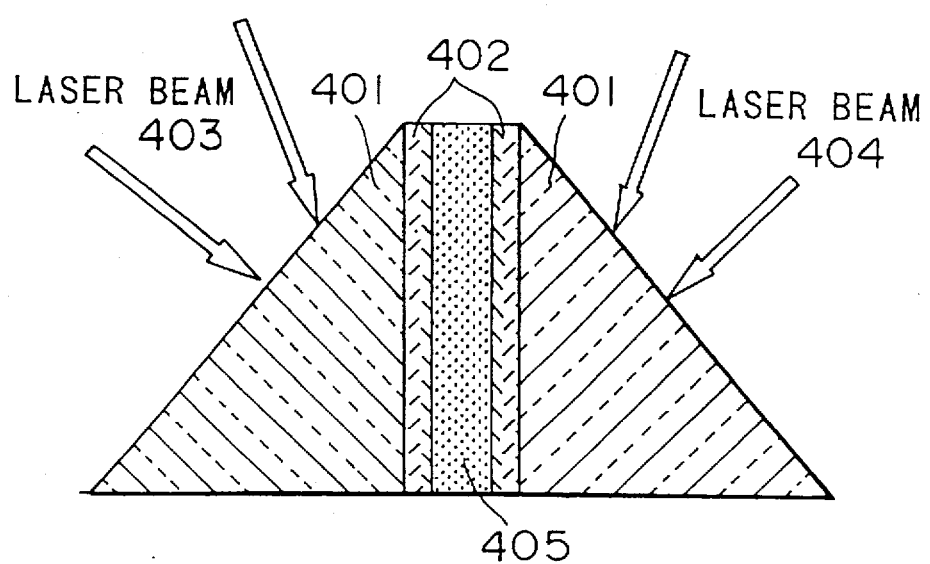
FIG. 74 is a schematic illustration of a method involving two pairs of laser beams to produce the device of a general type shown in FIG. 66.
Figure 75:
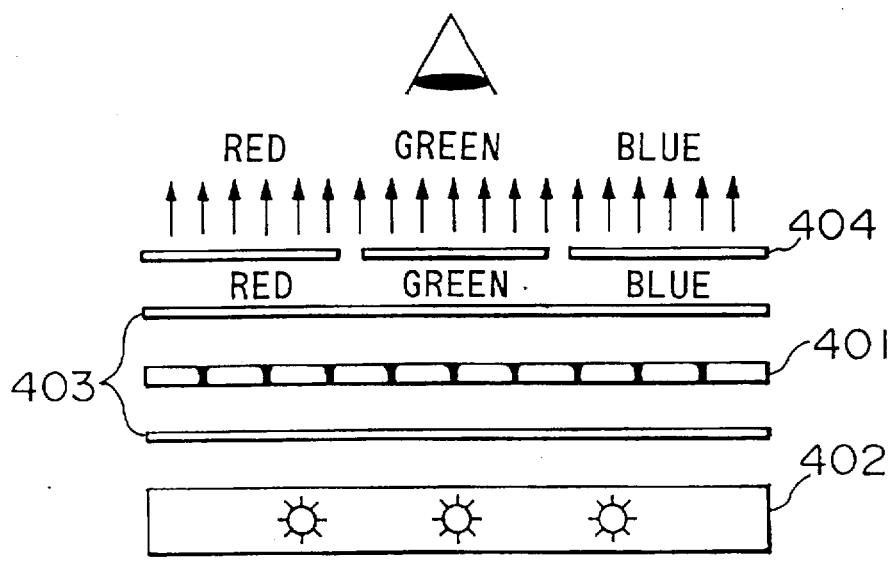
FIG. 75 is a schematic illustration of a conventional optical display apparatus of a transmission type having a back lighting.
Figure 76:
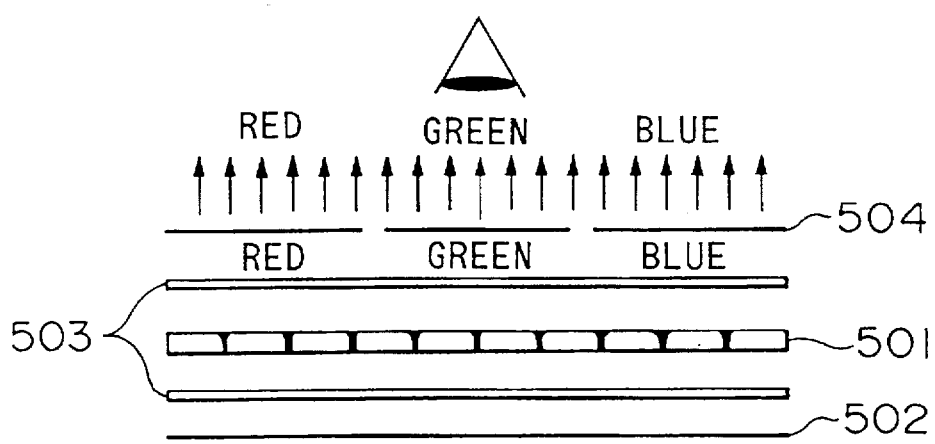
FIG. 76 is a schematic illustration of a conventional optical display apparatus of a reflective type having a polarizer and a color filter.
Figure 77:
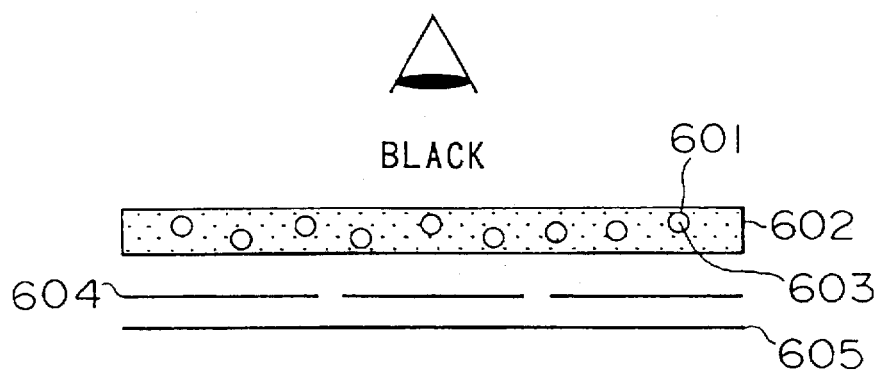
FIG. 77 is a schematic illustration of the off-state display apparatus of a conventional polymer dispersed liquid crystal of a reflective type.
Figure 78:
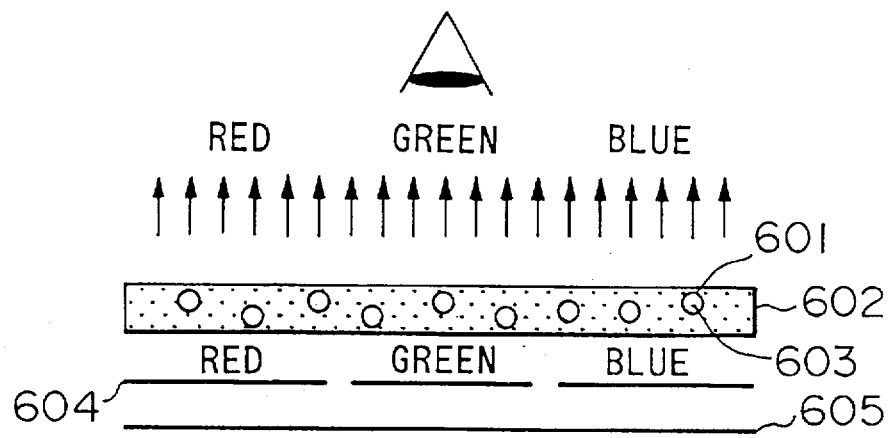
FIG. 78 is a schematic illustration of the on-state of the display apparatus shown in FIG. 77.
Figure 79:
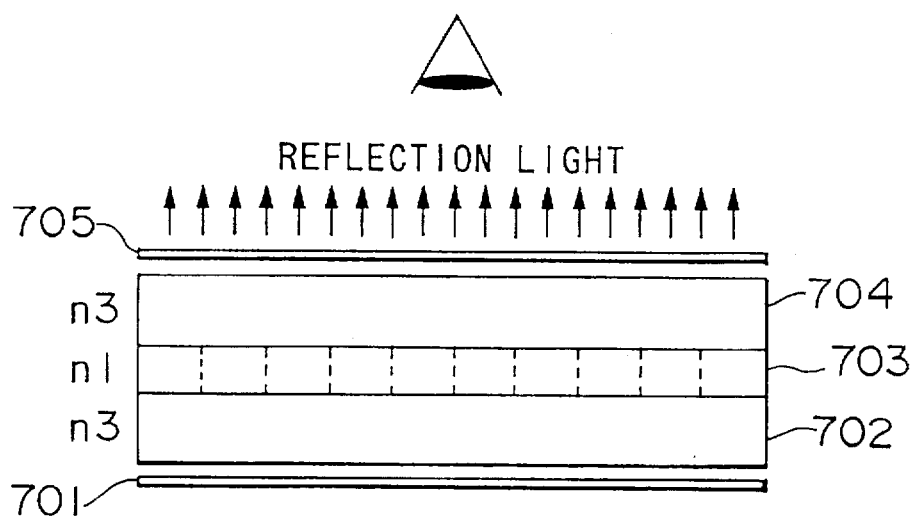
FIG. 79 is a schematic illustration of a display device in the off-state for reflecting a specific wavelength contained in white incident light.
Figure 80:
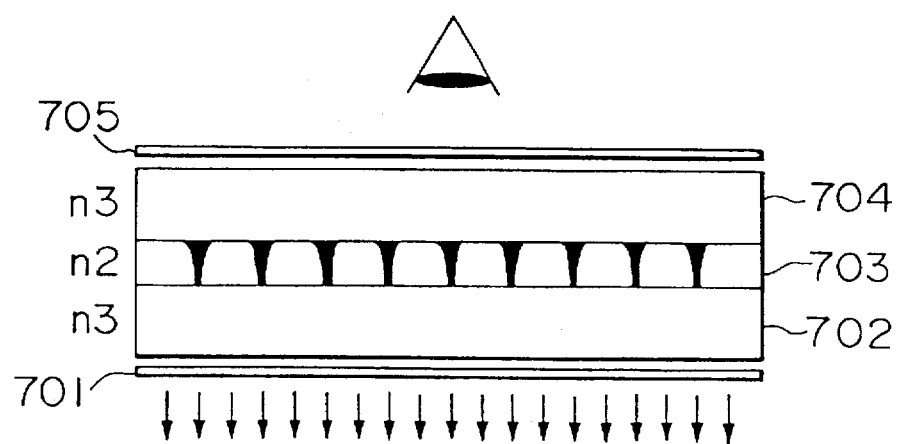
FIG. 80 is a schematic illustration of a display device in the on-state for transmitting white incident light.

The incident surface to the laser beam need not be limited to a flat surface. The surface may assume a shape such as the one illustrated in FIG. 73, in which the incident surface of one of the refraction media 401 has a plurality of uniform curves.

In the examples shown above, single laser beam was used on each side of the mixture solution 405, but it is permissible to use a plurality of laser beams 403, 404 simultaneously on each side of the mixture solution 405 to generate an interference pattern IP. It is also permissible to use a plurality of lasers of different wavelengths.

Also in the above examples, oil film was used as a means for adjusting the refractive index, but other liquid materials and resins may also serve the same purpose.

As demonstrated clearly in the above examples of this embodiment of the optical device of the present invention, the basic methodology for making the optical devices is flexible and economical, and is applicable to making a wide variety of optical devices, including the latest application of producing optical devices which would be useful in optical communications technology.

What is claimed is:

1. A method for making an optical device comprising the steps of:

(a) preparing a pair of transparent electrodes;

(b) disposing a mixture solution containing a light hardenable polymer material and a liquid crystal material between said pair of transparent electrodes;

(c) irradiating said mixture solution with a plurality of process laser beams, each process laser beam being oriented at a specific process angle with respect to an incident surface of said optical device and said plurality of process laser beams forming an interference pattern in said mixture solution; and (d) controlling the rate of hardening of said light hardenable polymer material to generate a plurality of optical elements formed by said interference pattern having at least one periodicity in inter-element spacings, thereby forming said optical device which regulates reflection, transmission and diffraction of incident light entering said optical device by the application of an electrical field on said pair of transparent electrodes.

2. A method of making an optical device as claimed in claim 1 wherein said process laser beams are coherent laser beams of a singular wavelength.

3. A method of making an optical device as claimed in claim 1, wherein said process laser beams are coherent laser beams of a plurality of wavelengths.

4. A method of making an optical device as claimed in claim 1, wherein said specific process angle is determined on the basis of wavelengths of the incident light entering said optical device and a desired angle of diffraction of the incident light.

5. A method of making an optical device as claimed in claim 1, wherein said optical elements are orientated parallel to the incident surface of said optical device.

6. A method of making an optical device as claimed in claim 1, wherein said optical elements are oriented at a right angle with respect to the incident surface of said optical device.

7. A method of making an optical device as claimed in claim 1, wherein said optical elements are oriented at a specific singular angle with respect to the incident surface of said optical device.

8. A method of making an optical device as claimed in claim 1, wherein said optical elements are oriented at a plurality of specific angles with respect to the incident surface of said optical device.

9. A method of making an optical device as claimed in claim 1, wherein said mixture solution is treated with said process laser beams so that each of the plurality of optical elements includes the polymer material having an electrical field-independent refractive index and the liquid crystal material having an electrical field-dependent refractive index.

10. A method of making an optical device as claimed in claim 9, wherein volumes of different ones of the liquid crystal material in the plurality of optical elements are not the same.

11. A method of making an optical device as claimed in claim 9, wherein in the plurality of optical elements, a total volume of the polymer material and a total volume of the liquid crystal material are different.

* * * * *